(12) United States Patent
Kruegel

(10) Patent No.: US 12,534,425 B2
(45) Date of Patent: Jan. 27, 2026

(54) PHENALKYLAMINES AND METHODS OF TREATING MOOD DISORDERS

(71) Applicant: GILGAMESH PHARMACEUTICALS, INC., New York, NY (US)

(72) Inventor: Andrew Carry Kruegel, New York, NY (US)

(73) Assignee: GILGAMESH PHARMACEUTICALS, INC., New York, NY (US)

( * ) Notice: Subject to any disclaimer, the term of this patent is extended or adjusted under 35 U.S.C. 154(b) by 275 days.

(21) Appl. No.: 18/013,776

(22) PCT Filed: Jun. 28, 2021

(86) PCT No.: PCT/US2021/039724
§ 371 (c)(1),
(2) Date: Dec. 29, 2022

(87) PCT Pub. No.: WO2022/006186
PCT Pub. Date: Jan. 6, 2022

(65) Prior Publication Data
US 2023/0265045 A1    Aug. 24, 2023

Related U.S. Application Data

(60) Provisional application No. 63/045,458, filed on Jun. 29, 2020.

(51) Int. Cl.
*C07C 217/60*    (2006.01)
(52) U.S. Cl.
CPC ................ *C07C 217/60* (2013.01)

(58) Field of Classification Search
CPC .................................................. C07C 217/60
See application file for complete search history.

(56) References Cited

U.S. PATENT DOCUMENTS 28,961 A  *  7/1860  Boynton ................ A61K 31/55
                                                         514/217.01

FOREIGN PATENT DOCUMENTS

WO        9964861 A2    12/1999
WO    WO 2010/121022 A1 * 10/2010 ........... C07C 211/27

OTHER PUBLICATIONS

ChemMedChem 2008, 3, 1299-1309 (Blaazer et al.) (Year: 2008).*
Curr. Top. Behav. Neurosci. 2017, 36, 1-43 (Nichols) (Year: 2017).*
J. Med. Chem. 2014, 57, 9220-9231 (Pauli et al.) (Year: 2014).*
Practical Process Research & Development, 2000, p. 168 (Anderson) (Year: 2000).*
Pharmacol. Rev. 2016, 68, 264-355 (Nichols-2) (Year: 2016).*
The Pharmaceutical Journal 2014, 292, 1-6 (Thomson) (Year: 2014).*
Front. Pharmacol. 2019, 10, Article 1423, 1-13 (Kolaczynska et al.) (Year: 2019).*
Trachsel, D., "Synthesis of Novel (Phenylalkyl)amines for the Investigation of Structure-Activity Relationships, Part 3", Helvetica Chimica Acta, 2003, pp. 2754-2759, vol. 86.
International Search Report dated Oct. 13, 2021 received in International Application No. PCT/US2021/039724.

* cited by examiner

*Primary Examiner* — Amy C Bonaparte
*Assistant Examiner* — Derek Rhoades
(74) *Attorney, Agent, or Firm* — Scully, Scott, Murphy & Presser, PC

(57) ABSTRACT

Phenalkylamines and methods of treating mood disorders with phenalkylamines. Also provided are pharmaceutical compositions that include phenalkylamines.

20 Claims, No Drawings

PHENALKYLAMINES AND METHODS OF TREATING MOOD DISORDERS

CROSS REFERENCE TO RELATED APPLICATIONS

This application is claiming benefit and priority to international application having Serial Number PCT/US2021/039724, filed Jun. 29, 2021, which, in turn, claims the benefit of, and priority to, U.S. Provisional Application No. 63/045,458, filed Jun. 29, 2020, the contents of which are hereby incorporated by reference herein in its entirety.

TECHNICAL FIELD

Phenalkylamines and methods of treating mood disorders with phenalkylamines. Also provided are pharmaceutical compositions that include phenalkylamines.

BACKGROUND

Phenalkylamines are a diverse class of alkaloids containing the structural scaffold of the natural alkaloid phenethylamine.

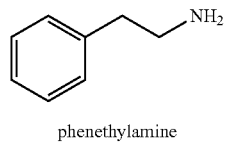

phenethylamine

There are a significant number of phenalkylamine compounds that include naturally occurring compounds, as well as synthetic and semi-synthetic chemical derivatives with similar structure. Phenalkylamines are known to have diverse psychoactive and physiological effects. Some phenalkylamines are serotonin 2A (5-HT2A) receptor agonists and/or modulators of other serotonin receptors and are known to be psychoactive and/or induce vasoconstriction. In some cases, such compounds induce prolonged hallucinations. Other phenalkylamines are modulators of monoamine transporters. Perhaps the most well-known phenalkylamine is the psychedelic compound mescaline. This compound is known to have significant effects on thought, perception, and behavior. However, it is currently classified as a Schedule I drug under the Controlled Substances Act due to its high abuse potential, no accepted medical use, and lack of established safety.

Accordingly, there remains a need for safe and effective phenalkylamine compounds that can reliably be used for the treatment of mood disorders.

SUMMARY

Provided herein is a compound having the structure:

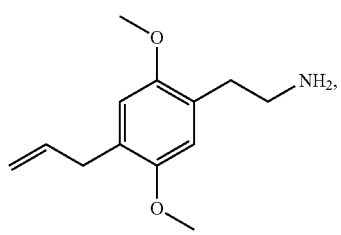

1 or a pharmaceutically acceptable salt thereof.

Also provided herein is a method of treating depression, anxious depression, a mood disorder, an anxiety disorder, or a substance use disorder and any symptom or disorders associated therewith in a subject in need thereof, the method comprising administering to the subject in need thereof an effective amount of a compound having the structure:

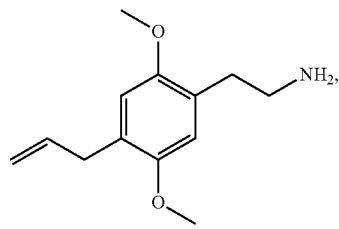

1 or a pharmaceutically acceptable salt thereof.

DETAILED DESCRIPTION

Provided herein is a compound having the structure:

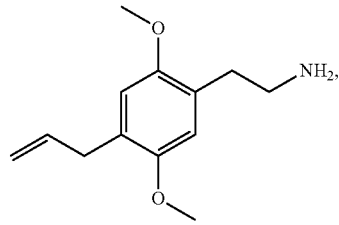

1 or a pharmaceutically acceptable salt thereof.

In some embodiments, the compound has a purity of not less than about 90%.

In some embodiments, the compound has a purity of not less than about 95%.

In some embodiments, the compound has a purity of not less than about 99%.

In some embodiments, the compound is substantially free of the isomeric compound having the structure:

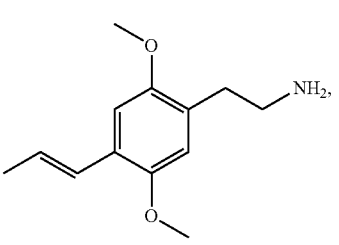

1A or a pharmaceutically acceptable salt thereof.

In some embodiments, the compound contains not more than 1% of the isomeric compound having the structure:

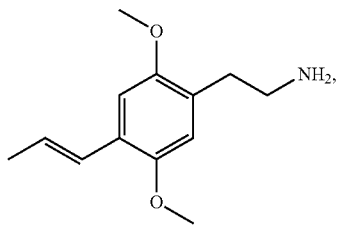

1A or a pharmaceutically acceptable salt thereof.

In some embodiments, the present disclosure includes an isomerically pure compound represented by:

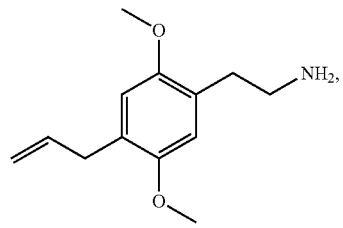

1 or a pharmaceutically acceptable salt thereof, or a mixture comprising compound 1 and compound 1A, wherein compound 1A is represented by:

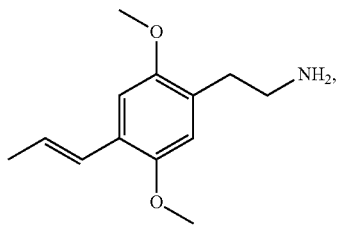

1A or a pharmaceutically acceptable salt thereof.

In some embodiments, a mixture comprising compound 1 and compound 1A is provided, wherein the mixture comprises about 90% to about 99% of compound 1 by weight. In some embodiments, a mixture comprising compound 1 and compound 1A, wherein the mixture comprises about 95% to about 99% of compound 1 by weight. In some embodiments, a mixture comprising compound 1 and compound 1A, wherein the mixture comprises about 85% to about 99% of compound 1 by weight. In some embodiments, a mixture comprising compound 1 and compound 1A, wherein the mixture comprises about 80% to about 99% of compound 1 by weight. In some embodiments, a mixture comprising compound 1 and compound 1A, wherein the mixture comprises about 75% to about 99% of compound 1 by weight. In some embodiments, a mixture comprising compound 1 and compound 1A, wherein the mixture comprises about 70% to about 99% of compound 1 by weight. In some embodiments, a mixture comprising compound 1 and compound 1A, wherein the mixture comprises about 65% to about 99% of compound 1 by weight. In some embodiments, a mixture comprising compound 1 and compound 1A, wherein the mixture comprises about 60% to about 99% of compound 1 by weight.

In some embodiments, a pharmaceutical composition comprising a disclosed compound and a pharmaceutically acceptable carrier.

Also provided herein is a method of treating depression, anxious depression, a mood disorder, an anxiety disorder, or a substance use disorder and any symptom or disorders associated therewith in a subject in need thereof, the method comprising administering to the subject in need thereof an effective amount of a compound having the structure:

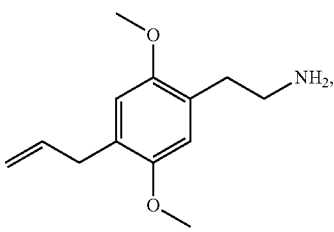

1 or a pharmaceutically acceptable salt thereof.

In some embodiments, the method of treatment wherein the disorder to be treated is depression or anxious depression.

In some embodiments, the method of treatment wherein the compound or a pharmaceutically acceptable salt thereof is administered in an amount of 0.5 mg to 50 mg.

In some embodiments, the method of treatment wherein the compound or a pharmaceutically acceptable salt thereof is administered in an amount of 0.5 mg to 1 mg.

In some embodiments, the method of treatment wherein the compound or a pharmaceutically acceptable salt thereof is administered in an amount of 1 mg to 2 mg.

In some embodiments, the method of treatment wherein the compound or a pharmaceutically acceptable salt thereof is administered in an amount of 2 mg to 5 mg.

In some embodiments, the method of treatment wherein the compound or a pharmaceutically acceptable salt thereof is administered in an amount of 5 mg to 10 mg.

In some embodiments, the method of treatment wherein the compound or a pharmaceutically acceptable salt thereof is administered in an amount of 10 mg to 15 mg.

In some embodiments, the method of treatment wherein the compound or a pharmaceutically acceptable salt thereof is administered in an amount of 15 mg to 30 mg.

In some embodiments, the method of treatment wherein the compound or a pharmaceutically acceptable salt thereof is administered in an amount of 30 mg to 50 mg.

In some embodiments, the method of treatment wherein the method provides improvement in at least one symptom selected from the group consisting of sadness or lethargy or lassitude, depressed mood, inability to feel, anxious worried feelings, fears, feeling tense, feeling restlessness, diminished interest in all or nearly all activities, difficulty initiating activities, significant increased or decreased appetite leading to weight gain or weight loss, insomnia, irritability, fatigue, feelings of worthlessness or low self-esteem, strongly held negative beliefs or pessimistic thoughts about self, others or world, feelings of helplessness, inability to concentrate or distractibility, recurrent thoughts of death or suicide, feelings of guilt, memory complaints, difficulty experiencing positive feelings, feeling cut off or distant from people, hypervigilance, risk taking behavior, avoidance of thoughts about a stressful or traumatic event, pains and aches, ruminations and obsessive thoughts, compulsive behaviors, talking to people you don't know well or strangers, being center of attention, disturbing intrusive thoughts, can't get through week without drug use, guilty about drug use, problems with friends or family due to drug use, and withdrawal symptoms due to drug use.

In some embodiments, the method of treatment wherein the compound or a pharmaceutically acceptable salt thereof is administered via a route selected from the group consisting of oral, buccal, sublingual, inhaled mist, topical, intranasal, subcutaneous, intramuscular, and intravenous.

In some embodiments, the method of treatment wherein the compound or a pharmaceutically acceptable salt thereof is administered daily.

In some embodiments, the method of treatment wherein the compound or a pharmaceutically acceptable salt thereof is administered from 1 to 10 times per month.

In some embodiments, the method of treatment wherein the compound or a pharmaceutically acceptable salt thereof is administered from 1 to 10 times per year.

In some embodiments, the method of treatment wherein the compound or a pharmaceutically acceptable salt thereof is administered every 1 to 7 days in an amount of 0.5 to 2.5 mg per administration.

In some embodiments, the method of treatment wherein the compound or a pharmaceutically acceptable salt thereof is administered every 1 to 8 weeks in an amount of 5 to 50 mg per administration.

In some embodiments, the method of treatment wherein the compound or a pharmaceutically acceptable salt thereof is administered every 1 to 6 months in an amount of 5 to 50 mg per administration.

Also provided herein is a method of treating a mood disorder by administering to a patient in need thereof an effective amount of a compound having the structure:

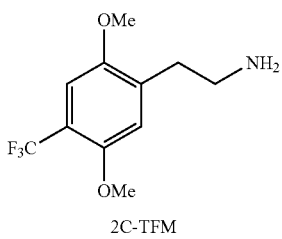 [SMILES: COc1cc(C(F)(F)F)c(OC)cc1CCN]

2C-TFM or a pharmaceutically acceptable salt thereof.

In some embodiments, the methods, compounds, and compositions may treat mood disorders that include Depressive Disorders.

In some embodiments, the methods, compounds, and compositions may treat mood disorders that include Bipolar and Related Disorders.

In some embodiments, the methods, compounds, and compositions may treat mood disorders that include Substance-Related Disorders.

In some embodiments, the methods, compounds, and compositions may treat mood disorders that include Anxiety Disorders.

In some embodiments, the methods, compounds, and compositions may treat mood disorders that include Obsessive-Compulsive and Related Disorders.

In some embodiments, the methods, compounds, and compositions may treat mood disorders that include Trauma- and Stressor-Related Disorders.

In some embodiments, the methods, compounds, and compositions may treat mood disorders that include Feeding and Eating Disorders.

In some embodiments, the methods, compounds, and compositions may treat mood disorders that include Neurocognitive Disorders.

In some embodiments, the methods, compounds, and compositions may treat mood disorders that include Neurodevelopmental Disorders.

In some embodiments, the methods, compounds, and compositions may treat mood disorders that include Personality Disorders.

In some embodiments, the methods, compounds, and compositions may treat mood disorders that include Sexual Dysfunctions.

In some embodiments, the methods, compounds, and compositions may treat mood disorders that include Gender Dysphoria.

In some embodiments, the methods, compounds, and compositions may treat migraine or cluster headache.

Also provided herein are methods and compositions for treating a mood disorder by administering to a patient in need thereof a phenalkylamine. Also provided are pharmaceutical compositions that include a phenalkylamine.

In some embodiments, the methods, compounds, and compositions may be used to treat a mood disorder including Depressive Disorders, e.g., Major Depressive Disorder, Persistent Depressive Disorder, Postpartum Depression, Premenstrual Dysphoric Disorder, Seasonal Affective Disorder, Psychotic Depression, Disruptive Mood Dysregulation Disorder, Substance/Medication-Induced Depressive Disorder, or Depressive Disorder Due to Another Medical Condition.

Also provided herein are methods of treating refractory depression, e.g., patients suffering from a depressive disorder that does not, and/or has not, responded to adequate courses of at least one, or at least two, other antidepressant compounds or therapeutics. As used herein "depressive disorder" encompasses refractory depression.

In some embodiments, the methods, compounds, and compositions may be used to treat a mood disorder including Bipolar and Related Disorders, e.g., Bipolar I Disorder, Bipolar II Disorder, Cyclothymic Disorder, Substance/Medication-Induced Bipolar and Related Disorder, or Bipolar and Related Disorder Due to Another Medical Condition.

In some embodiments, the methods, compounds, and compositions may be used to treat a mood disorder including Substance-Related Disorders, e.g., preventing a substance use craving, diminishing a substance use craving, and/or facilitating substance use cessation or withdrawal. Substance use disorders involve abuse of psychoactive compounds such as alcohol, caffeine, *cannabis*, inhalants, opioids, sedatives, hypnotics, anxiolytics, stimulants, nicotine and tobacco. As used herein "substance" or "substances" are psychoactive compounds which can be addictive such as alcohol, caffeine, *cannabis*, hallucinogens, inhalants, opioids, sedatives, hypnotics, anxiolytics, stimulants, nicotine and tobacco. For example, the methods, compounds, and compositions may be used to facilitate smoking cessation or cessation of opioid use.

In some embodiments, the methods, compounds, and compositions may be used to treat a mood disorder including Anxiety Disorders, e.g., Separation Anxiety Disorder, Selective Mutism, Specific Phobia, Social Anxiety Disorder (Social Phobia), Panic Disorder, Panic Attack, Agoraphobia, Generalized Anxiety Disorder, Substance/Medication-Induced Anxiety Disorder, or Anxiety Disorder Due to Another Medical Condition.

In some embodiments, the methods, compounds, and compositions may be used to treat a mood disorder including Obsessive-Compulsive and Related Disorders, e.g., Obsessive-Compulsive Disorder, Body Dysmorphic Disorder, Hoarding Disorder, Trichotillomania (Hair-Pulling Disorder), Excoriation (Skin-Picking) Disorder, Substance/Medication-Induced Obsessive-Compulsive and Related Disorder, or Obsessive-Compulsive and Related Disorder Due to Another Medical Condition.

In some embodiments, the methods, compounds, and compositions may be used to treat a mood disorder including Trauma- and Stressor-Related Disorders, e.g., Reactive Attachment Disorder, Disinhibited Social Engagement Disorder, Posttraumatic Stress Disorder, Acute Stress Disorder, or Adjustment Disorders.

In some embodiments, the methods, compounds, and compositions may be used to treat a mood disorder including Feeding and Eating Disorders, e.g., Anorexia Nervosa, Bulimia Nervosa, Binge-Eating Disorder, Pica, Rumination Disorder, or Avoidant/Restrictive Food Intake Disorder.

In some embodiments, the methods, compounds, and compositions may be used to treat a mood disorder including Neurocognitive Disorders, e.g., Delirium, Major Neurocognitive Disorder, Mild Neurocognitive Disorder, Major or Mild Neurocognitive Disorder Due to Alzheimer's Disease, Major or Mild Frontotemporal Neurocognitive Disorder, Major or Mild Neurocognitive Disorder With Lewy Bodies, Major or Mild Vascular Neurocognitive Disorder, Major or Mild Neurocognitive Disorder Due to Traumatic Brain Injury, Substance/Medication-Induced Major or Mild Neurocognitive Disorder, Major or Mild Neurocognitive Disorder Due to HIV Infection, Major or Mild Neurocognitive Disorder Due to Prion Disease, Major or Mild Neurocognitive Disorder Due to Parkinson's Disease, Major or Mild Neurocognitive Disorder Due to Huntington's Disease, Major or Mild Neurocognitive Disorder Due to Another Medical Condition, or Major or Mild Neurocognitive Disorder Due to Multiple Etiologies.

In some embodiments, the methods, compounds, and compositions may be used to treat a mood disorder including Neurodevelopmental Disorders, e.g., Autism Spectrum Disorder, Attention-Deficit/Hyperactivity Disorder, Stereotypic Movement Disorder, Tic Disorders, Tourette's Disorder, Persistent (Chronic) Motor or Vocal Tic Disorder, or Provisional Tic Disorder.

In some embodiments, the methods, compounds, and compositions may be used to treat a mood disorder including Personality Disorders, e.g., Borderline Personality Disorder.

In some embodiments, the methods, compounds, and compositions may be used to treat a mood disorder including Sexual Dysfunctions, e.g., Delayed Ejaculation, Erectile Disorder, Female Orgasmic Disorder, Female Sexual Interest/Arousal Disorder, Genito-Pelvic Pain/Penetration Disorder, Male Hypoactive Sexual Desire Disorder, Premature (Early) Ejaculation, or Substance/Medication-Induced Sexual Dysfunction.

In some embodiments, the methods, compounds, and compositions may be used to treat a mood disorder including Gender Dysphoria, e.g., Gender Dysphoria.

Also provided herein is a method of treating a mood disorder comprising administering to a subject in need thereof an effective amount of a phenalkylamine selected from the group consisting of:

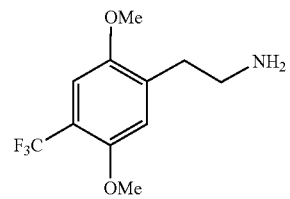

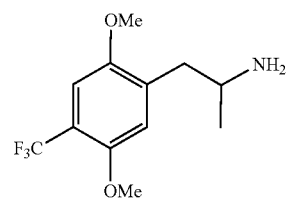

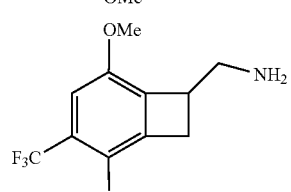

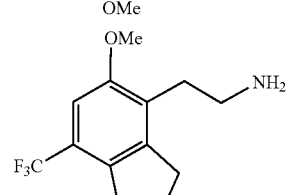

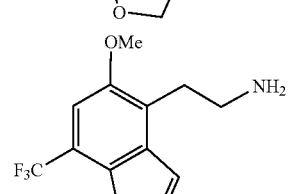

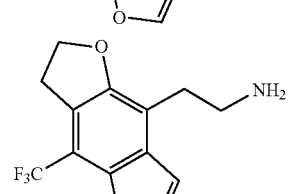

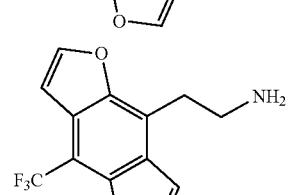

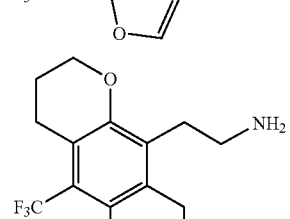

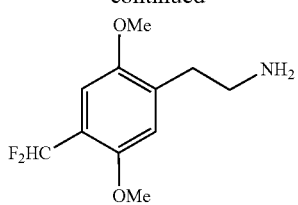
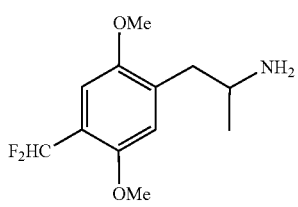
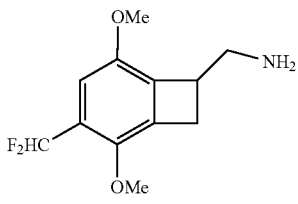
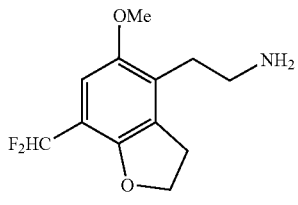
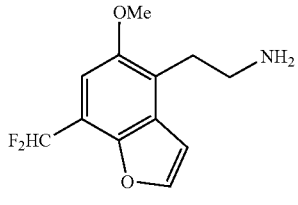
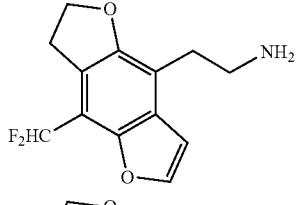
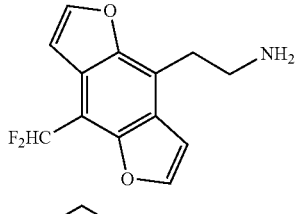
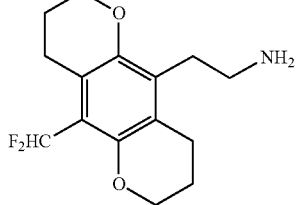
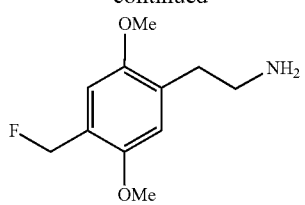
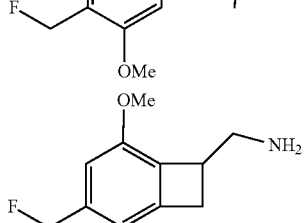
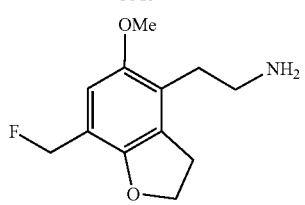
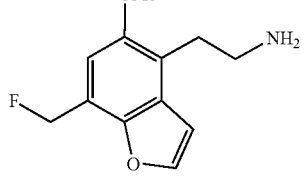
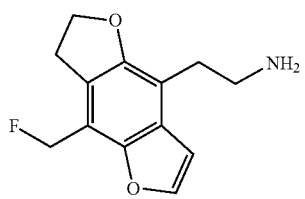
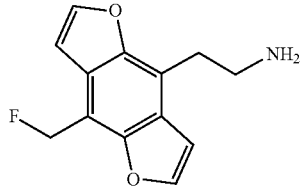
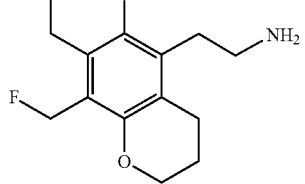

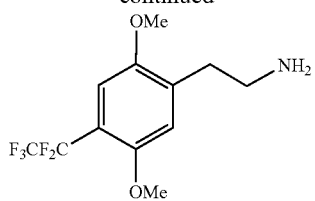
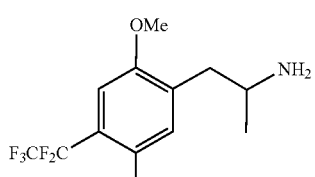
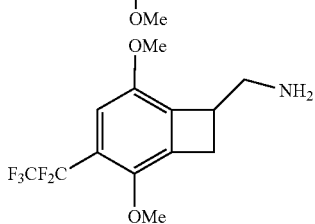
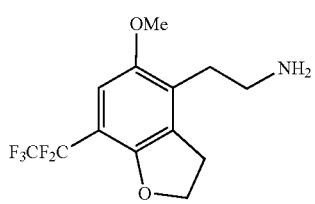
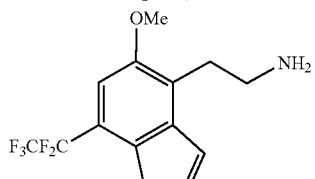
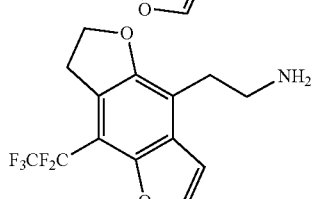
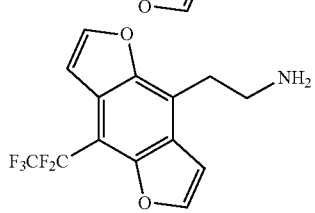
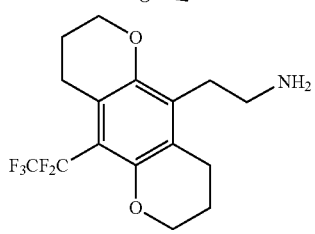
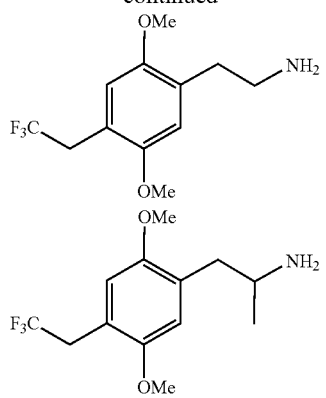
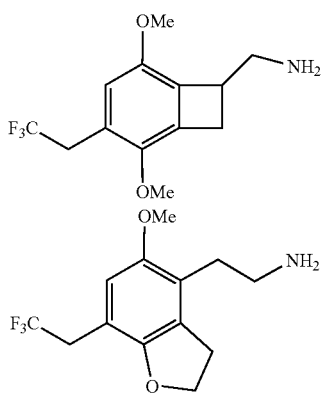
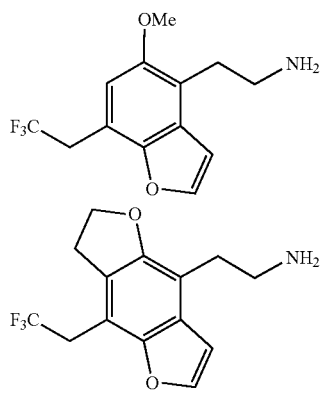
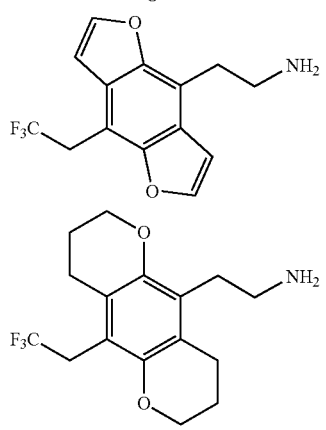

-continued
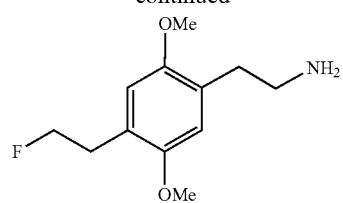
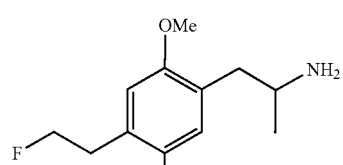
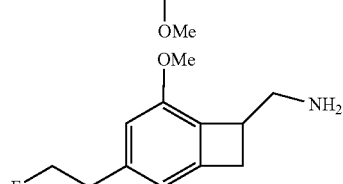
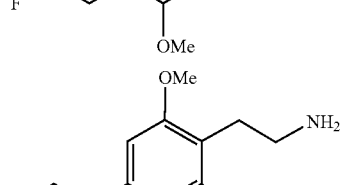
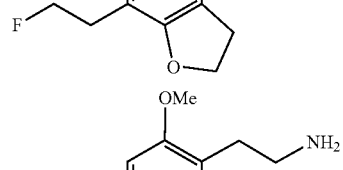
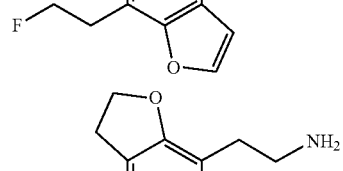
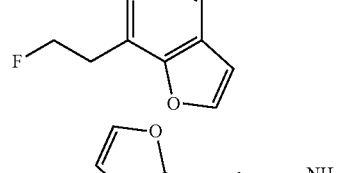
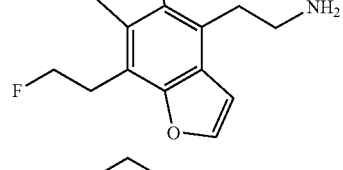
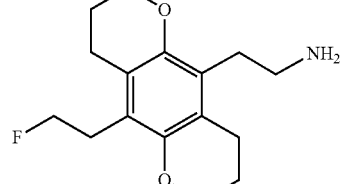
or a pharmaceutically acceptable salt thereof.
Also provided herein is a method of treating a mood disorder comprising administering to a subject in need thereof an effective amount of a phenalkylamine selected from the group consisting of:

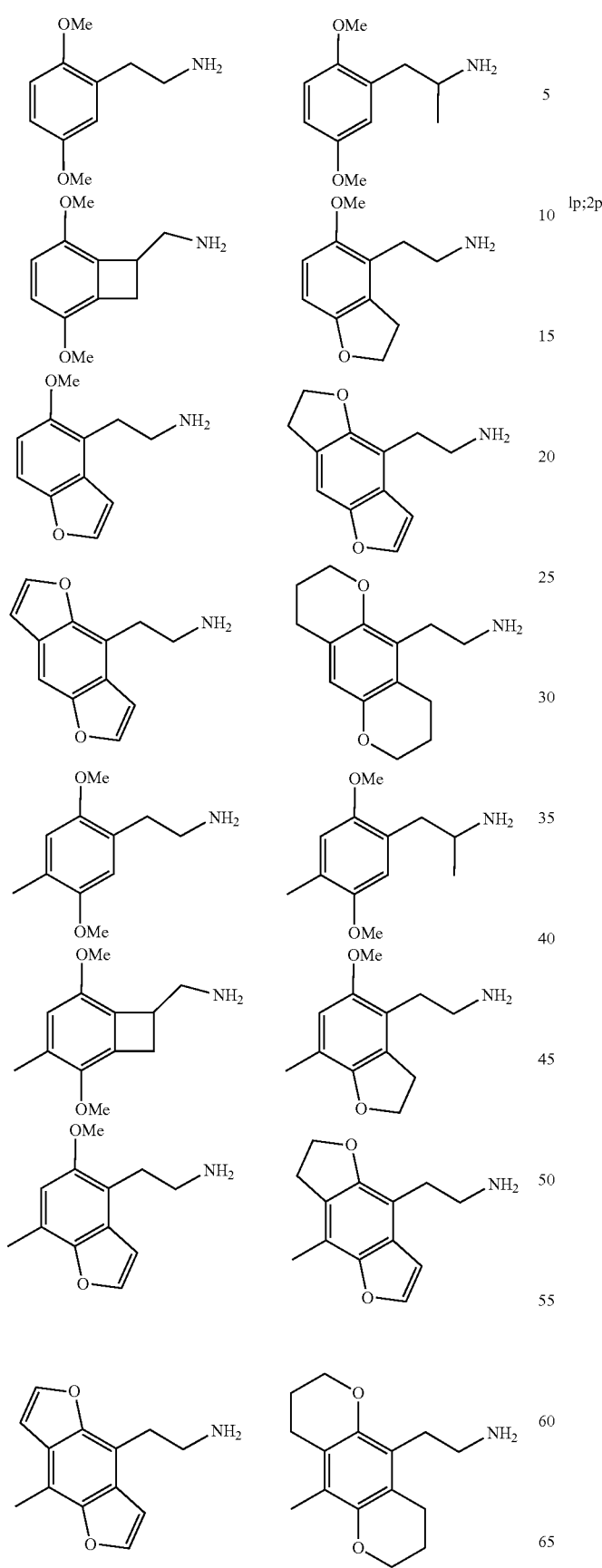
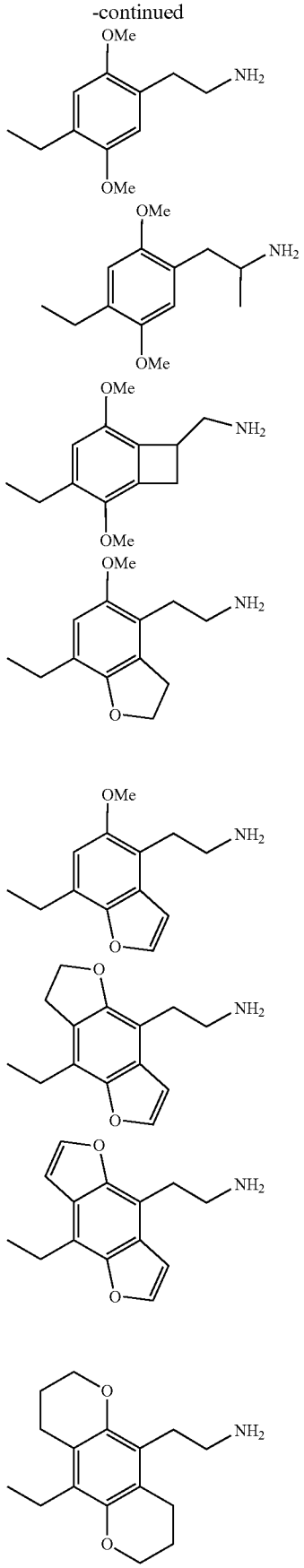

-continued
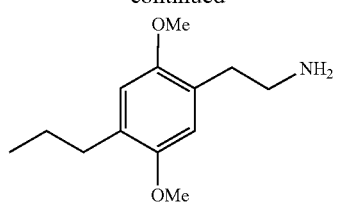
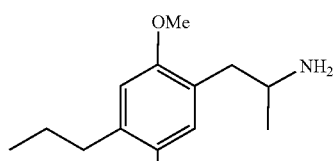
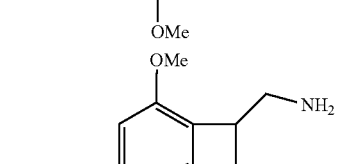
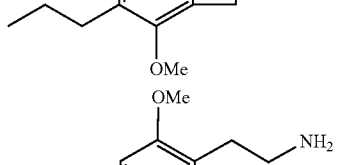
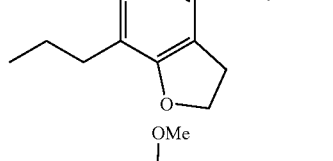
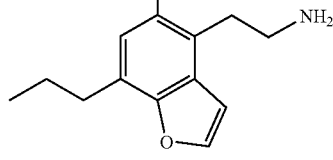
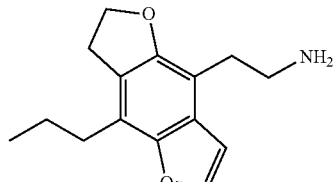
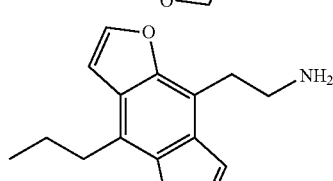
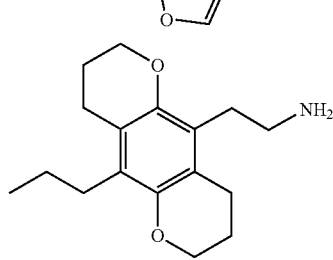
-continued
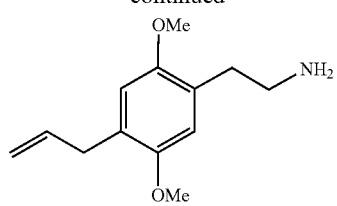
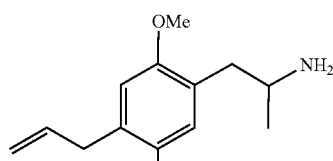
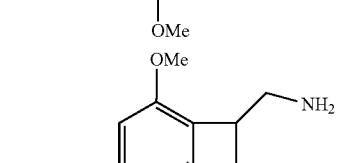
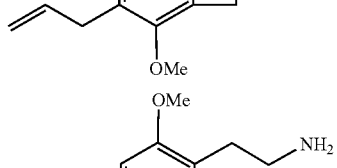
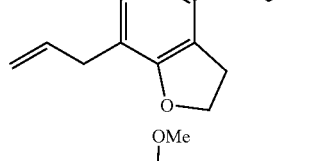
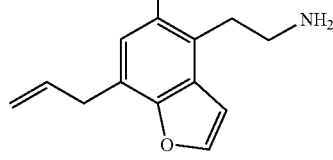
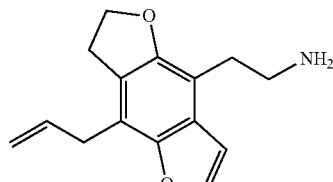
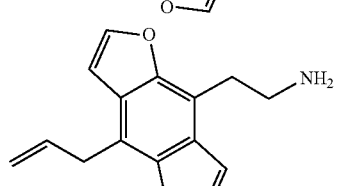
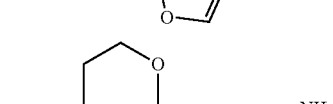

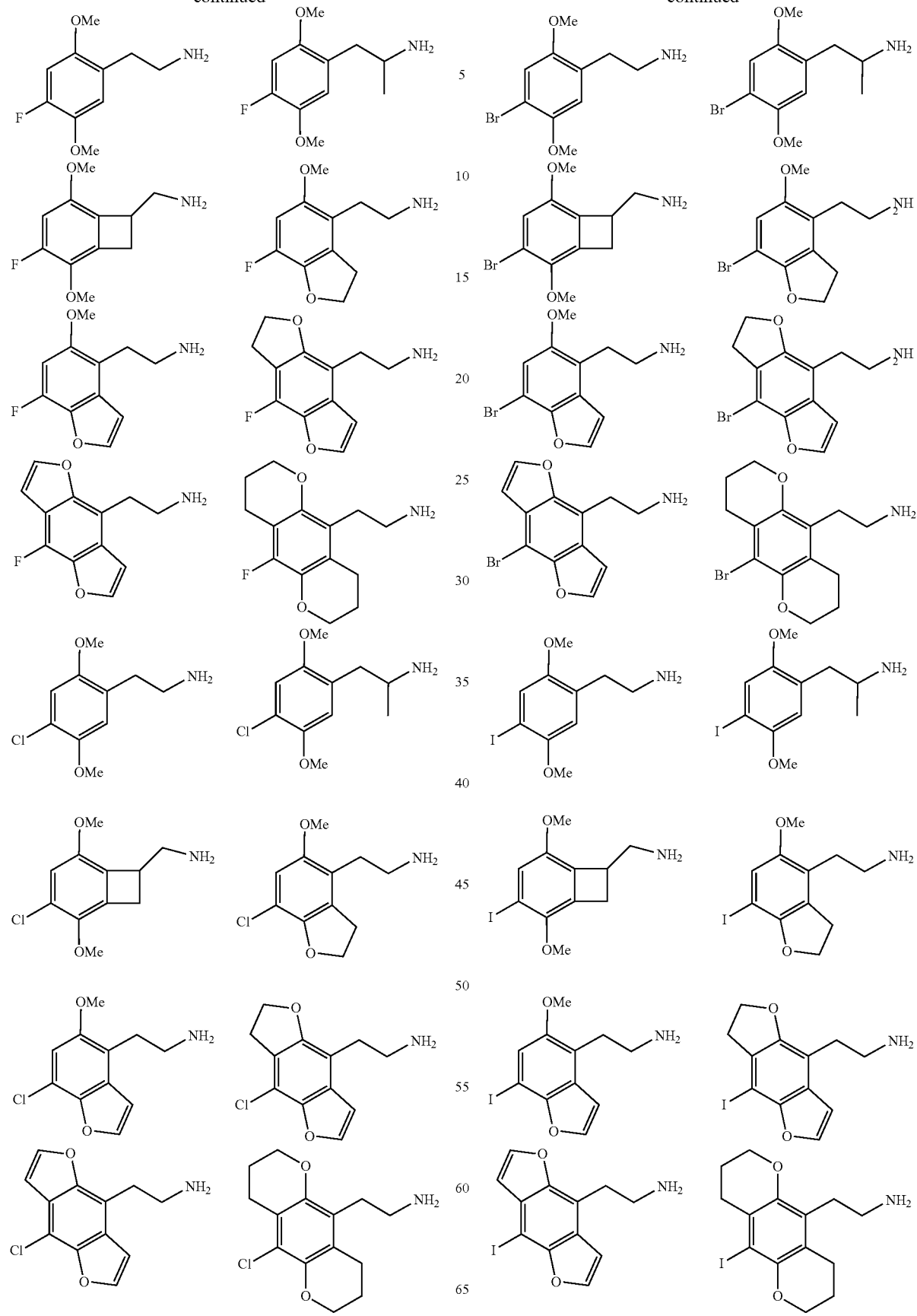

21
-continued
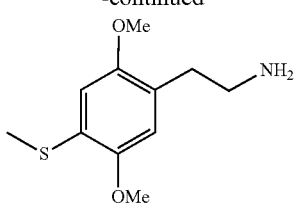
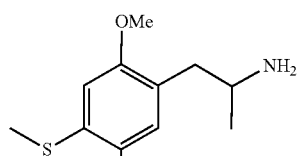
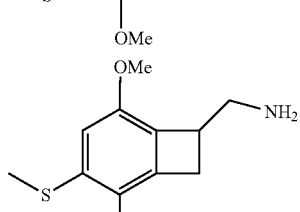
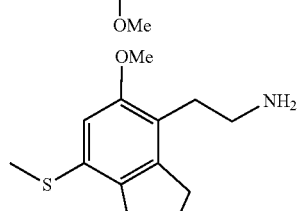
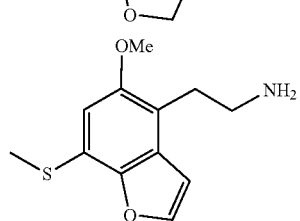
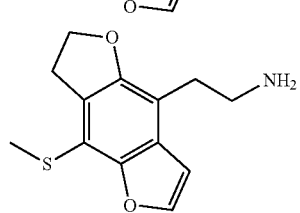
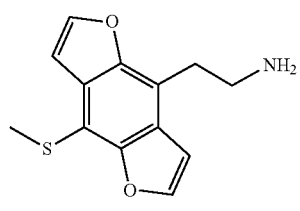
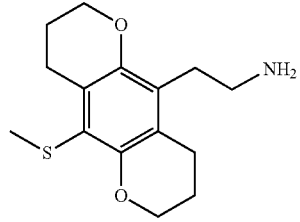
22
-continued
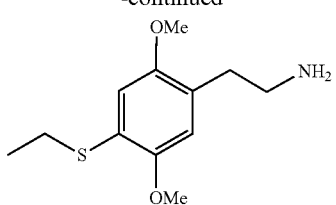
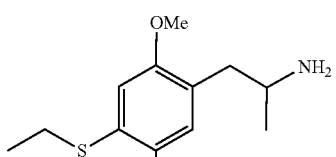
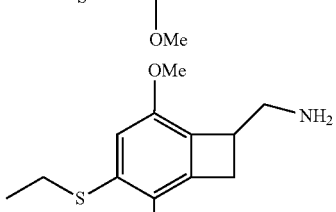
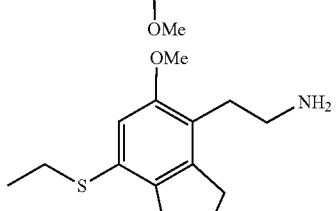
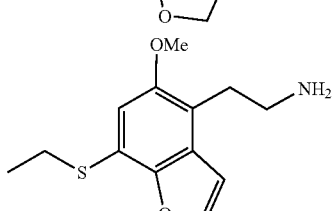
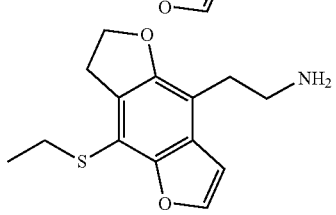
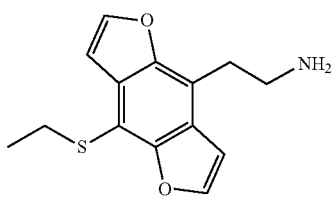
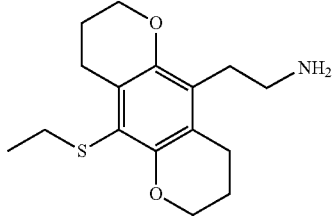

-continued
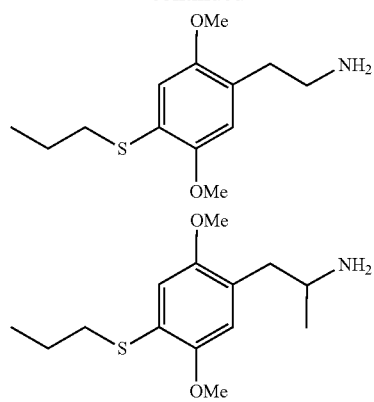
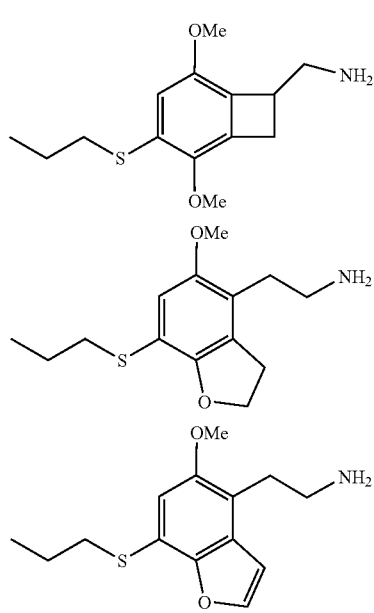
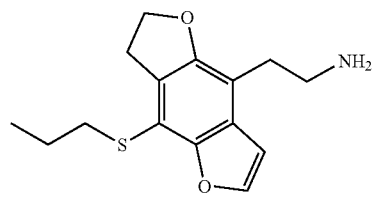
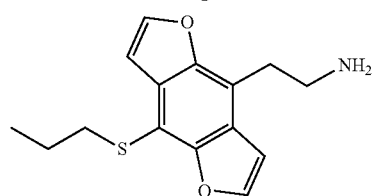
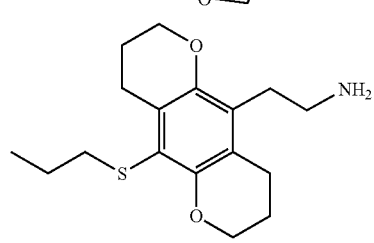
-continued
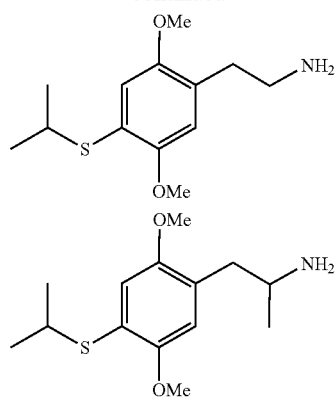
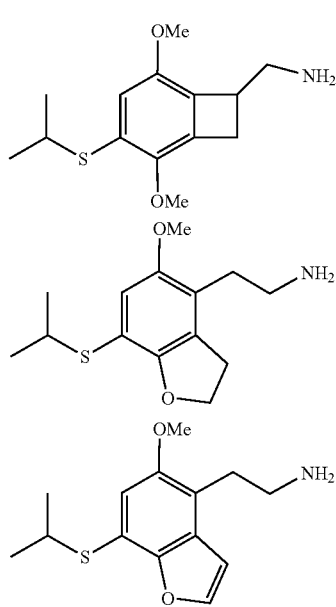
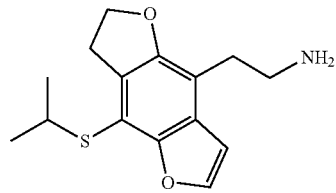
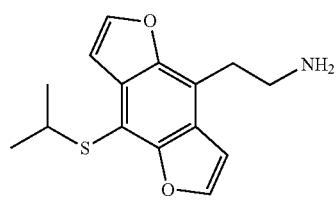
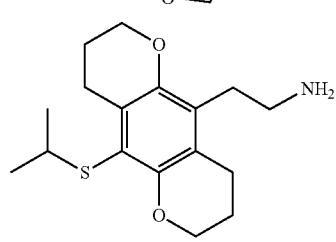

-continued
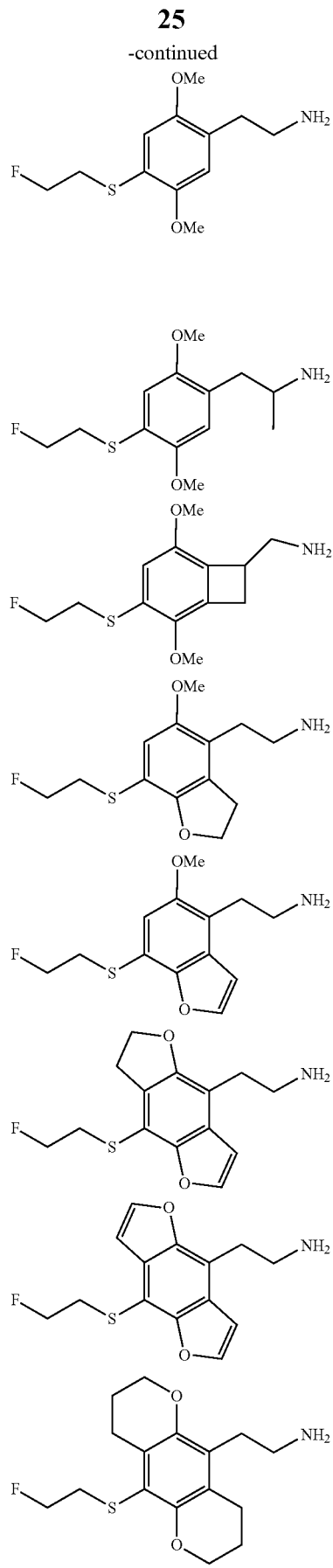
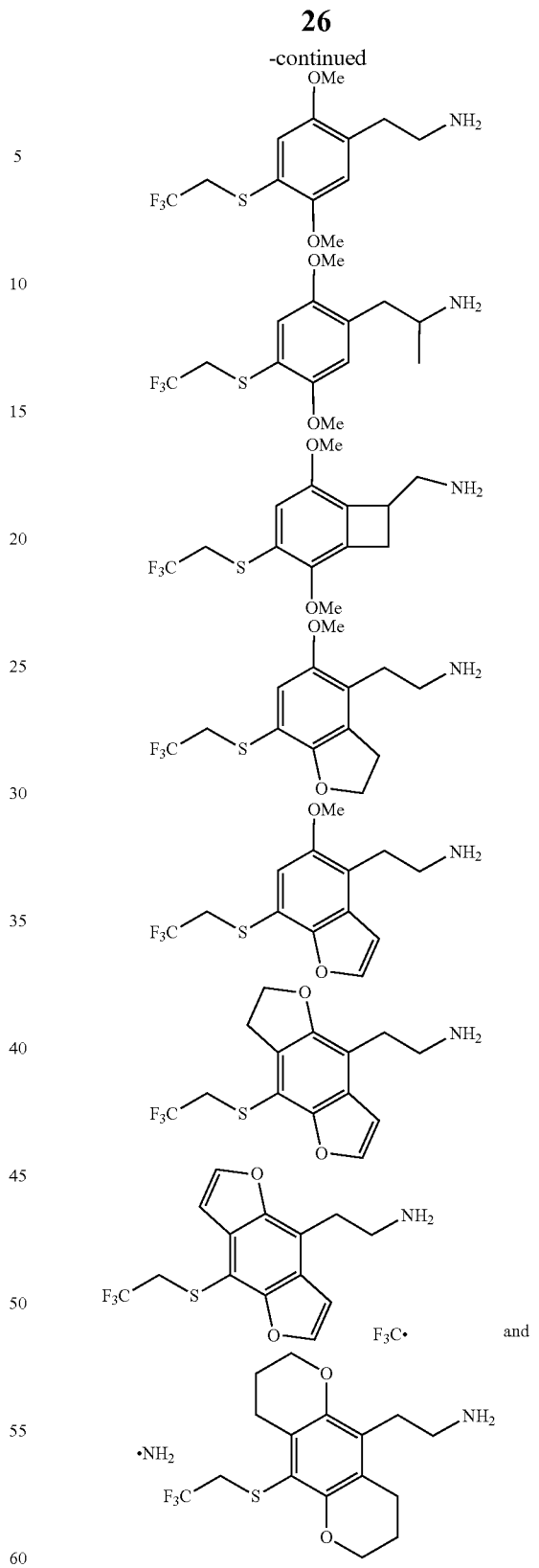
or a pharmaceutically acceptable salt thereof.
Also provided herein is a method of treating a mood disorder comprising administering to a subject in need thereof an effective amount of a phenalkylamine selected from the group consisting of:

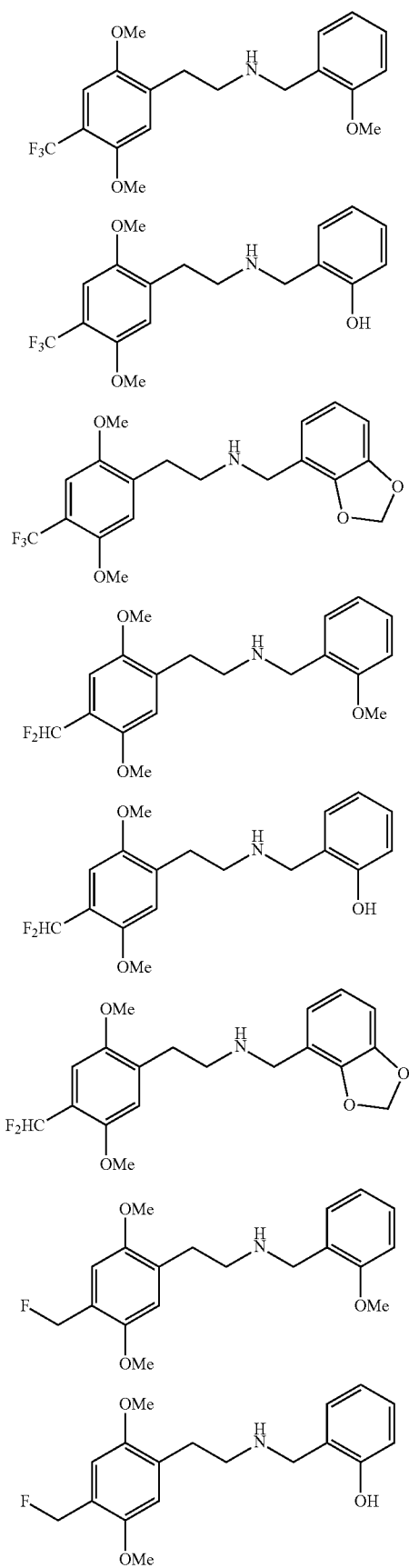
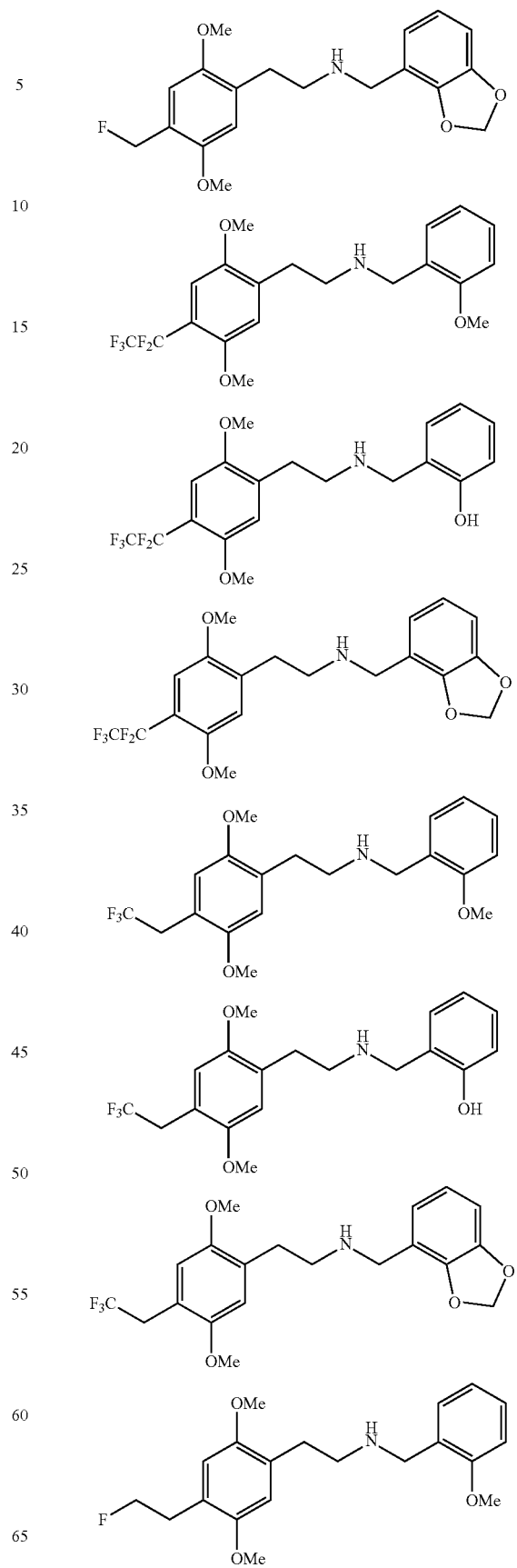

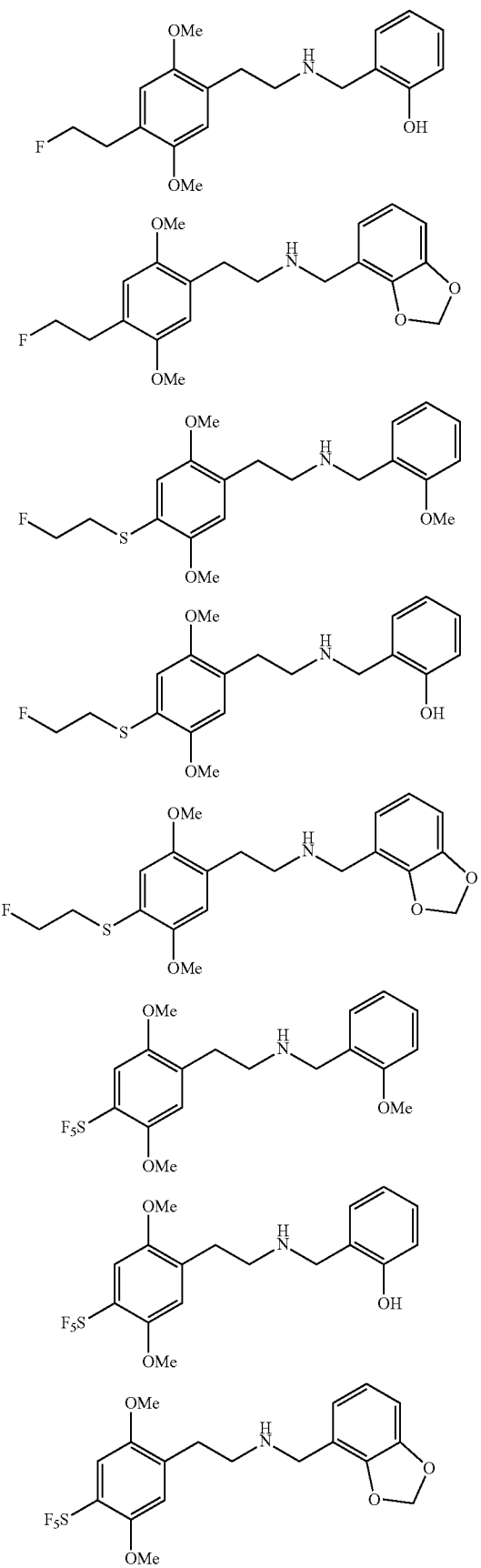
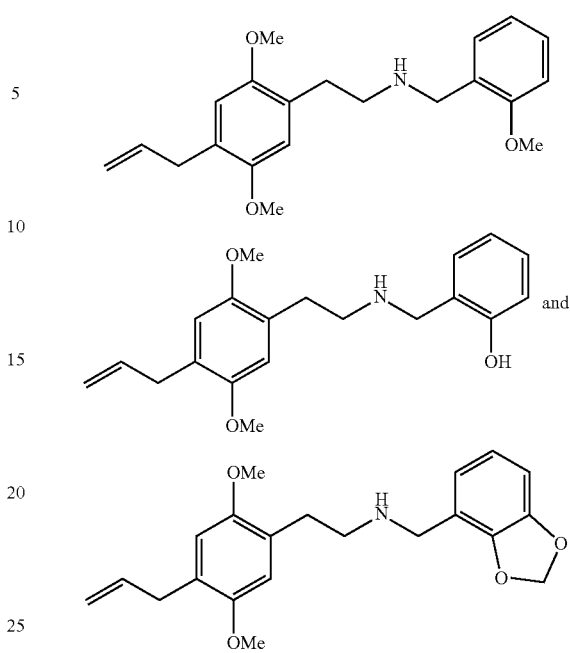
or a pharmaceutically acceptable salt thereof.
Also provided herein is a method of treating a mood disorder comprising administering to a subject in need thereof an effective amount of a phenalkylamine selected from the group consisting of:
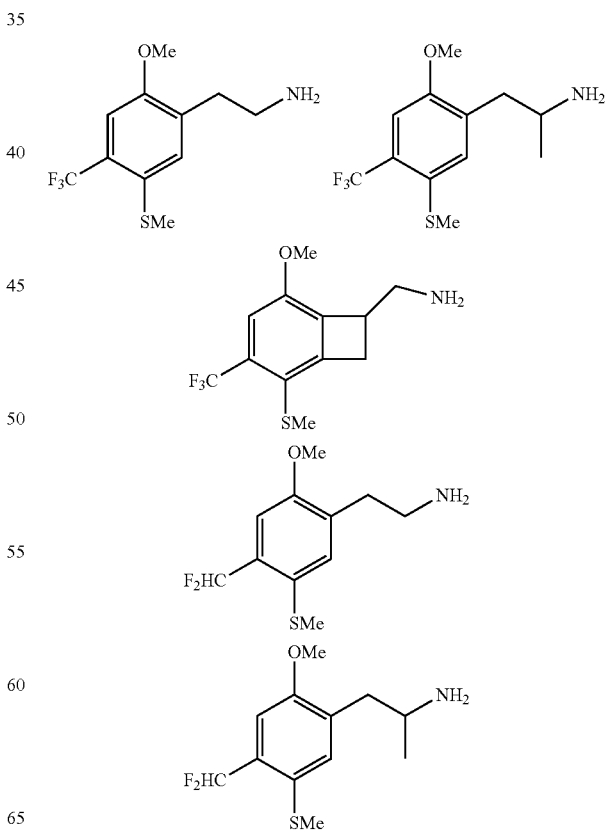

-continued
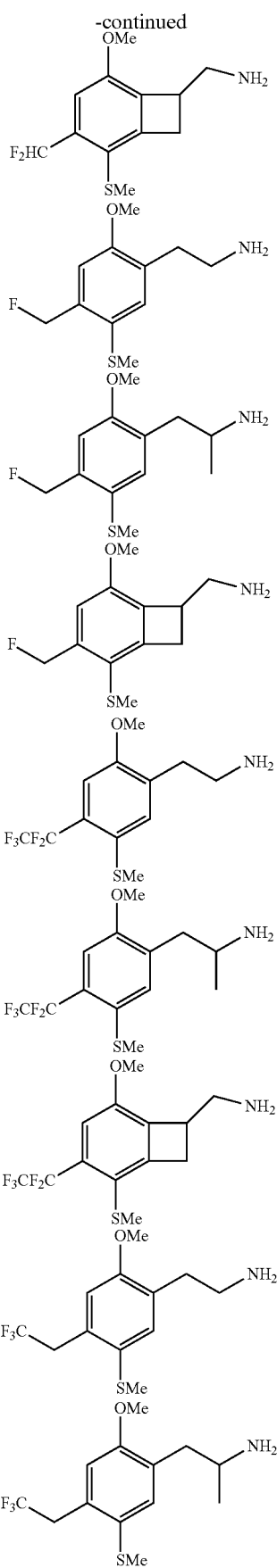
-continued
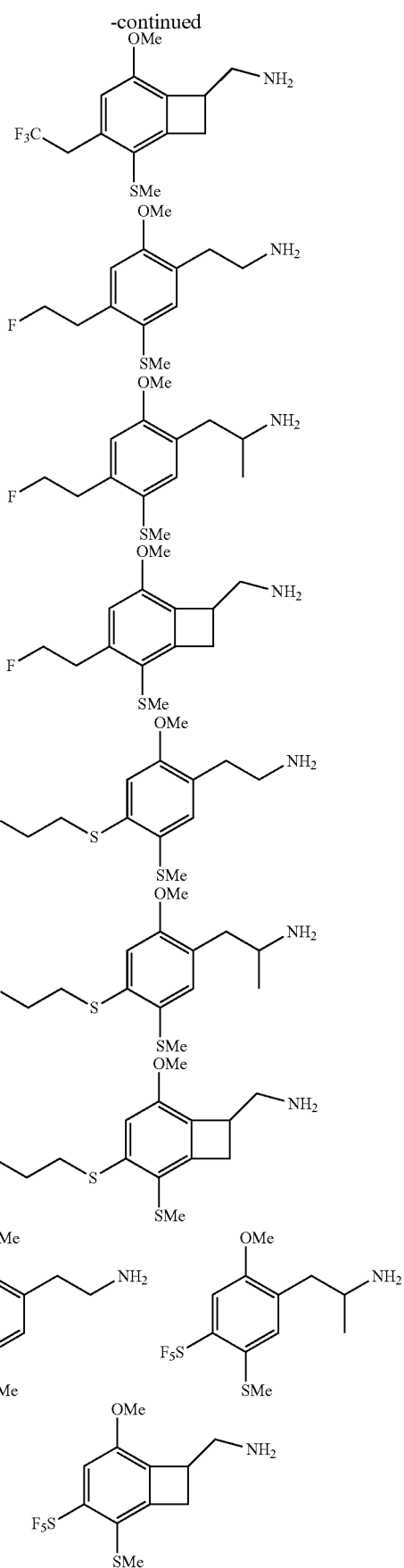

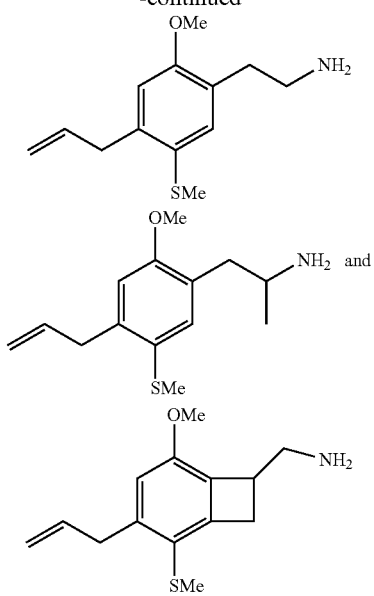
or a pharmaceutically acceptable salt thereof.
Also provided herein is a method of treating a mood disorder comprising administering to a subject in need thereof an effective amount of a phenalkylamine selected from the group consisting of:
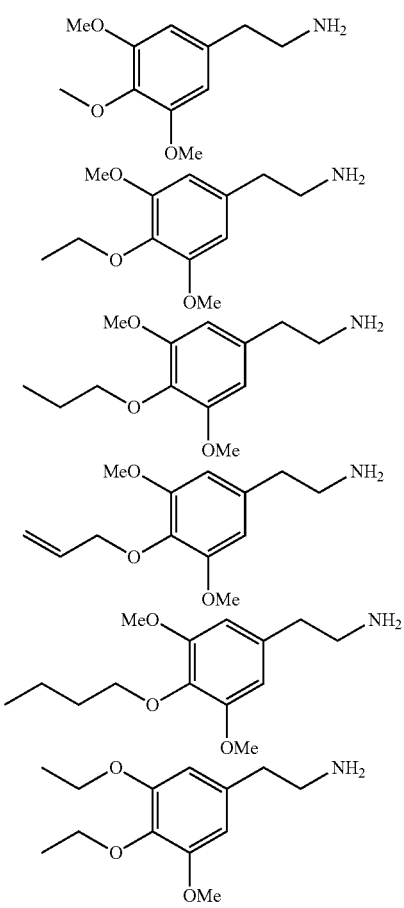
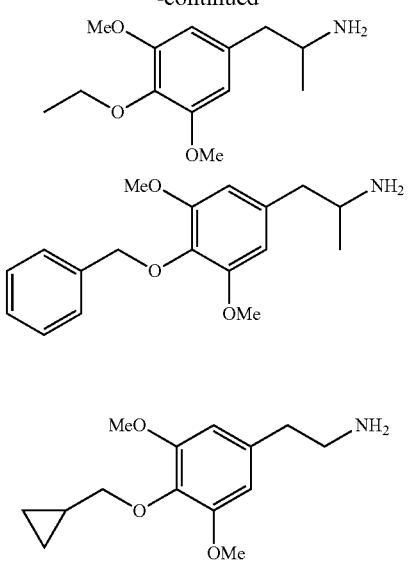
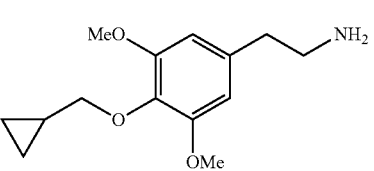
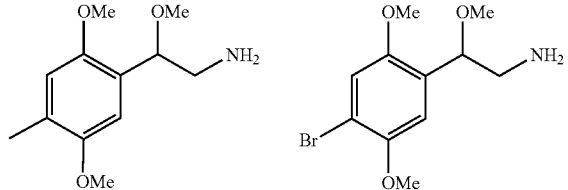
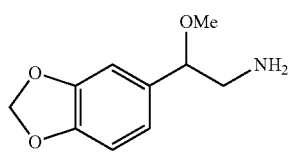
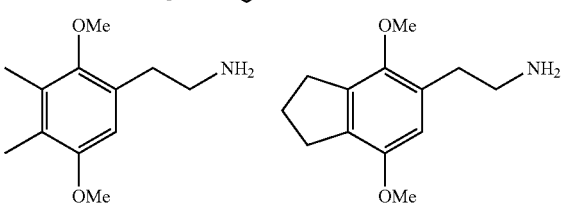
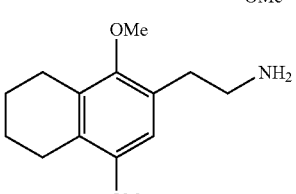

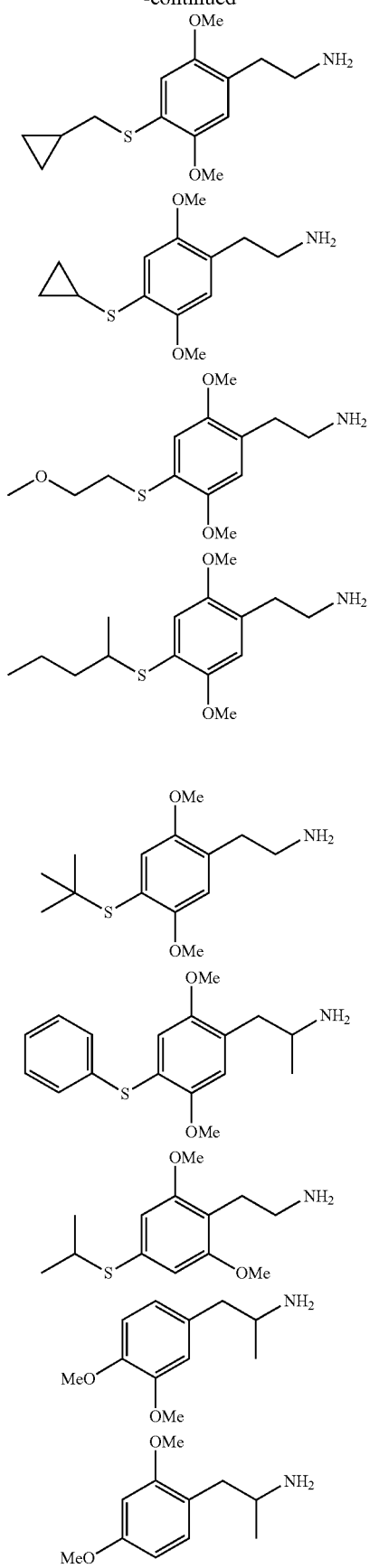
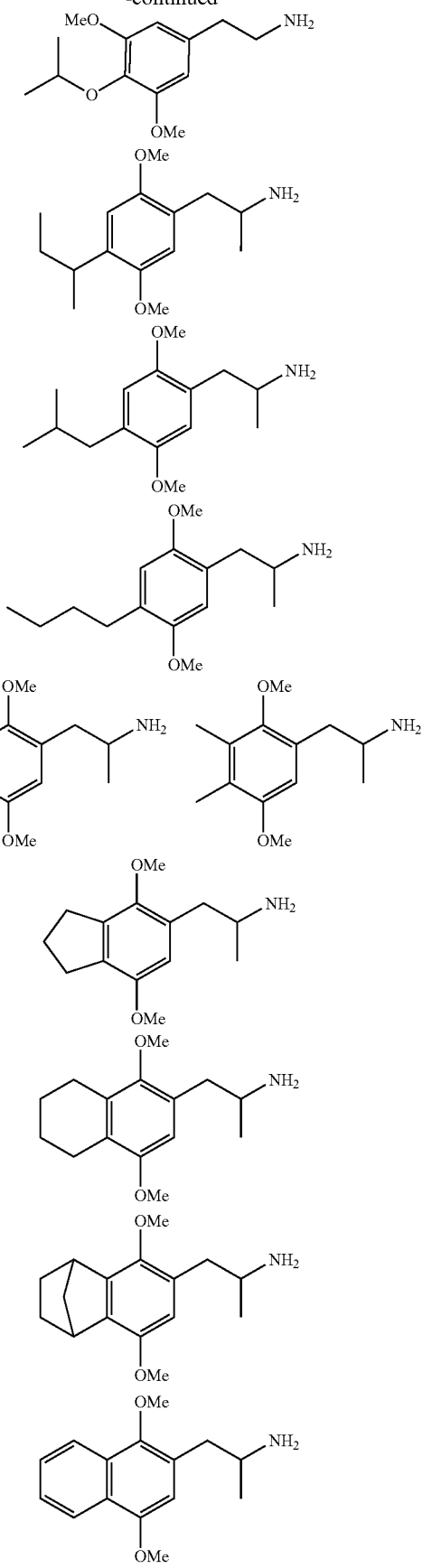

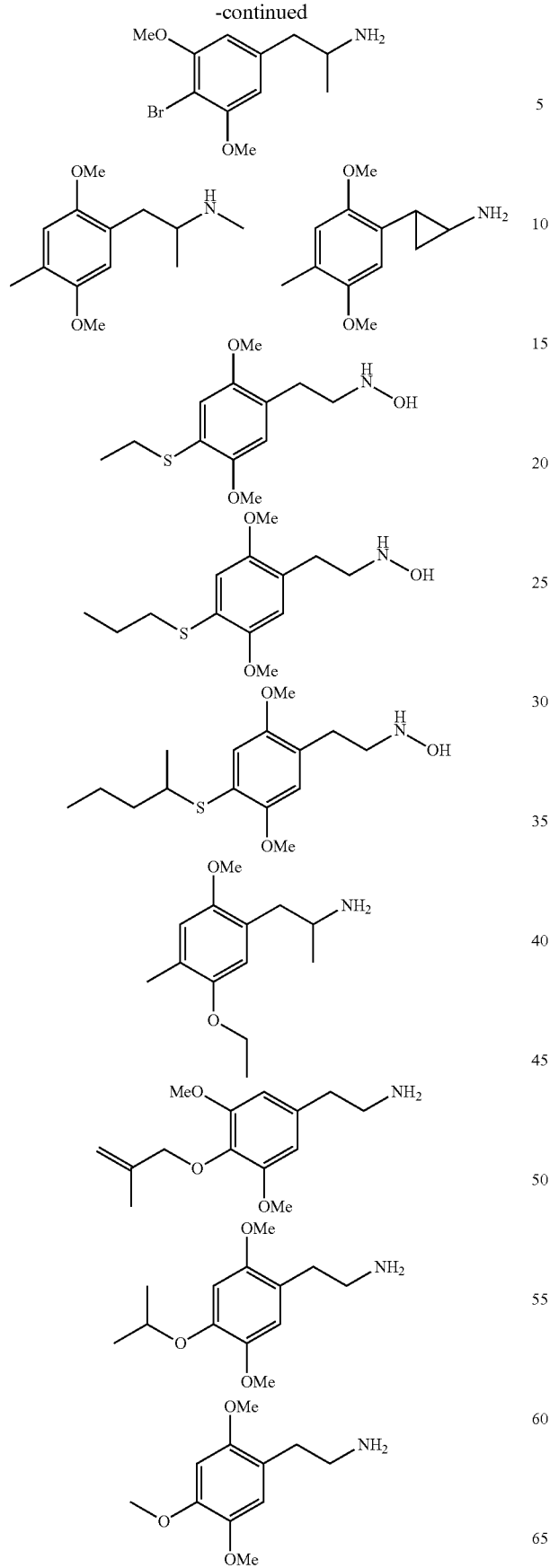
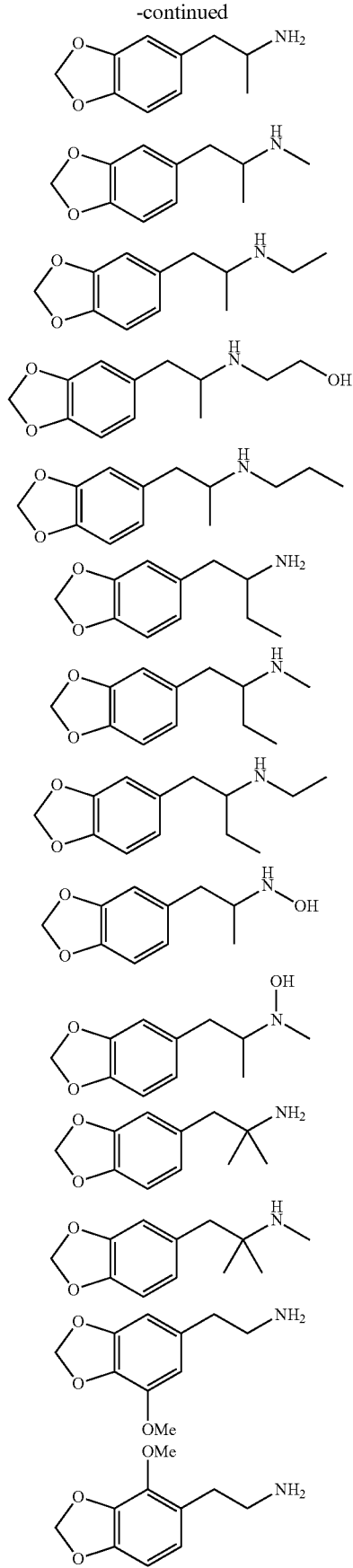

-continued
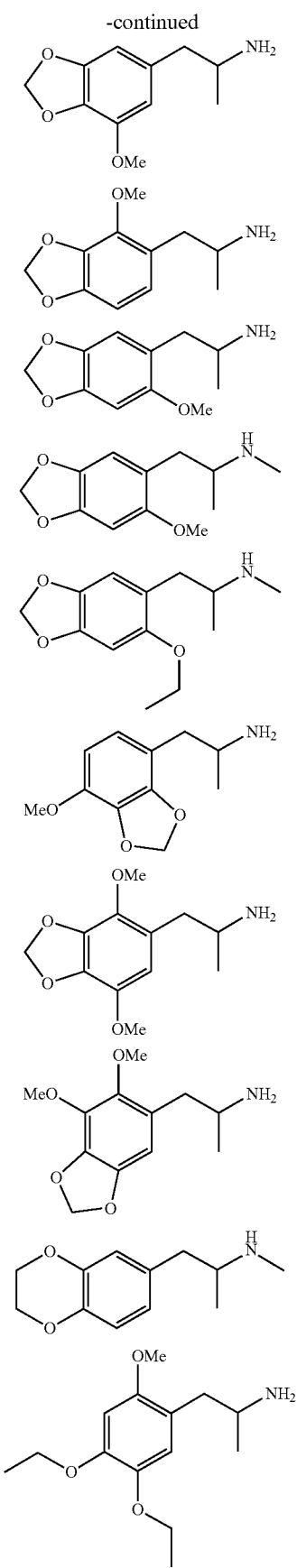
-continued
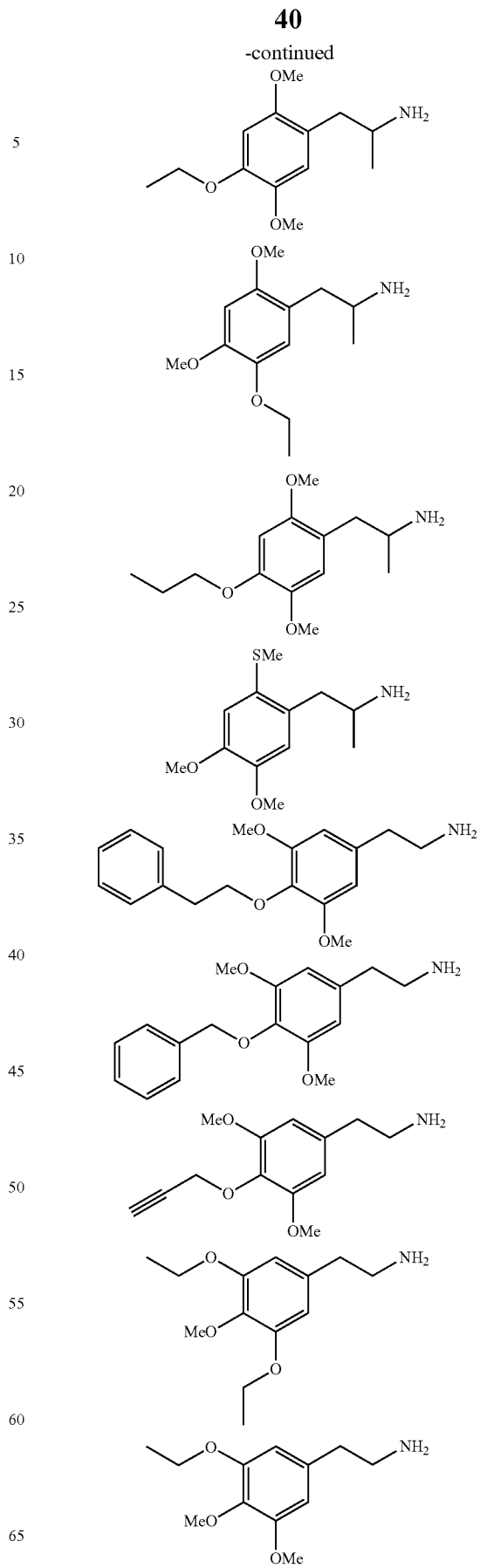

-continued
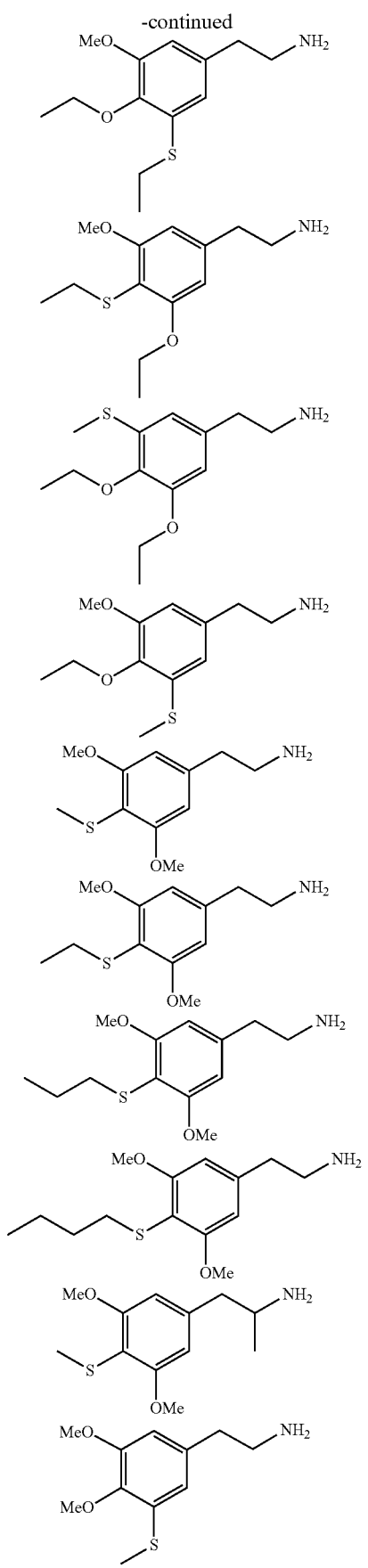
-continued
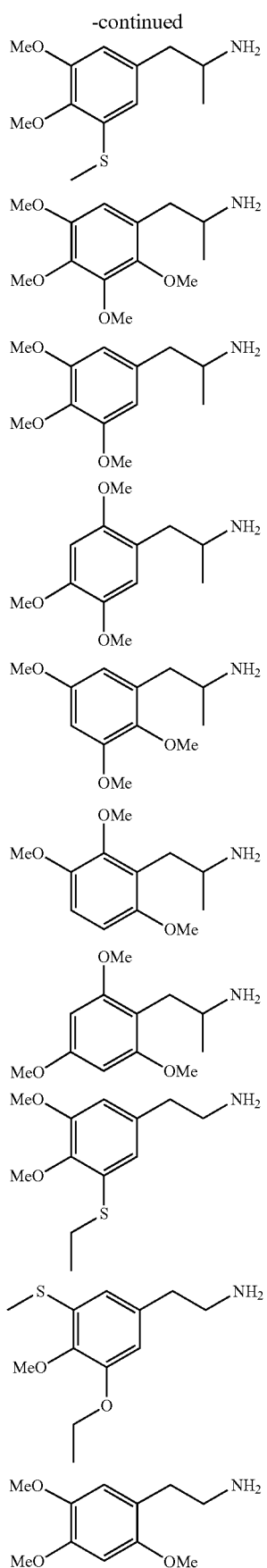

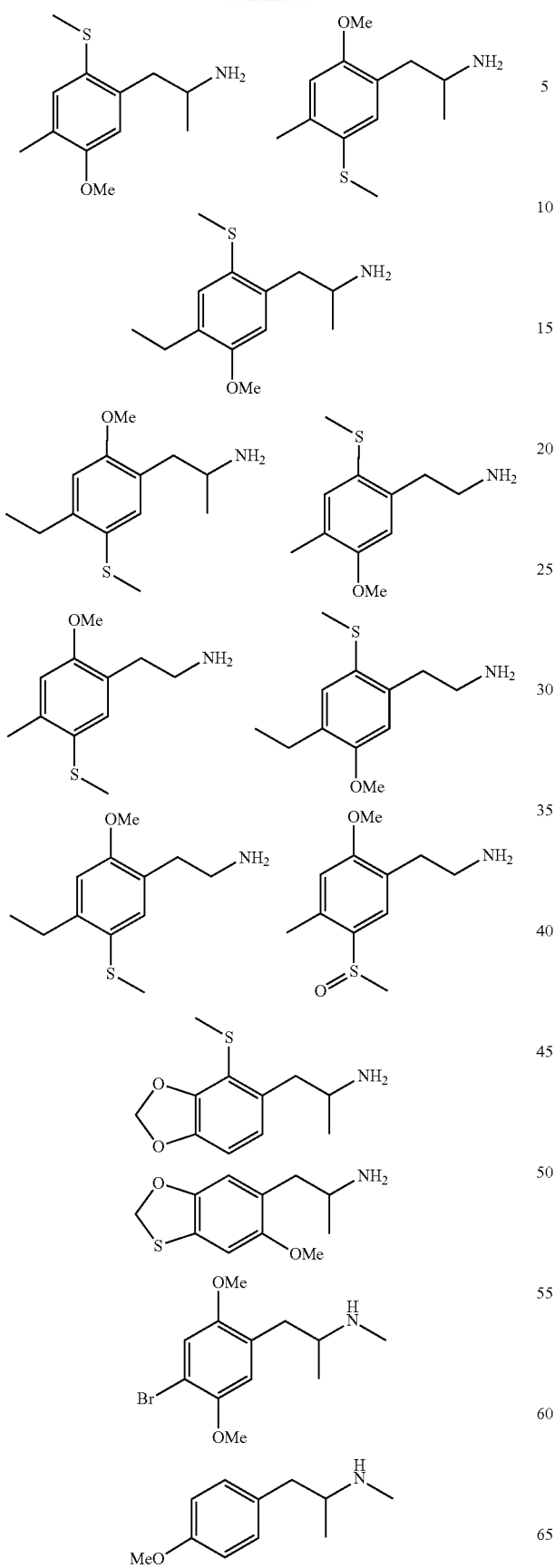
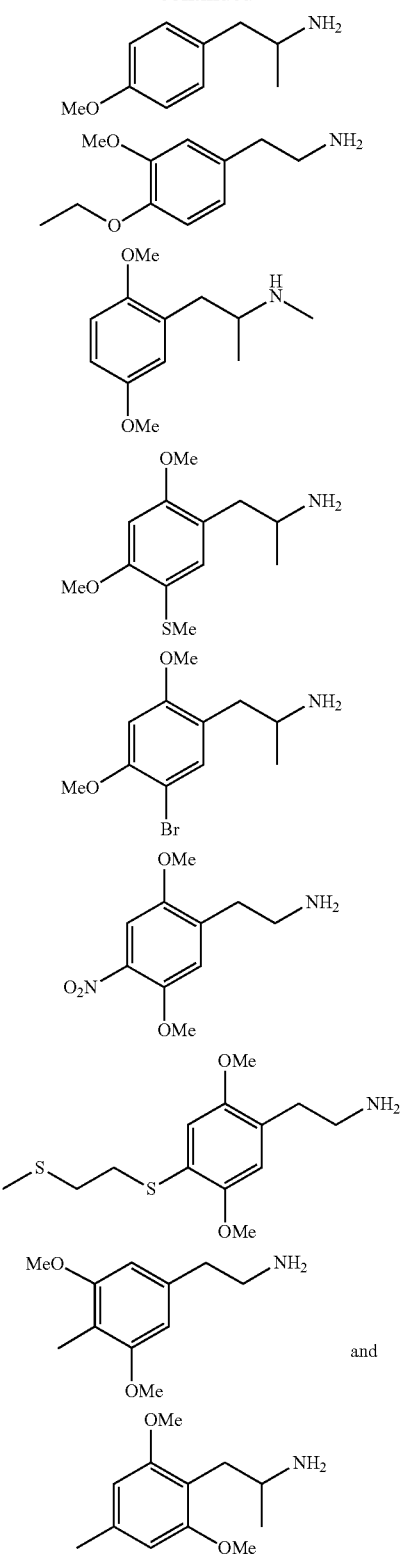
or a pharmaceutically acceptable salt thereof.
Also provided herein is a method of treating a mood disorder comprising administering to a subject in need thereof an effective amount of a phenalkylamine selected from the group consisting of:

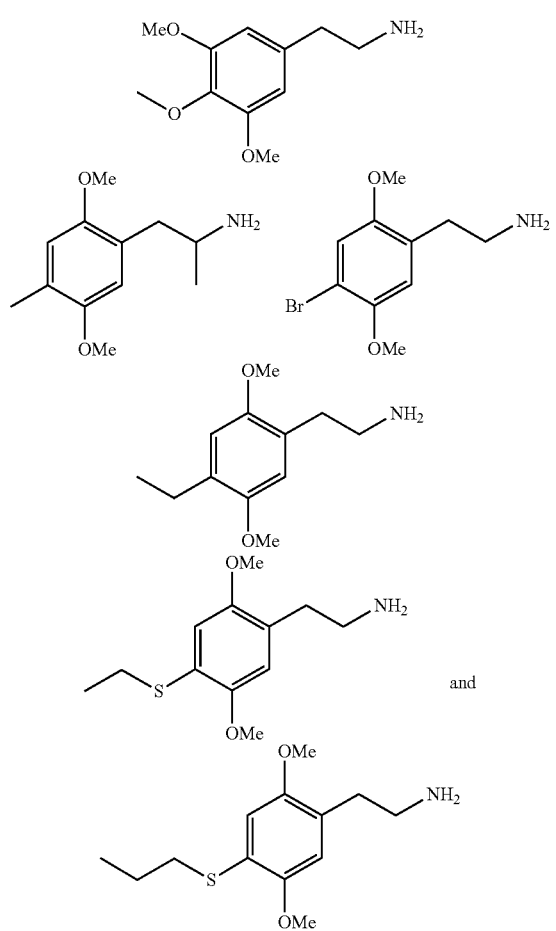
or a pharmaceutically acceptable salt thereof.
Also provided herein is a method of treating a mood disorder comprising administering to a subject in need thereof an effective amount of a phenalkylamine selected from the group consisting of:
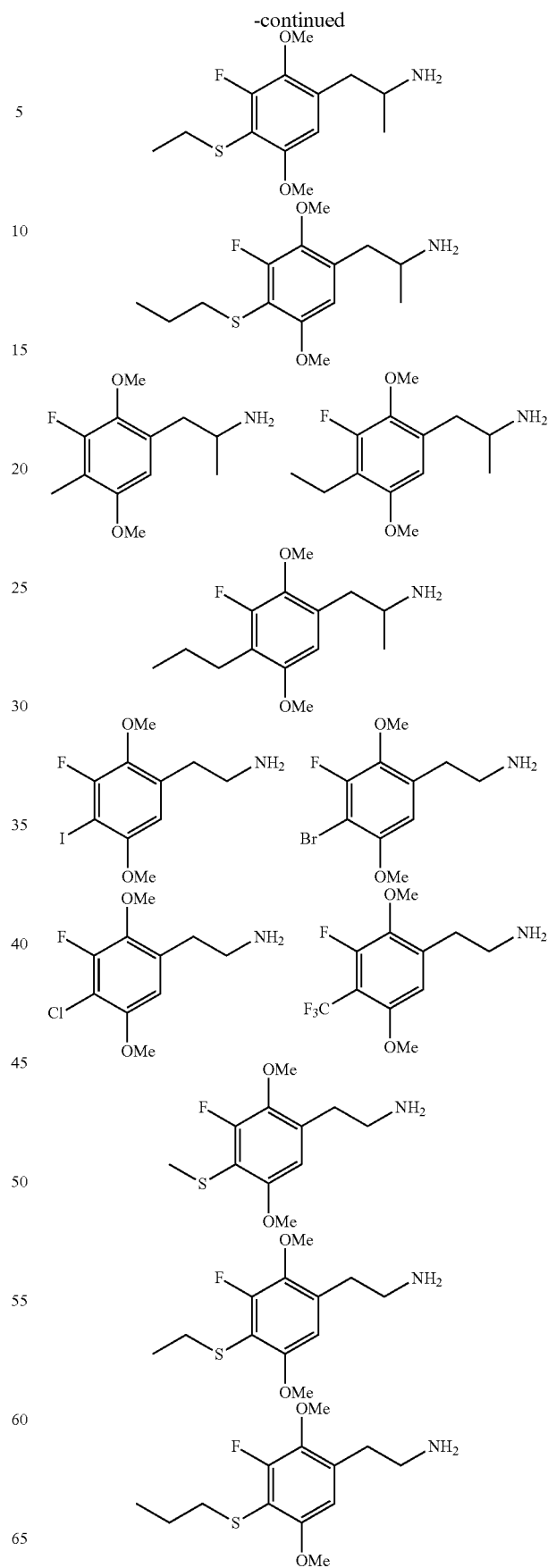

-continued or a pharmaceutically acceptable salt thereof.

Also provided herein is a method of treating a mood disorder comprising administering to a subject in need thereof an effective amount of a phenalkylamine selected from the group consisting of:

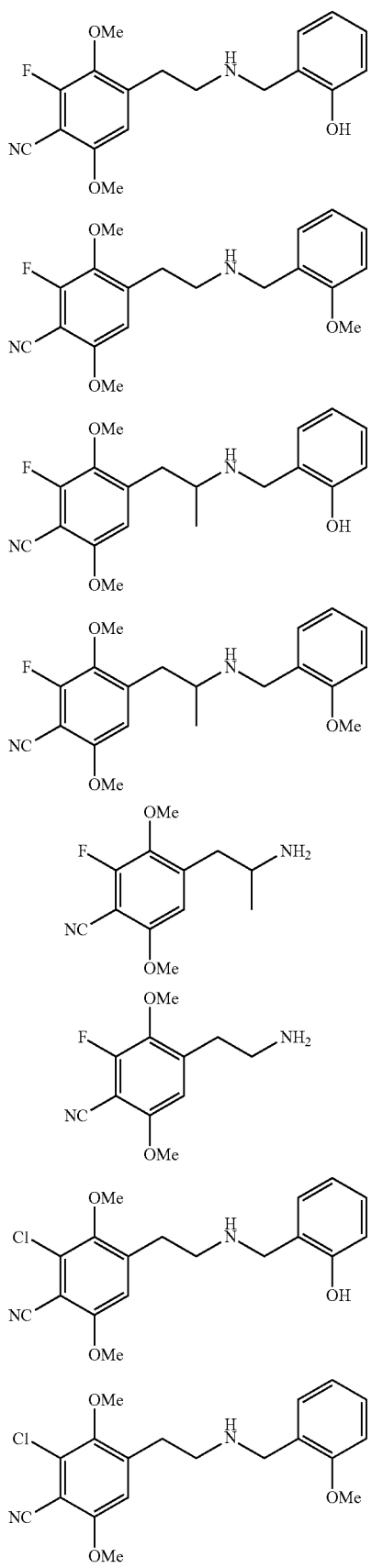

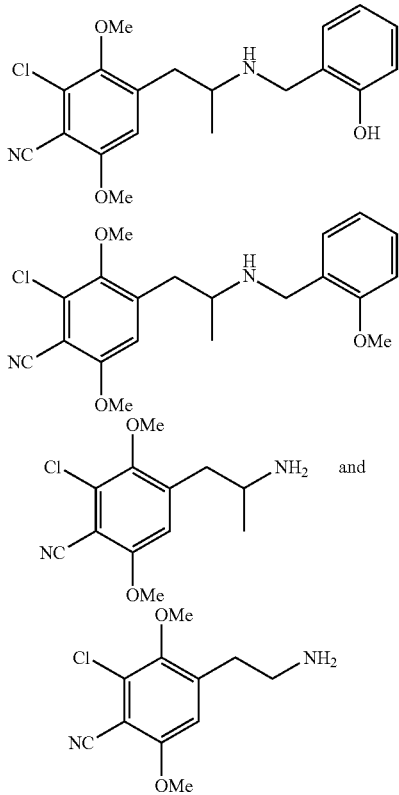

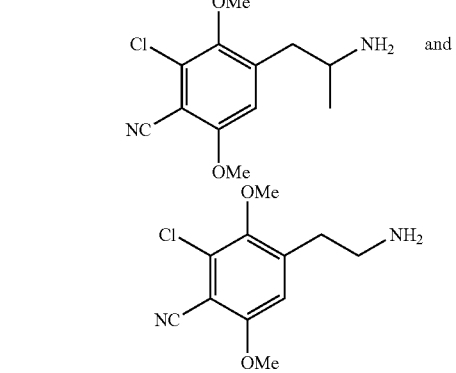

or a pharmaceutically acceptable salt thereof.

Also provided herein is a method of treating a mood disorder comprising administering to a subject in need thereof an effective amount of a phenalkylamine having the general Formula I:

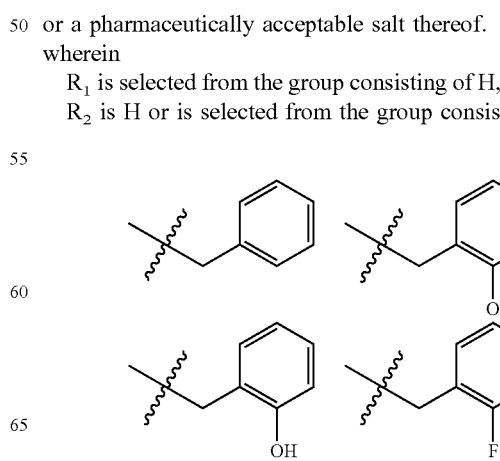

Formula I or a pharmaceutically acceptable salt thereof.
wherein
$R_1$ is selected from the group consisting of H, Me, and Et;
$R_2$ is H or is selected from the group consisting of:

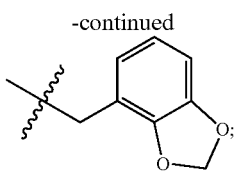

R₃ is selected from the group consisting of F, Cl, Br, I, Me, Et, n-Pr, i-Pr, —CCH (ethynyl), —CH₂CHCH₂ (allyl), —CN, CF₃, OCF₃, OMe, OEt, SMe, SEt, and NO₂;

R₄ is selected from the group consisting of F, Cl, Br, I, CF₃, SF₅, C1-C5 alkyl, C2-C5 alkenyl, $C_2$-$C_5$ alkynyl, $C_1$-$C_5$ halo-alkyl, —O($C_1$-$C_5$ alkyl), and —S($C_1$-$C_5$ alkyl).

Also provided herein is a method of treating a mood disorder comprising administering to a subject in need thereof an effective amount of a phenalkylamine having the following structures:

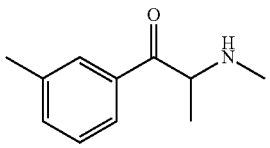

or a pharmaceutically acceptable salt thereof.

In other embodiments provided are methods and compositions for treating migraine or cluster headache by administering to a patient in need thereof a phenalkylamine selected from any of the above phenalkylamines.

In some embodiments, the terms "effective amount" or "therapeutically effective amount" refer to an amount of a compound, material, composition, medicament, or other material that is effective to achieve a particular pharmacological and/or physiologic effect including but not limited to reducing the frequency or severity of sadness or lethargy, depressed mood, anxious or sad feelings, diminished interest in all or nearly all activities, significant increased or decreased appetite leading to weight gain or weight loss, insomnia, irritability, fatigue, feelings of worthlessness, feelings of helplessness, inability to concentrate, and recurrent thoughts of death or suicide, or to provide a desired pharmacologic and/or physiologic effect, for example, reducing, inhibiting, or reversing one or more of the underlying pathophysiological mechanisms underlying neurological dysfunction, modulating dopamine levels or signaling, modulating serotonin levels or signaling, modulating norepinephrine levels or signaling, modulating glutamate or GABA levels or signaling, modulating synaptic connectivity or neurogenesis in certain brain regions, or a combination thereof. The precise dosage will vary according to a variety of factors such as subject-dependent variables (e.g., age, immune system health, clinical symptoms etc.), the disease or disorder being treated, as well as the route of administration and the pharmacokinetics of the agent being administered.

In some embodiments, methods include treating a mood disorder, e.g., a depressive disorder, by administering to a patient in need thereof a pharmaceutical composition including about 0.01 mg to about 400 mg of a phenalkylamine (e.g., Compound 1, 2C-TFM, or pharmaceutically acceptable salts thereof). In some embodiments, doses may be, e.g., in the range of about 0.01 to 400 mg, 0.01 to 300 mg, 0.01 to 250 mg, 0.01 to 200 mg, 0.01 to 150 mg, 0.01 to 100 mg, 0.01 to 75 mg, 0.01 to 50 mg, 0.01 to 25 mg, 0.01 to 20 mg, 0.01 to 15 mg, 0.01 to 10 mg, 0.01 to 5 mg, 0.01 to 1 mg, 0.01 to 0.5 mg, 0.01 to 0.1 mg, 0.1 to 400 mg, 0.1 to 300 mg, 0.1 to 250 mg, 0.1 to 200 mg, 0.1 to 150 mg, 0.1 to 100 mg, 0.1 to 75 mg, 0.1 to 50 mg, 0.1 to 25 mg, 0.1 to 20 mg, 0.1 to 15 mg, 0.1 to 10 mg, 0.1 to 5 mg, 0.1 to 1 mg, 10 to 400 mg, 10 to 300 mg, 10 to 250 mg, 10 to 200 mg, 10 to 150 mg, 10 to 100 mg, 10 to 50 mg, 10 to 25 mg, 10 to 15 mg, 20 to 400 mg, 20 to 300 mg, 20 to 250 mg, 20 to 200 mg, 20 to 150 mg, 20 to 100 mg, 20 to 50 mg, 50 to 400 mg, 50 to 300 mg, 50 to 250 mg, 50 to 200 mg, 50 to 150 mg, 50 to 100 mg, 100 to 400 mg, 100 to 300 mg, 100 to 250 mg, 100 to 200 mg, with doses of, e.g., about 0.01 mg, 0.025 mg, 0.05 mg. 0.1 mg, 0.15 mg, 0.25 mg, 0.5 mg, 0.75 mg, 1 mg, 1.25 mg, 1.5 mg, 1.75 mg, 2.0 mg, 2.5 mg, 3.0 mg, 3.5 mg, 4.0 mg, 4.5 mg, 5 mg, 6 mg, 7 mg, 8 mg, 9 mg, 10 mg, 15 mg, 20 mg, 25 mg, 30, mg, 35 mg, 40 mg, 45 mg, 50 mg, 75 mg, 100 mg, 125 mg, 150 mg, 175 mg, 200 mg, 225 mg, 250 mg, 275 mg, 300 mg, and 400 mg being examples.

In specific embodiments, dosages may include amounts of Compound 1, 2C-TFM, or pharmaceutically acceptable salts thereof in the range of about, e.g., 1 mg to 50 mg, 1 mg to 40 mg, 1 mg to 30 mg, 1 mg to 20 mg, 1 mg to 15 mg, 1 mg to 10 mg, 1 mg to 10 mg, 0.1 to 5 mg, or 0.1 to 1 mg, with doses of 0.1 mg, 0.2 mg, 0.3 mg, 0.4 mg, 0.5 mg, 0.6 mg, 0.7 mg, 0.8 mg, 0.9 mg, 1.5 mg, 1.0 mg, 1.75 mg, 2 mg, 2.5 mg, 2.75 mg, 3 mg, 3.5 mg, 3.75 mg, 4 mg, 4.5 mg, 4.75 mg, 5 mg, 5.5 mg, 6 mg, 6.5 mg, 7 mg, 7.5 mg, 8 mg, 8.5 mg, 9 mg, 9.5 mg, 10 mg, 11 mg, 12.5 mg, 15 mg, 17.5 mg, 20 mg, 22.5 mg, 25 mg, 27.5 mg, 30 mg, 35 mg, 40 mg, 45 mg, and 50 mg being specific examples of doses.

Typically, dosages of a phenalkylamine, e.g., Compound 1, 2C-TFM, or pharmaceutically acceptable salts thereof, are administered once, twice, three or four times daily, every other day, every three days, twice weekly, once weekly, twice monthly, once monthly, every 2 months, every 3 months, every 4 months, every 6 months, or yearly to a patient in need thereof. In some embodiments, the dosage is about, e.g., 0.1-400 mg/day, 0.1-300 mg/day, 0.1-250 mg/day, 0.1-200 mg/day, 0.1-100 mg/day, 0.1-50 mg/day, or 0.1 to 25 mg/day, for example 300 mg/day, 250 mg/day, 200 mg/day, 150 mg/day, 100 mg/day, 75 mg/day, 50 mg/day, 25 mg/day, 20 mg/day, 10 mg/day, 5 mg/day, 2.5 mg/day, 1 mg/day, 0.5 mg/day, 0.25 mg/day, or 0.1 mg/day. In some embodiments, the foregoing example dose ranges may be delivered over intervals longer than one day, e.g. 0.1-400 mg/week.

In some embodiments, provided are pharmaceutical compositions for parenteral or inhalation, e.g., as a spray or mist, administration of a phenalkylamine, e.g., Compound 1, 2C-TFM, or pharmaceutically acceptable salts thereof, having a concentration of about 0.005 mg/mL to about 500 mg/mL. In some embodiments, the compositions include a phenalkylamine, e.g., Compound 1, 2C-TFM, or pharmaceutically acceptable salts thereof, at a concentration of, e.g., about 5 mg/mL to about 500 mg/mL, about 5 mg/mL to about 100 mg/mL, about 5 mg/mL to about 50 mg/mL, about 1 mg/mL to about 100 mg/mL, about 1 mg/mL to about 50 mg/mL, about 0.1 mg/mL to about 25 mg/mL, about 0.1 mg/mL to about 10 mg/mL, about 0.05 mg/mL to about 10 mg/mL, about 0.05 mg/mL to about 5 mg/mL, about 0.05 mg/mL to about 1 mg/mL, about 0.005 mg/mL to about 1 mg/mL, about 0.005 mg/mL to about 0.25 mg/mL, or about 0.005 mg/mL to about 0.1 mg/mL.

In some embodiments, the composition includes a phenalkylamine, e.g., Compound 1, 2C-TFM, or pharmaceutically acceptable salts thereof, at a concentration of, e.g., about 0.05 mg/mL to about 500 mg/mL, about 0.05 mg/mL to about 100 mg/mL, about 0.05 mg/mL to about 50 mg/mL, about 0.05 mg/mL to about 25 mg/mL, about 0.05 mg/mL to about 10 mg/mL, about 0.05 mg/mL to about 5 mg/mL, about 0.005 mg/mL to about 1 mg/mL, about 0.005 mg/mL to about 0.25 mg/mL, about 0.005 mg/mL to about 0.05 mg/mL, or about 0.005 mg/mL to about 0.025 mg/mL. In some embodiments, the pharmaceutical compositions are formulated as a total volume of about, e.g., 0.1 mL, 0.25 mL, 0.5 mL, 1 mL, 2 mL, 5 mL, 10 mL, 20 mL, 25 mL, 50 mL, 100 mL, 200 mL, 250 mL, or 500 mL.

Typically, dosages may be administered to a subject once, twice, three times, or four times daily, every other day, every three days, twice weekly, once weekly, twice monthly, once monthly, every 2 months, every 3 months, every 4 months, every 6 months, or yearly. In some embodiments, a phenalkylamine (e.g., Compound 1, 2C-TFM, or pharmaceutically acceptable salts thereof) is administered to a subject once in the morning or once in the evening. In some embodiments, a phenalkylamine (e.g., Compound 1, 2C-TFM, or pharmaceutically acceptable salts thereof) is administered to a subject once in the morning and once in the evening. In some embodiments, a phenalkylamine (e.g., Compound 1, 2C-TFM, or pharmaceutically acceptable salts thereof) is administered to a subject three times a day (e.g., at breakfast, lunch, and dinner), at a dose, e.g., of 0.5 mg/administration (e.g., 1.0 or 1.5 mg/day).

In some embodiments, a phenalkylamine (e.g., Compound 1, 2C-TFM, or pharmaceutically acceptable salts thereof) is administered to a subject at a dose of 0.5 mg/day in one or more doses. In some embodiments, a phenalkylamine (e.g., Compound 1, 2C-TFM, or pharmaceutically acceptable salts thereof) is administered to a subject at a dose of 1 mg/day in one or more doses. In some embodiments, a phenalkylamine (e.g., Compound 1, 2C-TFM, or pharmaceutically acceptable salts thereof) is administered to a subject at a dose of 2.5 mg/day in one or more doses. In some embodiments, a phenalkylamine (e.g., Compound 1, 2C-TFM, or pharmaceutically acceptable salts thereof) is administered to a subject at a dose of 5 mg/day in one or more doses. In some embodiments, a phenalkylamine (e.g., Compound 1, 2C-TFM, or pharmaceutically acceptable salts thereof) is administered to a subject at a dose of 7.5 mg/day in one or more doses. In some embodiments, a phenalkylamine (e.g., Compound 1, 2C-TFM, or pharmaceutically acceptable salts thereof) is administered to a subject at a dose of 10 mg/day in one or more doses. In some embodiments, a phenalkylamine (e.g., Compound 1, 2C-TFM, or pharmaceutically acceptable salts thereof) is administered to a subject at a dose of 15 mg/day in one or more doses. In some embodiments, a phenalkylamine (e.g., Compound 1, 2C-TFM, or pharmaceutically acceptable salts thereof) is administered to a subject at a dose of 20 mg/day in one or more doses. In some embodiments, a phenalkylamine (e.g., Compound 1, 2C-TFM, or pharmaceutically acceptable salts thereof) is administered to a subject at a dose of 25 mg/day in one or more doses. In some embodiments, a phenalkylamine (e.g., Compound 1, 2C-TFM, or pharmaceutically acceptable salts thereof) is administered to a subject at a dose of 30 mg/day in one or more doses. In some embodiments, a phenalkylamine (e.g., Compound 1, 2C-TFM, or pharmaceutically acceptable salts thereof) is administered to a subject at a dose of 40 mg/day in one or more doses. In some embodiments, a phenalkylamine (e.g., Compound 1, 2C-TFM, or pharmaceutically acceptable salts thereof) is administered to a subject at a dose of 50 mg/day in one or more doses.

In some embodiments, the dosage of a phenalkylamine (e.g., Compound 1, 2C-TFM, or pharmaceutically acceptable salts thereof) is 0.0005-5 mg/kg, 0.001-1 mg/kg, 0.01-1 mg/kg, or 0.1-5 mg/kg once, twice, three times or four times daily. For example, in some embodiments, the dosage is 0.0005 mg/kg, 0.001 mg/kg, 0.005 mg/kg, 0.01 mg/kg, 0.025 mg/kg, 0.05 mg/kg, 0.1 mg/kg, 0.15 mg/kg, 0.2 mg/kg, 0.25 mg/kg, 0.3 mg/kg, 0.4 mg/kg, 0.5 mg/kg, 1 mg/kg, 2.5 mg/kg, or 5 mg/kg, once, twice, three times, or four times daily. In some embodiments, a subject is administered a total daily dose of 0.01 mg to 500 mg of a phenalkylamine (e.g., Compound 1, 2C-TFM, or pharmaceutically acceptable salts thereof) once, twice, three times, or four times daily. In some embodiments, the total amount administered to a subject in 24-hour period is, e.g., 0.01 mg, 0.025 mg, 0.05 mg, 0.075 mg, 0.1 mg, 0.125 mg, 0.15 mg, 0.175 mg, 0.2 mg, 0.25 mg, 0.3 mg, 0.4 mg, 0.5 mg, 0.75 mg, 1 mg, 1.5 mg, 2 mg, 2.5 mg, 3 mg, 4 mg, 5 mg, 7.5 mg, 10 mg, 12.5 mg, 15 mg, 17.5 mg 20 mg, 25 mg, 30 mg, 35 mg, 40 mg, 50 mg, 60 mg, 75 mg, 100 mg, 150 mg, 200 mg, 300 mg, 400 mg, or 500 mg. In some embodiments, the subject may be started at a low dose and the dosage is escalated. In some embodiments, the subject may be started at a high dose and the dosage is decreased.

In some embodiments, a phenalkylamine (e.g., Compound 1, 2C-TFM, or pharmaceutically acceptable salts thereof) is administered to a patient under the supervision of a healthcare provider.

In some embodiments, a phenalkylamine (e.g., Compound 1, 2C-TFM, or pharmaceutically acceptable salts thereof) is administered to a patient under the supervision of a healthcare provider at a clinic specializing in the delivery of psychoactive treatments.

In some embodiments, a phenalkylamine (e.g., Compound 1, 2C-TFM, or pharmaceutically acceptable salts thereof) is administered to a patient under the supervision of a healthcare provider at a high dose intended to induce a psychedelic experience in the subject, e.g., 5 mg, 7.5 mg, 10 mg, 12.5 mg, 15 mg, 17.5 mg, 20 mg, 25 mg, 30 mg, 35 mg, 40 mg, or 50 mg.

In some embodiments, the administration to a patient of a high dose under the supervision of a healthcare provider occurs periodically in order to maintain a therapeutic effect in the patient, e.g., every three days, twice weekly, once weekly, twice monthly, once monthly, thrice yearly, twice yearly, or once yearly.

In some embodiments, a phenalkylamine (e.g., Compound 1, 2C-TFM, or pharmaceutically acceptable salts thereof) is administered by a patient on their own at home or otherwise away from the supervision of a healthcare provider.

In some embodiments, a phenalkylamine (e.g., Compound 1, 2C-TFM, or pharmaceutically acceptable salts thereof) is administered by a patient on their own at home or otherwise away from the supervision of a healthcare provider at a low dose intended to be sub-perceptual or to induce threshold psychoactive effects, e.g., 0.1 mg, 0.25 mg, 0.5 mg, 0.75 mg, 1 mg, 1.5 mg, 2 mg, 2.5 mg, 3 mg, or 4 mg.

In some embodiments, the administration by a patient of a low dose on their own occurs periodically in order to maintain a therapeutic effect in the patient, e.g., daily, every other day, every three days, twice weekly, once weekly, twice monthly, or once monthly, In some embodiments, a phenalkylamine (e.g., Compound 1, 2C-TFM, or pharmaceutically acceptable salts thereof) may be administered, e.g., via inhalation or orally, at specified intervals. For example, during treatment a patient may be administered a phenalkylamine at intervals of every, e.g., 1 year, 6 months, 120 days, 90 days, 60 days, 30 days, 14 days, 7 days, 4 days, 3 days, 2 days, 24 hours, 12 hours, 8 hours, 6 hours, 5 hours, 4 hours, 3 hours, 2.5 hours, 2.25 hours, 2 hours, 1.75 hours, 1.5 hours, 1.25 hours, 1 hour, 0.75 hour, 0.5 hour, or 0.25 hour.

Suitable dosage forms for a phenalkylamine (e.g., Compound 1, 2C-TFM, or pharmaceutically acceptable salts thereof) include, but are not limited to, oral forms, such as tablets, hard or soft gelatin capsules, powders, granules and oral solutions, syrups or suspensions, troches, as well as sublingual, buccal, intratracheal, intraocular, or intranasal forms, forms adapted to inhalation, topical forms, transdermal forms, or parenteral forms, for example, forms adapted for intravenous, intra-arterial, intraperitoneal, intrathecal, intraventricular, intramuscular or subcutaneous administration. In some embodiments, for such parenteral administration, the pharmaceutical composition may be in the form of a sterile aqueous solution which may contain other substances, for example, enough salts or glucose to make the solution isotonic with blood. The aqueous solutions should be suitably buffered (preferably to a pH of from 3 to 9), if necessary. The preparation of suitable parenteral formulations under sterile conditions is readily accomplished by standard pharmaceutical techniques well-known to those skilled in the art.

Pharmaceutical compositions herein may be provided with immediate release, delayed release, extended release, or modified release profiles. In some embodiments, pharmaceutical compositions with different drug release profiles may be combined to create a two-phase or three-phase release profile. For example, pharmaceutical compositions may be provided with an immediate release and an extended release profile. In some embodiments, pharmaceutical compositions may be provided with an extended release and delayed release profile. Such composition may be provided as pulsatile formulations, multilayer tablets, or capsules containing tablets, beads, granules, etc. Compositions may be prepared using a pharmaceutically acceptable "carrier" composed of materials that are considered safe and effective. The "carrier" includes all components present in the pharmaceutical formulation other than the active ingredient or ingredients. The term "carrier" includes, but is not limited to, diluents, binders, lubricants, glidants, disintegrants, fillers, and coating compositions.

As used herein, the term "pharmaceutically acceptable" refers to molecular entities and compositions that are "generally regarded as safe", e.g., that are physiologically tolerable and do not typically produce an allergic or similar untoward reaction when administered to a human. In some embodiments, this term refers to molecular entities and compositions approved by a regulatory agency of the federal or a state government, as the GRAS list under sections 204(s) and 409 of the Federal Food, Drug and Cosmetic Act, that is subject to premarket review and approval by the FDA or similar lists, the U.S. Pharmacopeia or another generally recognized pharmacopeia for use in animals, and more particularly in humans.

As used herein, the term "pharmaceutically acceptable salts" includes acid addition salts, addition salts of free bases, wherein the compound is modified by making acid or base salts thereof. Examples of pharmaceutically acceptable salts include but are not limited to mineral or organic acid salts of basic residues such as amines, and alkali or organic salts of acidic residues such as carboxylic acids. Pharmaceutically acceptable salts include conventional non-toxic salts or quaternary ammonium salts of the parent compound formed, for example, from non-toxic inorganic or organic acids. Such conventional non-toxic salts include those derived from inorganic acids such as hydrochloric, hydrobromic, sulfuric, sulfamic, phosphoric, and nitric acids; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, tolunesulfonic, naphthalenesulfonic, methanesulfonic, ethane disulfonic, and oxalic acids. The pharmaceutically acceptable salts of a phenalkylamine can be synthesized from the parent compound, which contains a basic or acidic moiety, by conventional chemical methods.

The terms "about" or "approximately" as used herein mean within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, a range up to 10%, a range up to 5%, and/or a range up to 1% of a given value. Alternatively, particularly with respect to biological systems or processes, the term can mean within an order of magnitude, e.g., within 5-fold, or within 2-fold, of a value. "About" and "approximately" are used interchangeably herein.

In the context of the present disclosure the term "5-HT2A receptor agonist" is intended to mean any compound or substance that activates the 5-HT2A receptor. The agonist may be a partial or full agonist.

As used herein, the term "protecting group" means a group which has been introduced onto a functional group in a compound and which modifies said functional group's chemical reactivity. Typically, the protecting group modifies the functional group's chemical reactivity in such a way that attenuates said functional group's reactivity to the reaction conditions used when a subsequent chemical transformation is effected on the said compound. In some embodiments, a protecting group is selected from the group consisting of t-Butyl carbamate (Boc), acetyl (Ac), and benzyl (Bn). In some embodiments, a protecting group is t-Butyl carbamate (Boc).

Pharmaceutical compositions include those suitable for oral, rectal, nasal, topical (including transdermal, buccal and sublingual), vaginal or parenteral (including subcutaneous, intramuscular, intravenous and intradermal) administration or administration via an implant. The compositions may be prepared by any method well known in the art of pharmacy.

Such methods include the step of bringing in association compounds used in the present disclosure or combinations thereof with any auxiliary agent. The auxiliary agent(s), also named accessory ingredient(s), include those conventional in the art, such as carriers, fillers, binders, diluents, disintegrants, lubricants, colorants, flavoring agents, anti-oxidants, and wetting agents. Such auxiliary agents are suitably selected with respect to the intended form and route of administration and as consistent with conventional pharmaceutical practices.

Pharmaceutical compositions suitable for oral administration may be presented as discrete dosage units such as pills, tablets, dragées or capsules, or as a powder or granules, or as a solution or suspension. The active ingredient may also be presented as a bolus or paste. The compositions can further be processed into a suppository or enema for rectal administration.

Tablets may contain the active ingredient compounds and suitable binders, lubricants, disintegrating agents, coloring agents, flavoring agents, flow-inducing agents, and melting agents. Gelatin capsules may contain the active ingredient compounds and powdered carriers, such as lactose, starch, cellulose derivatives, magnesium stearate, stearic acid, and the like. Similar diluents can be used to make compressed tablets. Compressed tablets can be sugar coated or film coated to mask any unpleasant taste and protect the tablet from the atmosphere, or enteric coated for selective disintegration in the gastrointestinal tract. For instance, for oral administration in the dosage unit form of a tablet or capsule, the active drug component can be combined with an oral, non-toxic, pharmaceutically acceptable, inert carrier such as lactose, gelatin, agar, starch, sucrose, glucose, methyl cellulose, magnesium stearate, dicalcium phosphate, calcium sulfate, mannitol, sorbitol and the like. Suitable binders include starch, gelatin, natural sugars such as glucose or beta-lactose, corn sweeteners, natural and synthetic gums such as acacia, tragacanth, or sodium alginate, carboxymethylcellulose, polyethylene glycol, waxes, and the like. Lubricants used in these dosage forms include sodium oleate, sodium stearate, magnesium stearate, sodium benzoate, sodium acetate, sodium chloride, and the like. Disintegrators include, without limitation, starch, methyl cellulose, agar, bentonite, xanthan gum, and the like.

For oral administration in liquid dosage form, the oral drug components are combined with any oral, non-toxic, pharmaceutically acceptable inert carrier such as ethanol, glycerol, water, and the like. Examples of suitable liquid dosage forms include solutions or suspensions in water, pharmaceutically acceptable fats and oils, alcohols or other organic solvents, including esters, emulsions, syrups or elixirs, suspensions, solutions and/or suspensions reconstituted from non-effervescent granules and effervescent preparations reconstituted from effervescent granules. Such liquid dosage forms may contain, for example, suitable solvents, preservatives, emulsifying agents, suspending agents, diluents, sweeteners, thickeners, and melting agents. Liquid dosage forms for oral administration can contain coloring and flavoring to increase patient acceptance.

For parenteral administration, suitable compositions include aqueous and non-aqueous sterile solutions. In general, water, a suitable oil, saline, aqueous dextrose (glucose), and related sugar solutions and glycols such as propylene glycol or polyethylene glycols are suitable carriers for parenteral solutions. Solutions for parenteral administration preferably contain a water-soluble salt of the active ingredient, suitable stabilizing agents, and if necessary, buffer substances. Antioxidizing agents such as sodium bisulfite, sodium sulfite, or ascorbic acid, either alone or combined, are suitable stabilizing agents. Also used are citric acid and its salts and sodium EDTA. In addition, parenteral solutions can contain preservatives, such as benzalkonium chloride, methyl- or propyl-paraben, and chlorobutanol. The compositions may be presented in unit-dose or multi-dose containers, for example sealed vials and ampoules, and may be stored in a freeze-dried (lyophilized) condition requiring only the addition of sterile liquid carrier, for example water, prior to use. For transdermal administration, e.g. gels, patches or sprays can be contemplated. Compositions or formulations suitable for pulmonary administration e.g. by nasal inhalation, include fine dusts or mists which may be generated by means of metered dose pressurized aerosols, nebulizers or insufflators. Parenteral and intravenous forms may also include minerals and other materials to make them compatible with the type of injection or delivery system chosen.

The compounds used in the method of the present disclosure may also be administered in the form of liposome delivery systems, such as small unilamellar vesicles, large unilamellar vesicles, and multilamellar vesicles. Liposomes can be formed from a variety of phospholipids, such as cholesterol, stearylamine, or phosphatidylcholines. The compounds may be administered as components of tissue-targeted emulsions.

The compounds used in the method of the present disclosure may also be coupled to soluble polymers as targetable drug carriers or as prodrugs. Such polymers include polyvinylpyrrolidone, pyran copolymer, polyhydroxylpropylmethacrylamide-phenol, polyhydroxyethylasparta-mide-phenol, or polyethyleneoxide-polylysine substituted with palmitoyl residues. Furthermore, the compounds may be coupled to a class of biodegradable polymers useful in achieving controlled release of a drug, for example, polylactic acid, polyglycolic acid, copolymers of polylactic and polyglycolic acid, polyepsilon caprolactone, polyhydroxy butyric acid, polyorthoesters, polyacetals, polydihydropyrans, polycyanoacylates, and crosslinked or amphipathic block copolymers of hydrogels.

Pharmaceutical compositions herein may be provided with immediate release, delayed release, extended release, or modified release profiles. In some embodiments, pharmaceutical compositions with different drug release profiles may be combined to create a two-phase or three-phase release profile. For example, pharmaceutical compositions may be provided with an immediate release and an extended release profile. In some embodiments, pharmaceutical compositions may be provided with an extended release and delayed release profile. Such composition may be provided as pulsatile formulations, multilayer tablets, or capsules containing tablets, beads, granules, etc.

Pharmaceutical compositions herein may be provided with abuse deterrent features by techniques know in the art, for example, by making a tablet that is difficult to crush or to dissolve in water.

The present disclosure further includes a pharmaceutical composition, as hereinbefore described, in combination with packaging material, including instructions for the use of the composition for a use as hereinbefore described.

The exact dose and regimen of administration of the composition will necessarily be dependent upon the type and magnitude of the therapeutic or nutritional effect to be achieved and may vary depending on factors such as the particular compound, formula, route of administration, or age and condition of the individual subject to whom the composition is to be administered.

The compounds used in the method of the present disclosure may be administered in various forms, including those detailed herein. The treatment with the compound may be a component of a combination therapy or an adjunct therapy, i.e. the subject or patient in need of the drug is treated or given another drug for the disease in conjunction with one or more of the instant compounds. This combination therapy can be sequential therapy where the patient is treated first with one drug and then the other or the two drugs are given simultaneously. These can be administered independently by the same route or by two or more different routes of administration depending on the dosage forms employed.

In some embodiments, deuterium-enriched phenalkylamines and their use are contemplated and within the scope of the methods, compounds, and compositions described herein. Deuterium can be incorporated in any position in place of hydrogen (protium) synthetically, according to synthetic procedures known in the art. For example, deuterium may be incorporated to various positions having an exchangeable proton, such as the amine N—H, via proton-deuterium equilibrium exchange. Thus, deuterium may be incorporated selectively or non-selectively through methods known in the art. Exemplary deuterium-enriched phenalkylamines include:

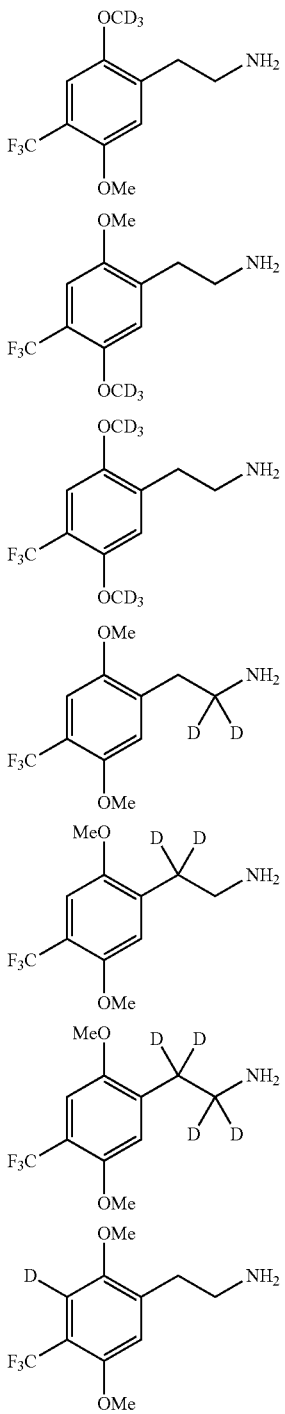

-continued

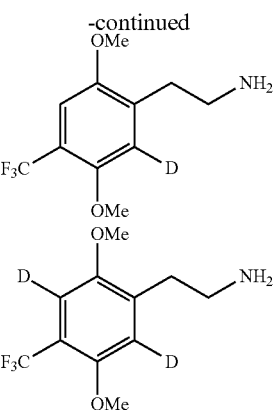

or a pharmaceutically acceptable salt thereof, wherein D represents a deuterium-enriched —H site.

In some embodiments, each D represents a deuterium-enriched —H site and the level of deuterium at each deuterium-enriched —H site of the compound is 0.02% to 100%.

In some embodiments, each D represents a deuterium-enriched —H site and the level of deuterium at each deuterium-enriched —H site of the compound is 50%-100%, 70%-100%, 90%-100%, 95%-100%, 96%-100%, 97%-100%, 98%-100%, or 99%-100%.

The phenalkylamines may be racemic and/or optically active isomers thereof. In this regard, some of the compounds can have asymmetric carbon atoms, and therefore, can exist either as racemic mixtures or as individual optical isomers (enantiomers). Compounds described herein that contain a chiral center include all possible stereoisomers of the compound, including compositions including the racemic mixture of the two enantiomers, scalemic mixtures of the two enantiomers, or mixtures including each enantiomer individually, substantially free of the other enantiomer. Thus, for example, contemplated herein is a composition including the S enantiomer of a compound substantially free of the R enantiomer, or the R enantiomer substantially free of the S enantiomer. If the named compound includes more than one chiral center, the scope of the present disclosure also includes compositions including mixtures of varying proportions between the diastereomers, as well as compositions including one or more diastereomers substantially free of one or more of the other diastereomers. By "substantially free" it is meant that the composition includes less than 25%, 15%, 10%, 8%, 5%, 3%, or less than 1% of the minor enantiomer or diastereomer(s).

Methods for synthesizing, isolating, preparing, and administering various stereoisomers are known in the art. Separation of diastereomers or cis and trans isomers may be achieved by conventional techniques, such as, for example, by fractional crystallization, chromatography or High Performance Liquid Chromatography (HPLC) of a stereoisomeric mixture of the agent or a suitable salt or derivative thereof. An individual enantiomer of a compound of a phenalkylamine may also be prepared from a corresponding optically pure intermediate or by resolution, such as by HPLC of the corresponding racemate using a suitable chiral support or by fractional crystallization of the diastereomeric salts formed by reaction of the corresponding racemate with a suitable optically active acid or base, as appropriate.

Also provided herein is a compound selected from the group consisting of:
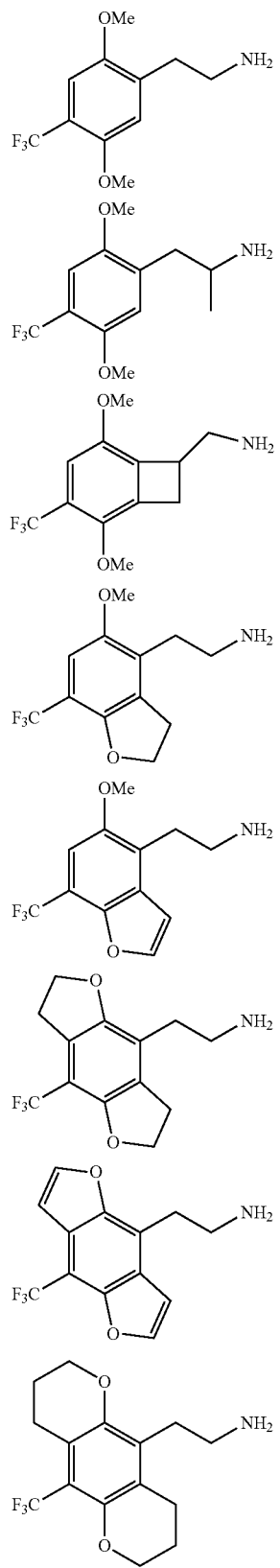
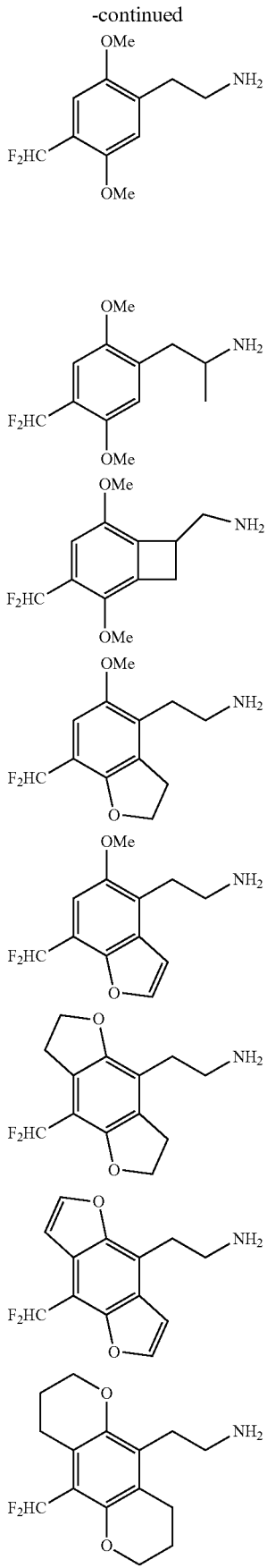

-continued

-continued
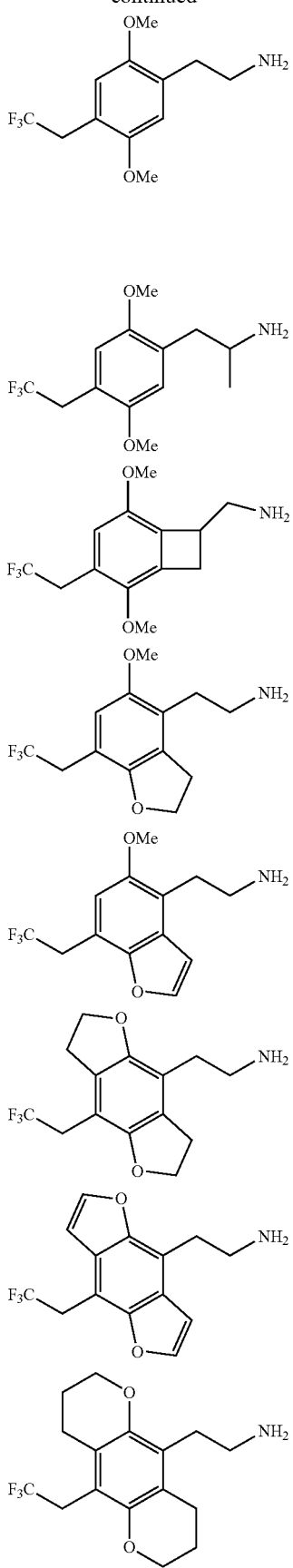
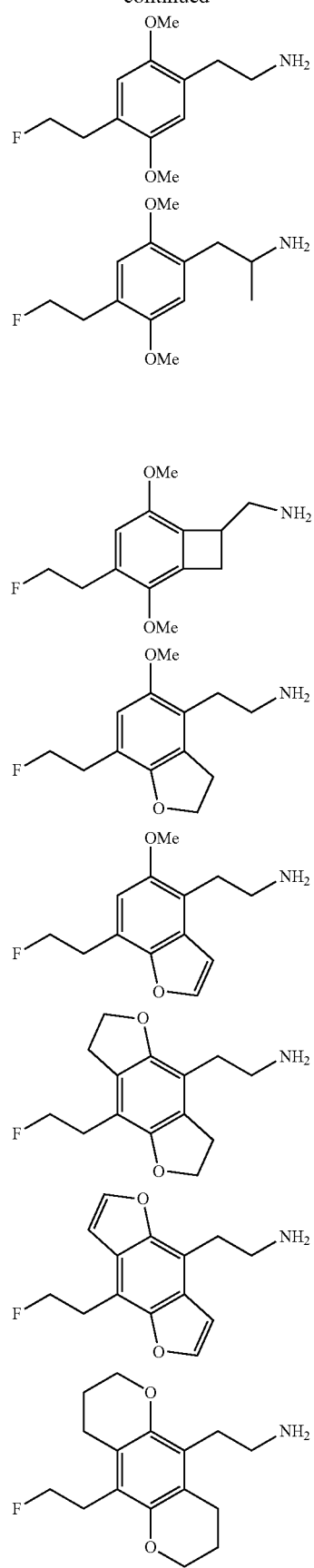

67
-continued
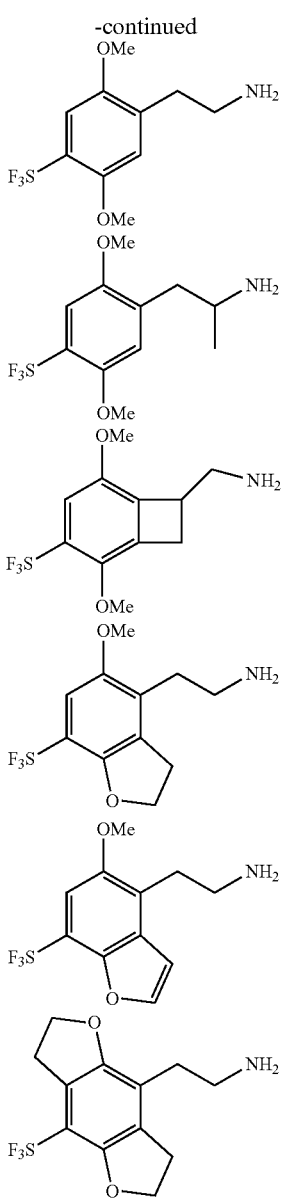
or a pharmaceutically acceptable salt thereof.
68
Also provided herein is a compound selected from the group consisting of:
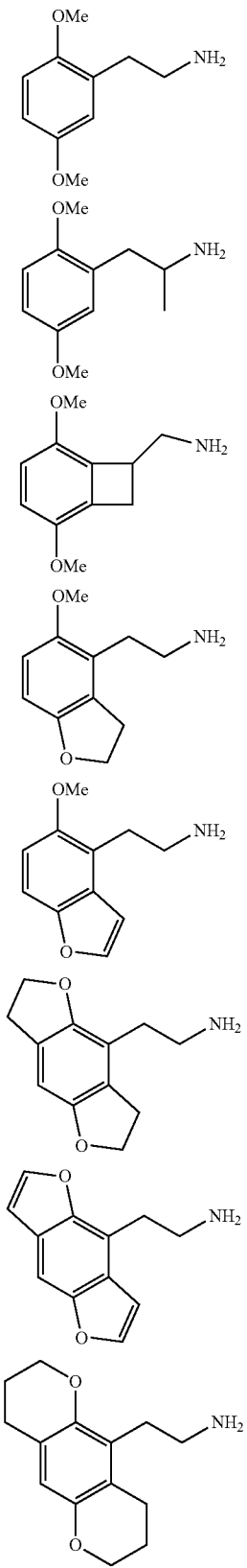

-continued
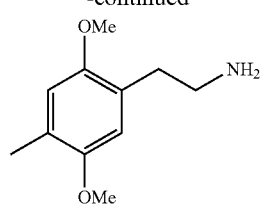
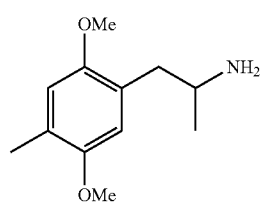
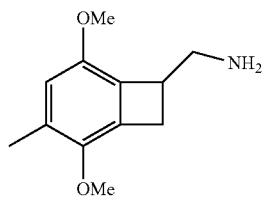
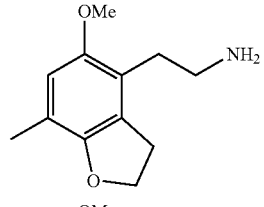
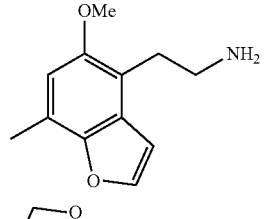
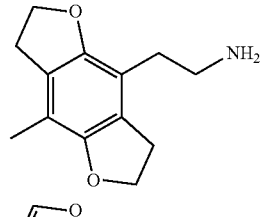
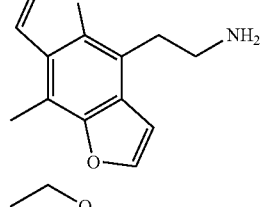
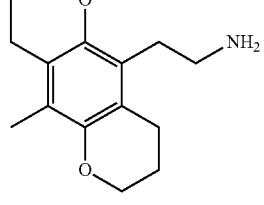
-continued
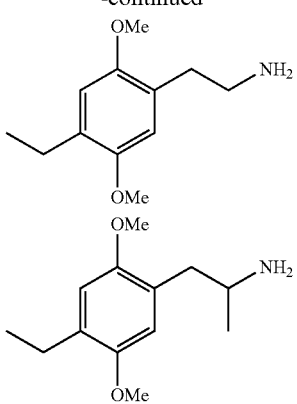
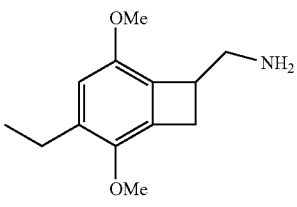
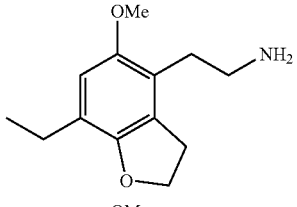
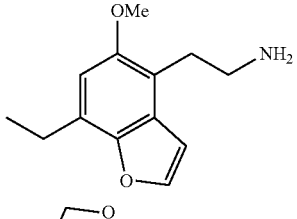
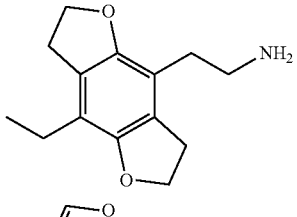
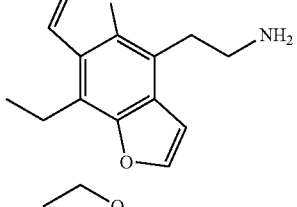
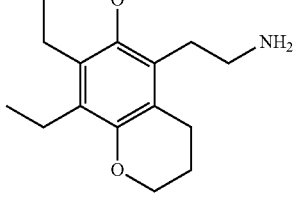

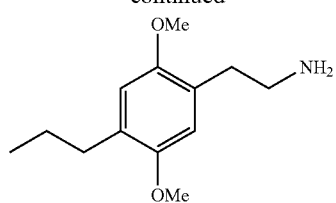
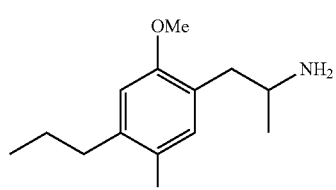
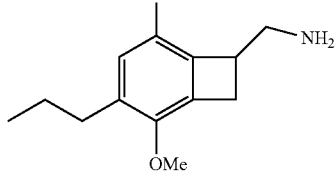
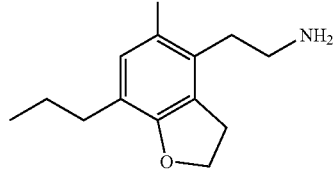
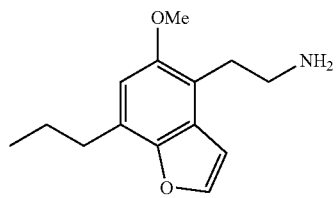
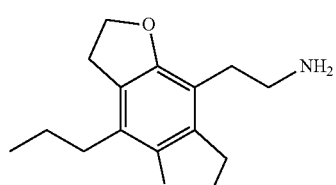
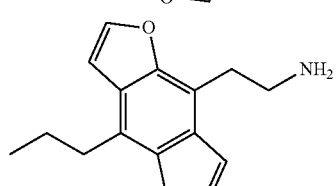
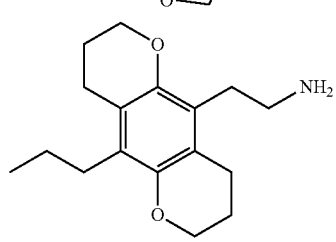
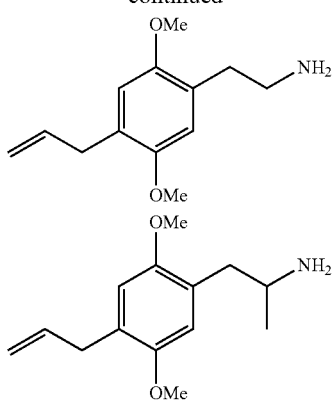
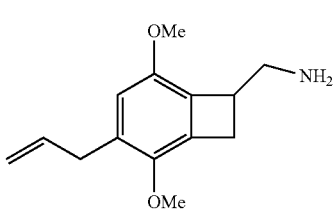
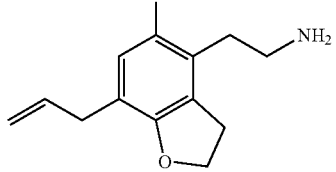
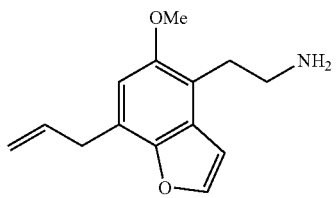
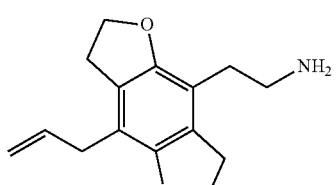
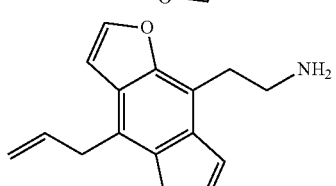
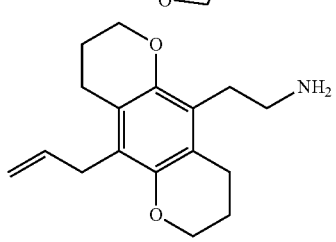

-continued
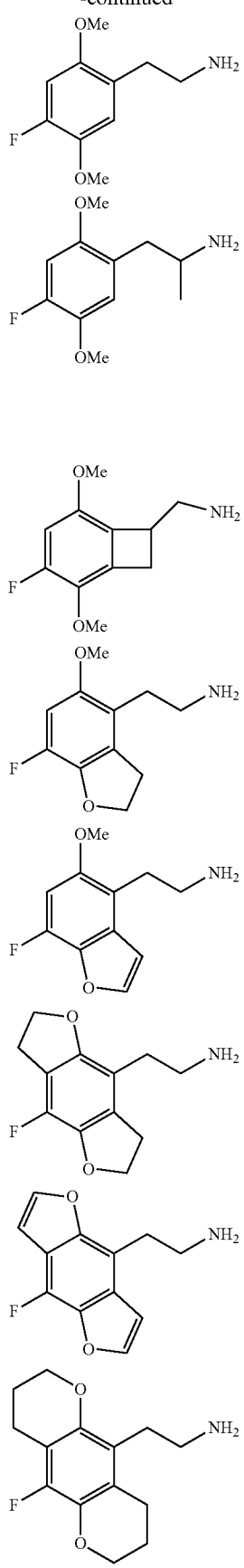
-continued
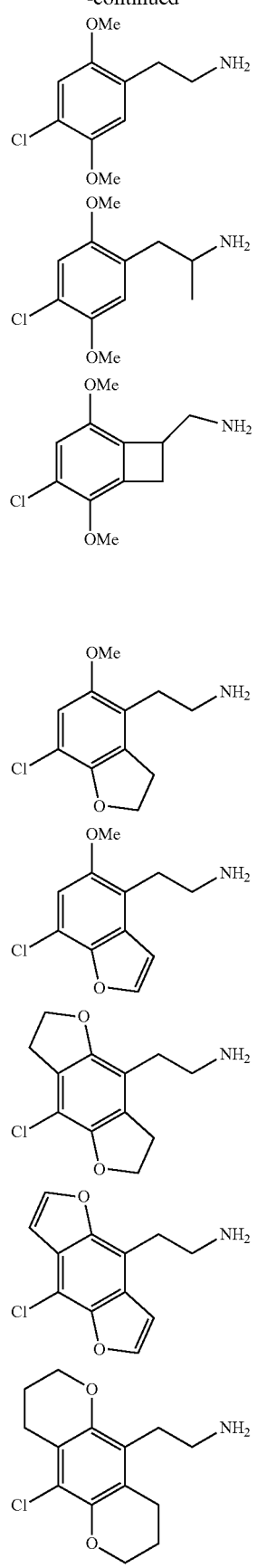

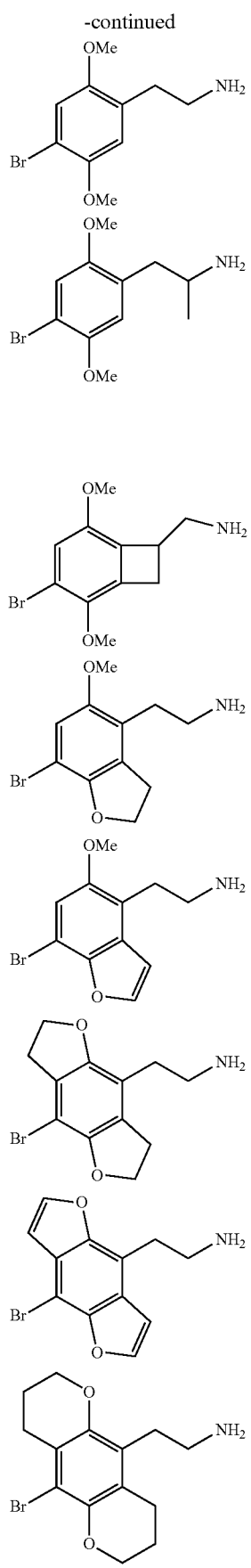
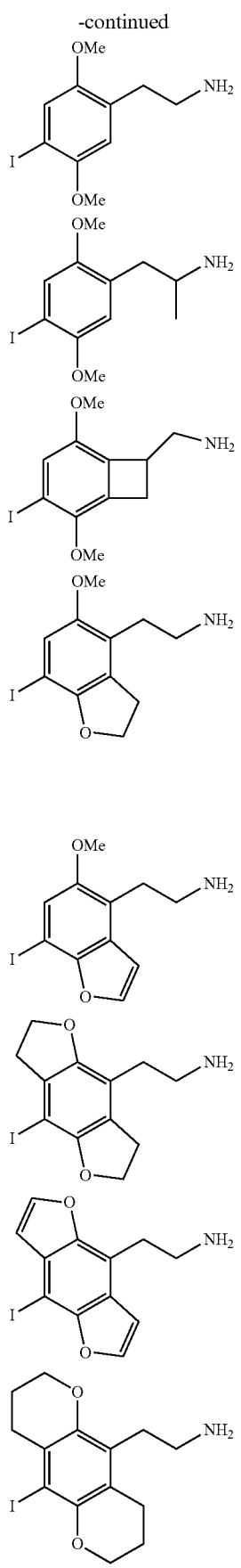

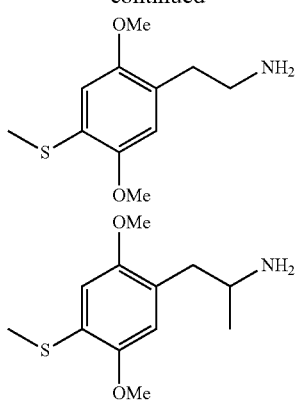
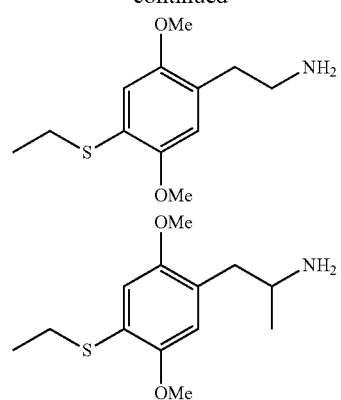

-continued
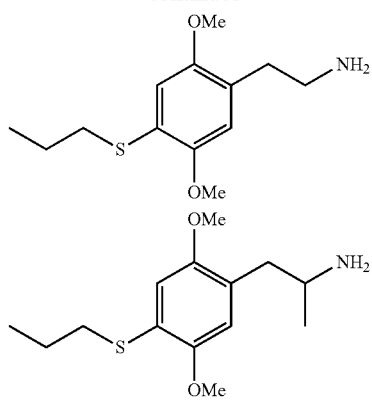
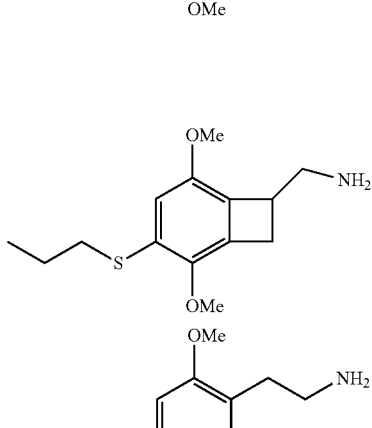
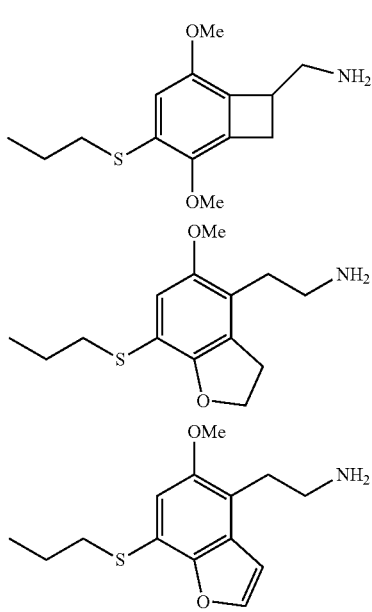
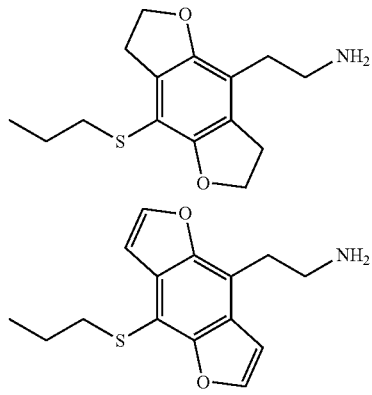
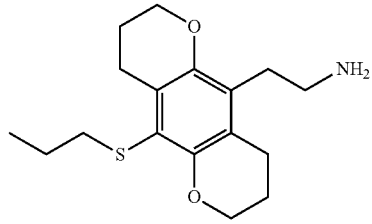
-continued
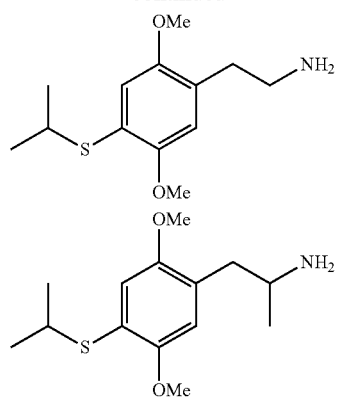
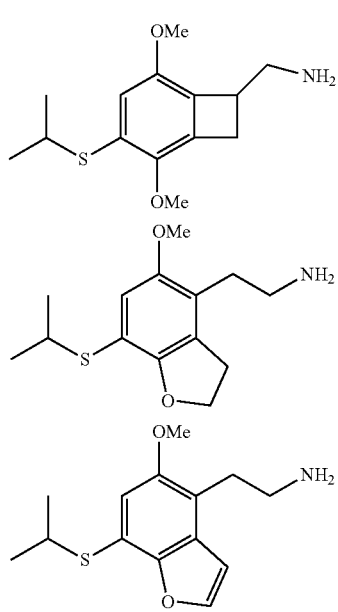
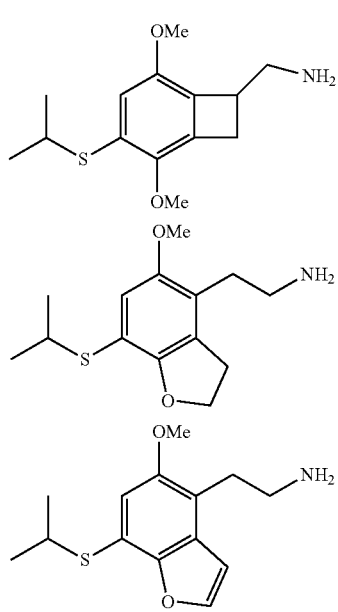
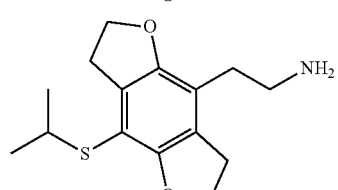
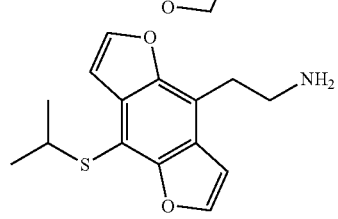
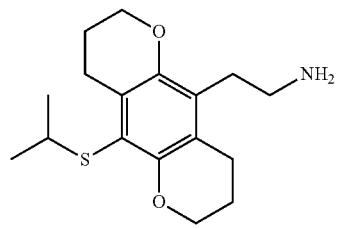

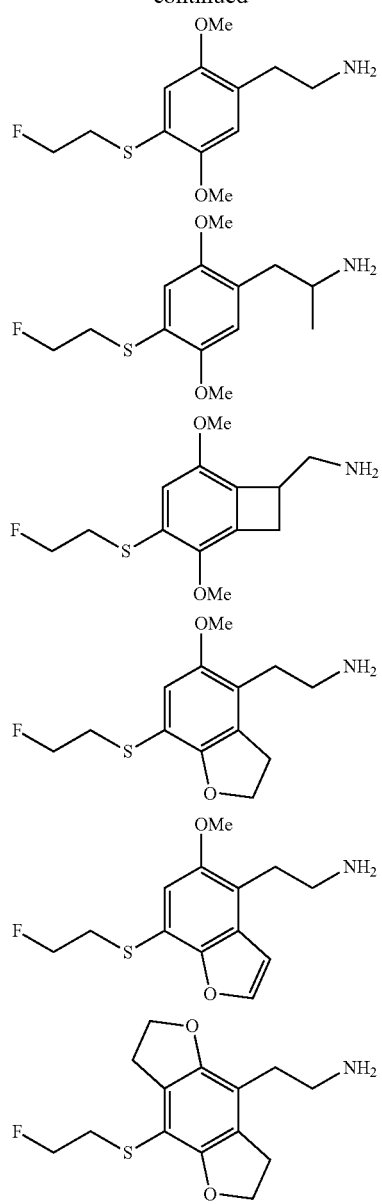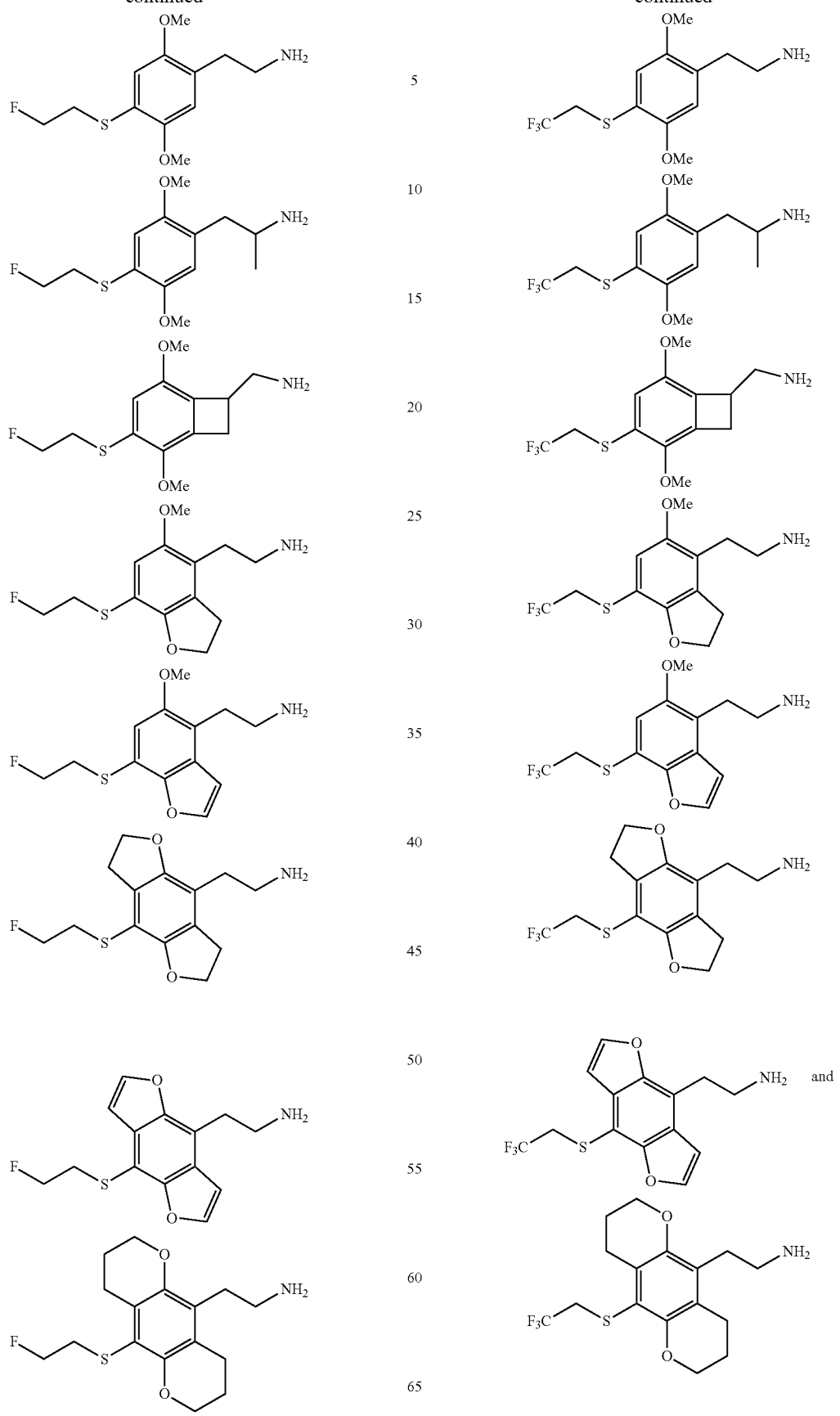
or a pharmaceutically acceptable salt thereof.

Also provided herein is a compound selected from the group consisting of:
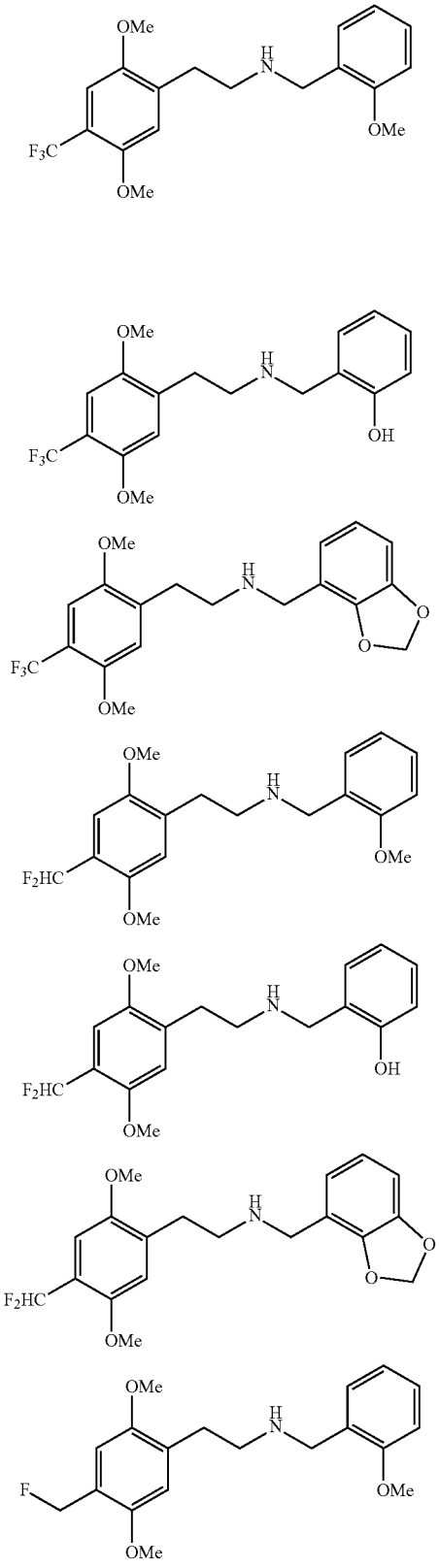
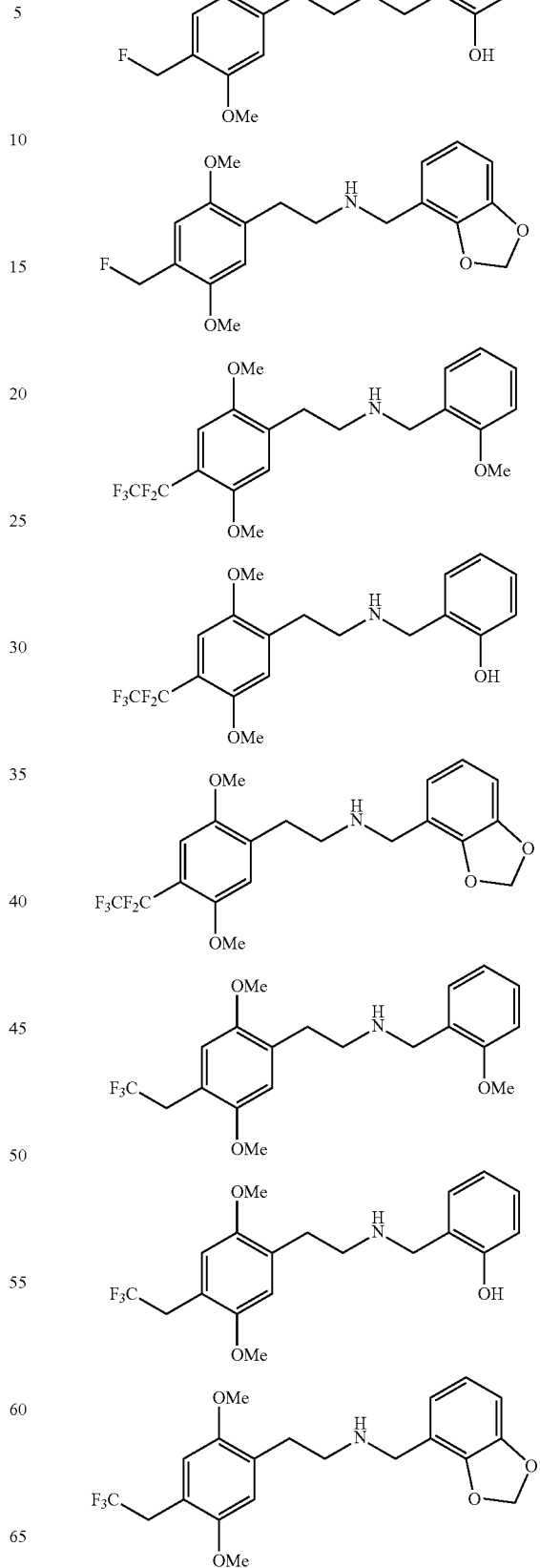

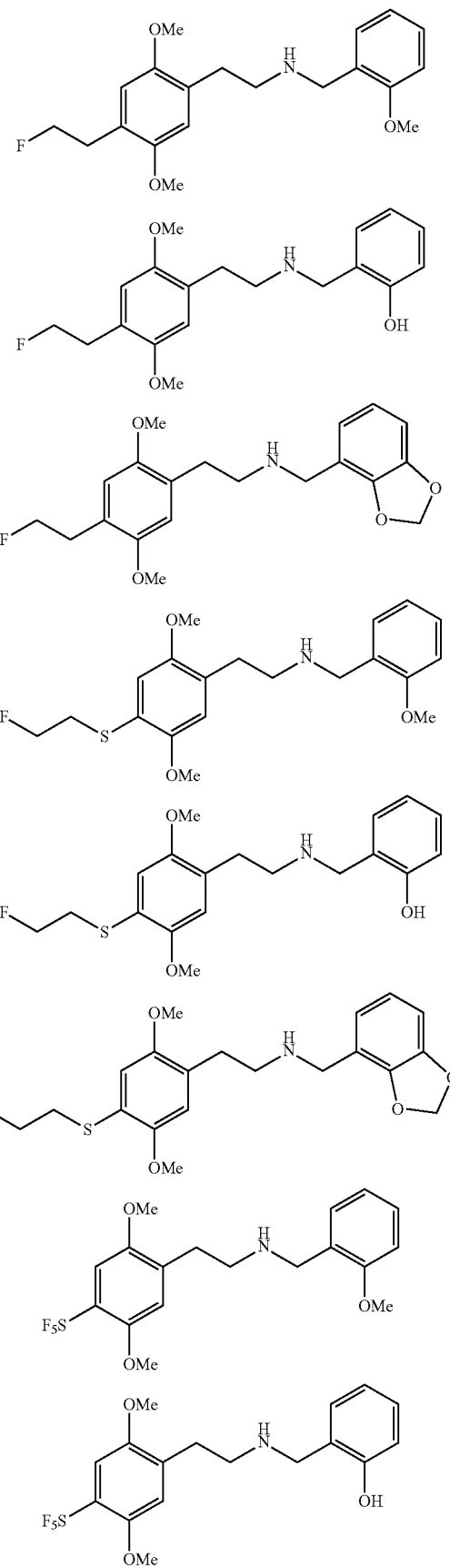
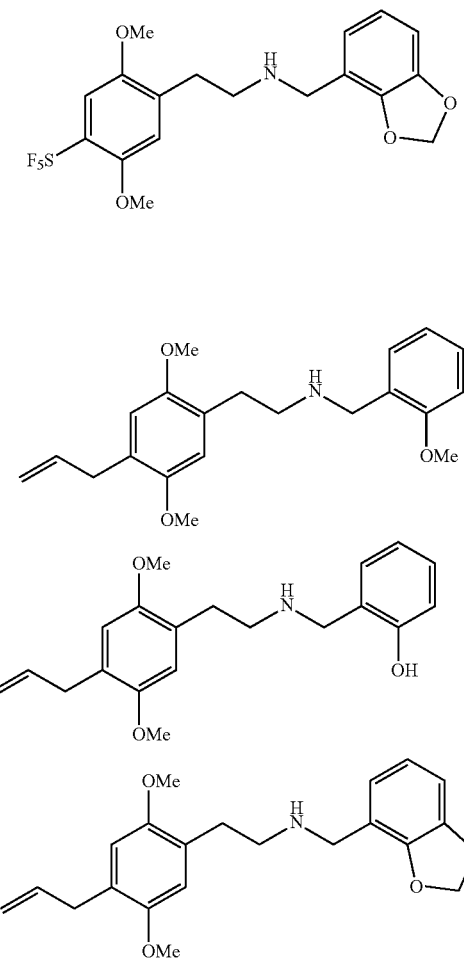
or a pharmaceutically acceptable salt thereof.
Also provided herein is a compound selected from the group consisting of:
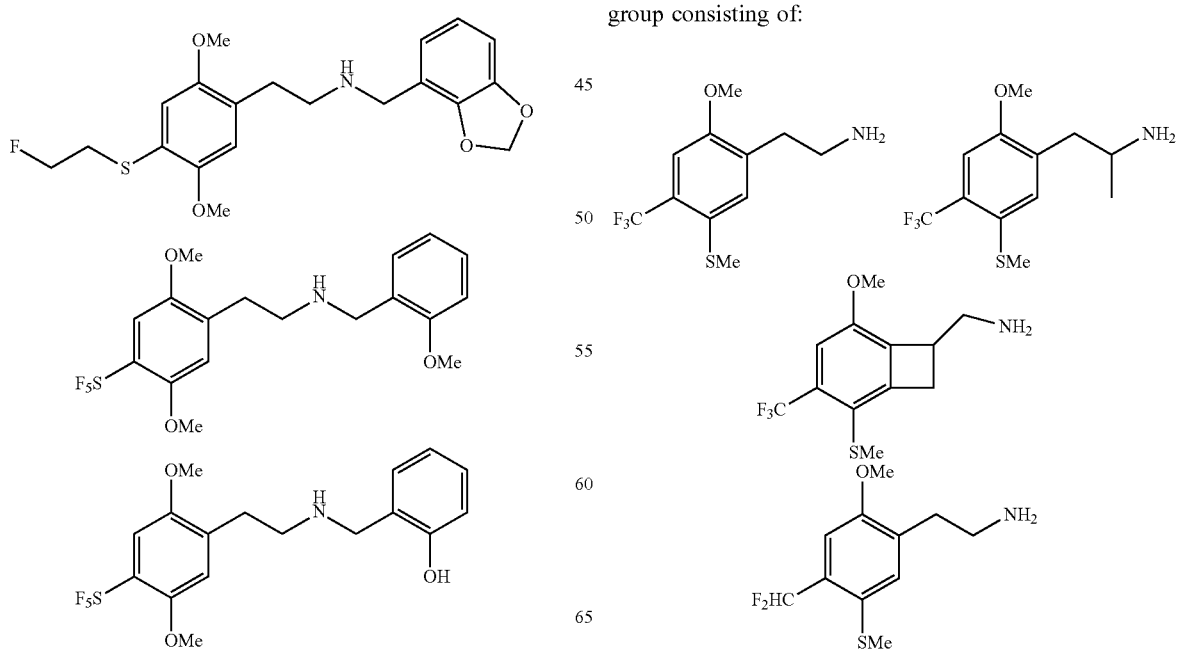

-continued
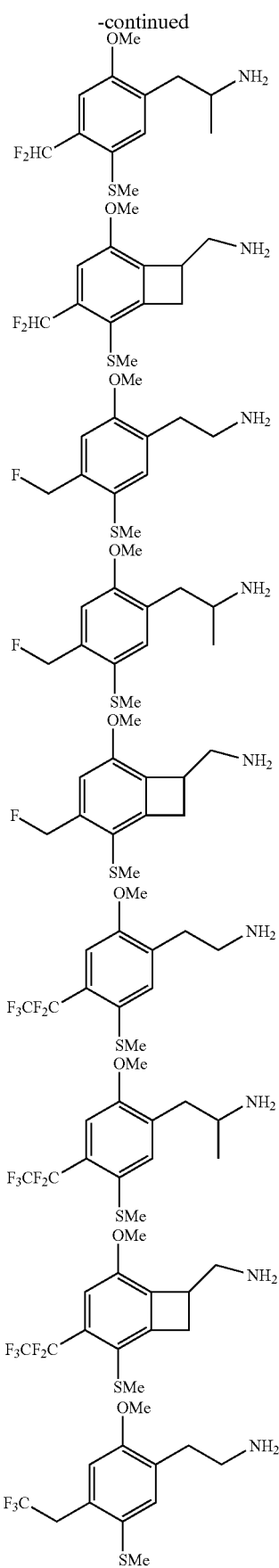
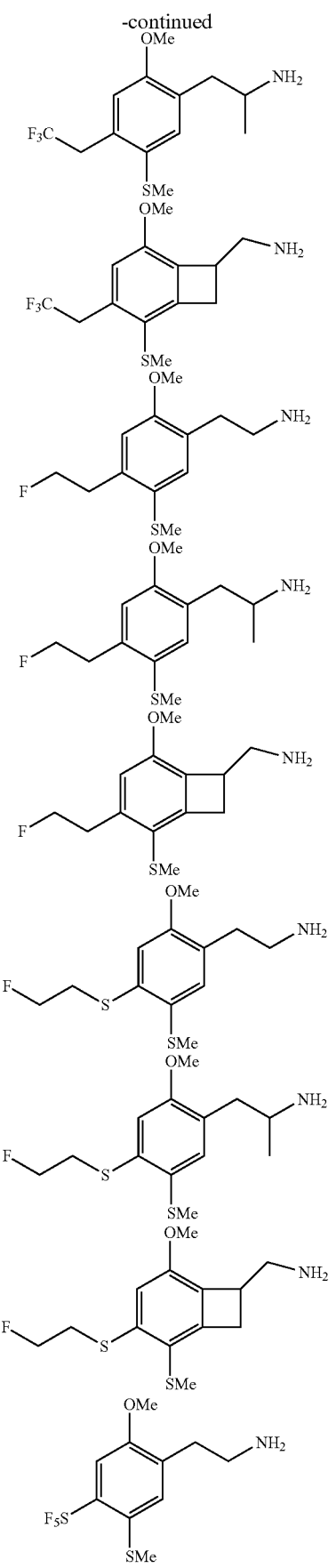

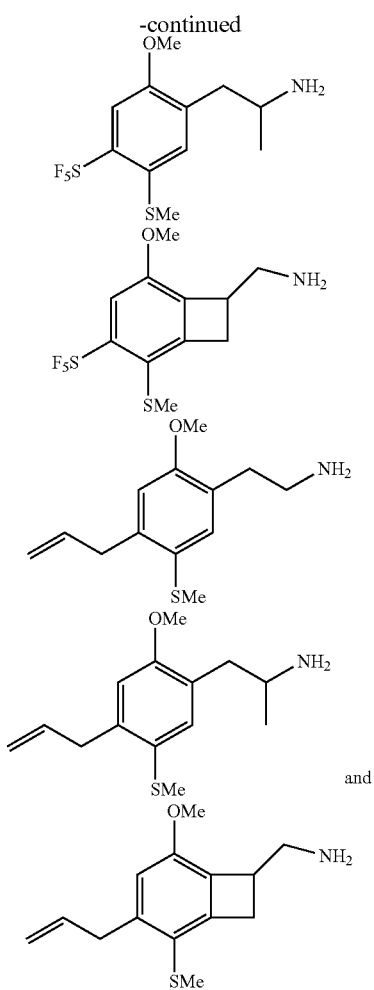
or a pharmaceutically acceptable salt thereof.
Also provided herein is a compound selected from the group consisting of:
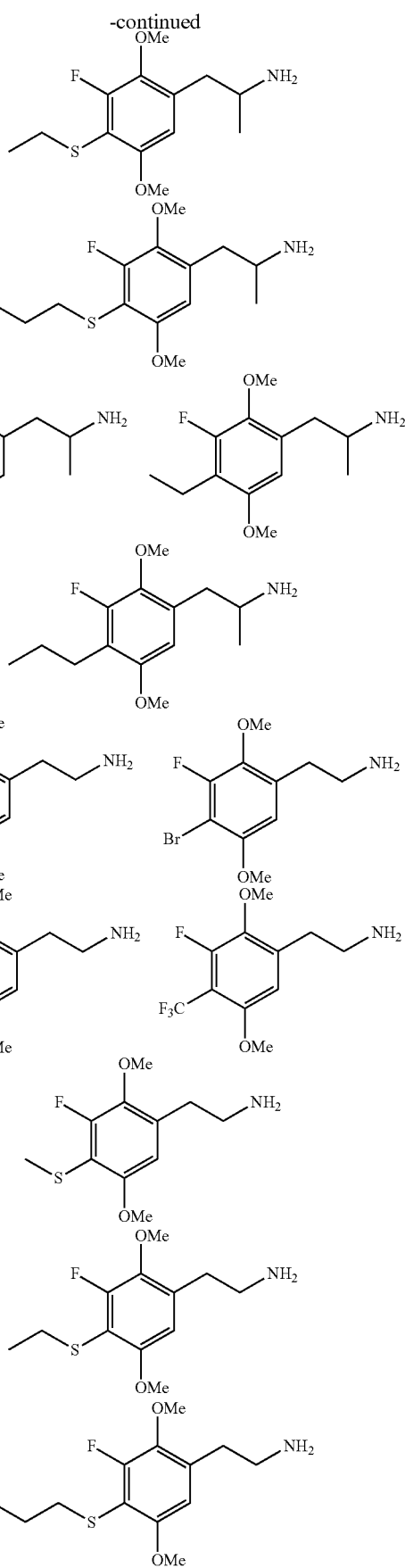

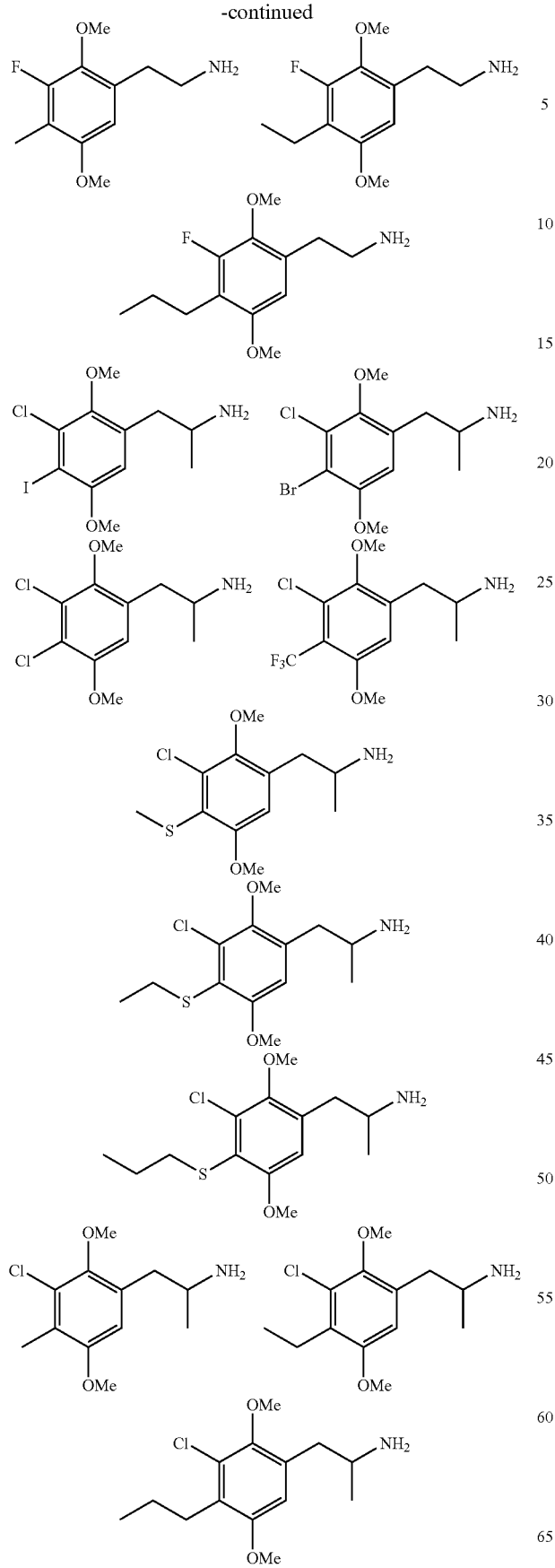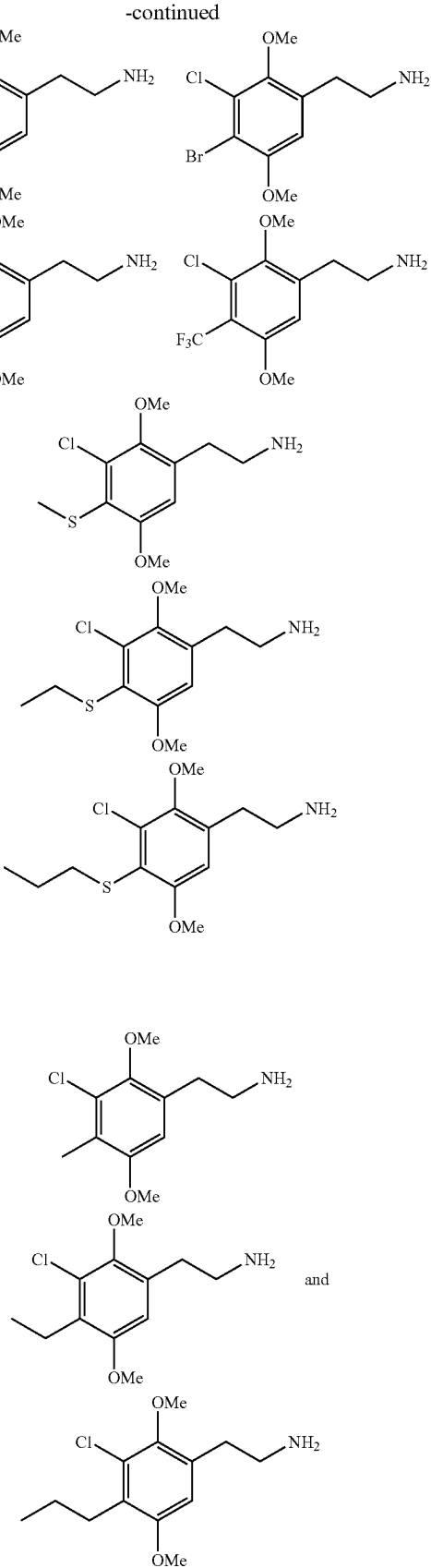
or a pharmaceutically acceptable salt thereof.

Also provided herein is a compound selected from the group consisting of:

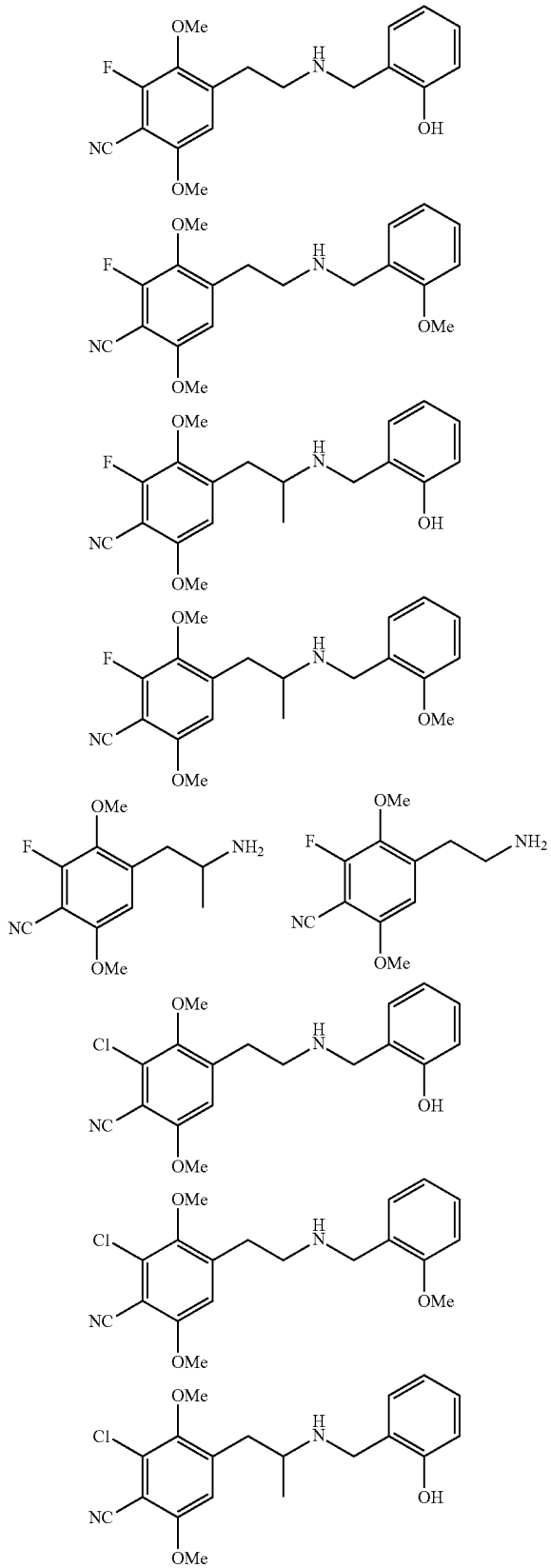

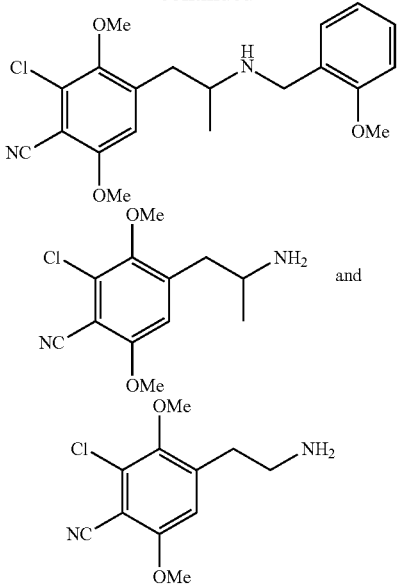

or a pharmaceutically acceptable salt thereof.

Also provided herein is a compound having the structure:

13

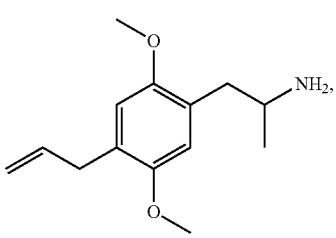

or a pharmaceutically acceptable salt thereof.

Also provided herein is a compound having the general Formula I:

Formula I

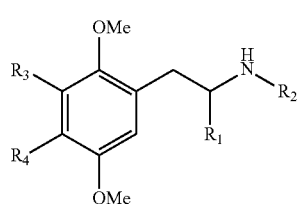

or a pharmaceutically acceptable salt thereof,
wherein
R₁ is selected from the group consisting of H, Me, and Et;
R₂ is H or is selected from the group consisting of:

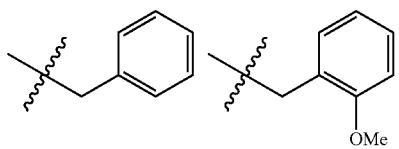

-continued

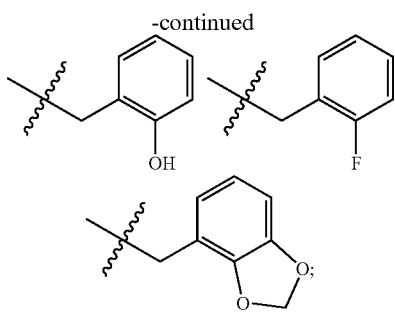

R₃ is selected from the group consisting of F, Cl, Br, I, Me, Et, n-Pr, i-Pr, —CCH (ethynyl), —CH₂CHCH₂ (allyl), —CN, CF₃, OCF₃, OMe, OEt, SMe, SEt, and NO₂;

R4 is selected from the group consisting of F, Cl, Br, I, CF₃, SF₅, $C_1$-$C_5$alkyl, $C_2$-$C_5$ alkenyl, $C_2$-$C_5$ alkynyl, $C_1$-$C_5$ halo-alkyl, —O($C_1$-$C_5$ alkyl), and —S($C_1$-$C_5$ alkyl).

The present disclosure further provides a pharmaceutical composition comprising the compound of the present disclosure and a pharmaceutically acceptable carrier.

In the context of the present disclosure, the term "alkyl" should be understood to refer to a straight, branched or where possible, cyclo hydrocarbon chain, containing the indicated number of carbon atoms, wherein all the bonds connecting the atoms are sigma bonds.

In the context of the present disclosure, the term "alkenyl" should be understood to refer to a straight, branched or where possible, cyclo hydrocarbon chain, containing the indicated number of carbon atoms, wherein at least one bond between two carbons of the chain is a double (pi) bond.

In the context of the present disclosure, the term "alkynyl" should be understood to refer to a straight, branched or where possible, cyclo hydrocarbon chain, containing the indicated number of carbon atoms, wherein at least one bond connecting two carbon atoms of the chain is a triple bond.

In the context of the present disclosure, the term "haloalkyl" should be understood to refer to a straight, branched or where possible, cyclo hydrocarbon chain, containing the indicated number of carbon atoms, wherein all the bonds connecting the atoms are sigma bonds and at least one of the hydrogen atoms on the chain is replaced by a halogen atom selected from F, Cl, Br, I.

The present disclosure is also intended to include all isotopes of atoms occurring on the compounds disclosed herein. Isotopes include those atoms having the same atomic number but different mass numbers. By way of general example and without limitation, isotopes of hydrogen include tritium and deuterium. Isotopes of carbon include $^{13}$C and $^{14}$C.

It will be noted that any notation of a carbon in structures throughout this application, when used without further notation, are intended to represent all isotopes of carbon, such as $^{12}$C, $^{13}$C, or $^{14}$C. Furthermore, any compounds containing $^{13}$C or $^{14}$C may specifically have the structure of any of the compounds disclosed herein.

It will also be noted that any notation of a hydrogen in structures throughout this application, when used without further notation, are intended to represent all isotopes of hydrogen, such as $^1$H, $^2$H, or $^3$H. Furthermore, any compounds containing $^2$H or $^3$H may specifically have the structure of any of the compounds disclosed herein.

Isotopically-labeled compounds can generally be prepared by conventional techniques known to those skilled in the art using appropriate isotopically-labeled reagents in place of the non-labeled reagents typically employed.

Each embodiment disclosed herein is contemplated as being applicable to each of the other disclosed embodiments. Thus, all combinations of the various elements described herein are within the scope of the present disclosure.

Example 1. Synthesis of Compounds

Compounds disclosed herein may be prepared by the synthetic transformations shown in Schemes 1-3. The compounds may also be prepared by the methods described in PIHKAL: A Chemical Love Story (Alexander Shulgin and Ann Shulgin; Transform Press, 1991), the contents of which are herein incorporated by reference. However, these may not be the only means by which to synthesize or obtain the desired compounds.

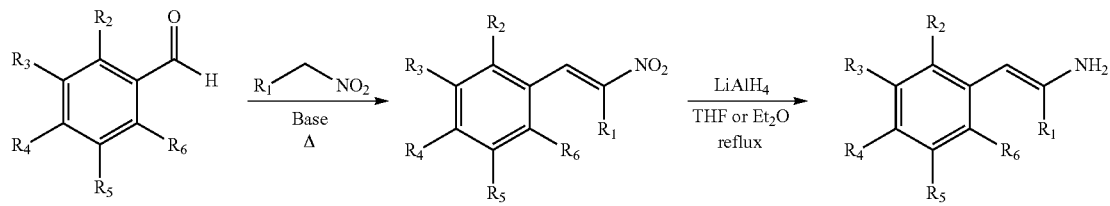

Scheme 1. General approach for the synthesis of phenalkylamines from their corresponding aldehydes.

-continued
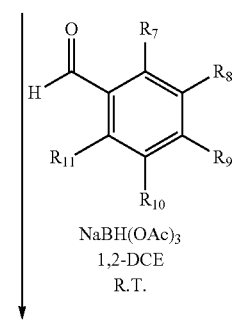
NaBH(OAc)$_3$
1,2-DCE
R.T.
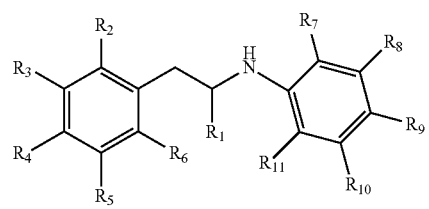
R$_1$-R$_{11}$ are selected to give the desired compound of the present invention and based on standard principles of chemical stability and reactivity well known in the art.
Scheme 2. General approach for the synthesis of phenalkylamines from their corresponding aldehydes
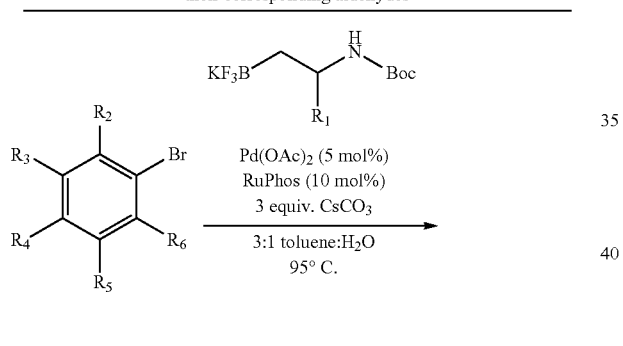
-continued
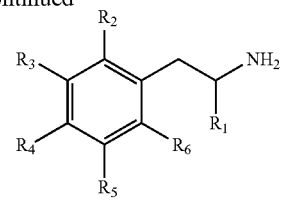
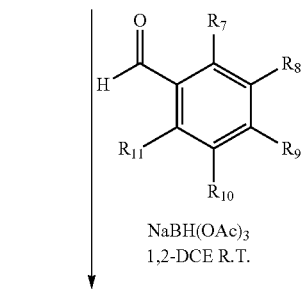
NaBH(OAc)$_3$
1,2-DCE R.T.
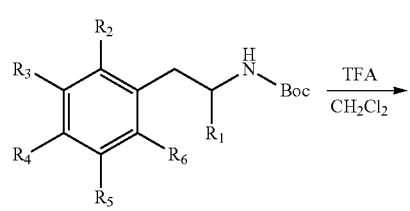
TFA
CH$_2$Cl$_2$
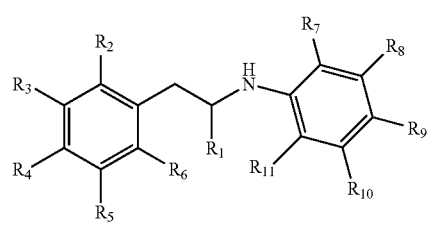

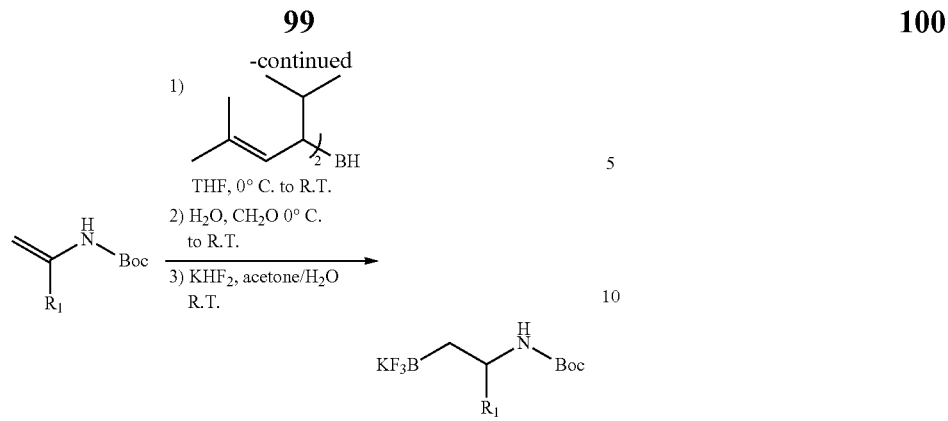

$R_1$ - $R_{11}$ are selected to give the desired compound of the present invention and based on standard principles of chemical stability and reactivity well known in the art.

Scheme 3. General approach for the syntheis of benzocyclobutene derivatives.

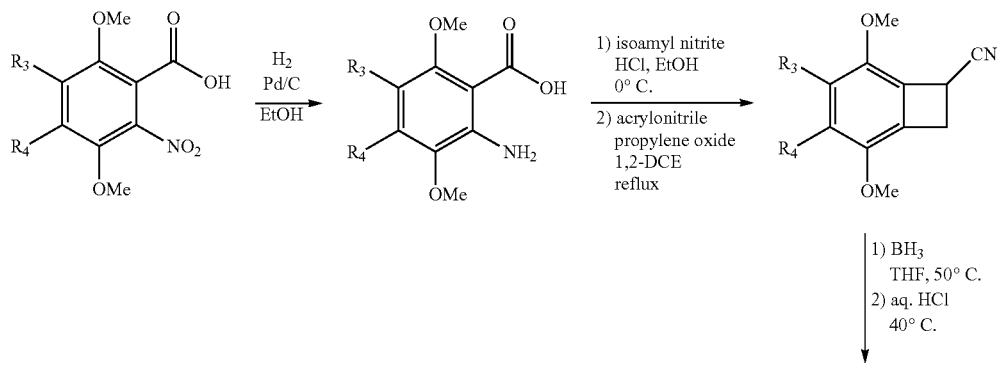

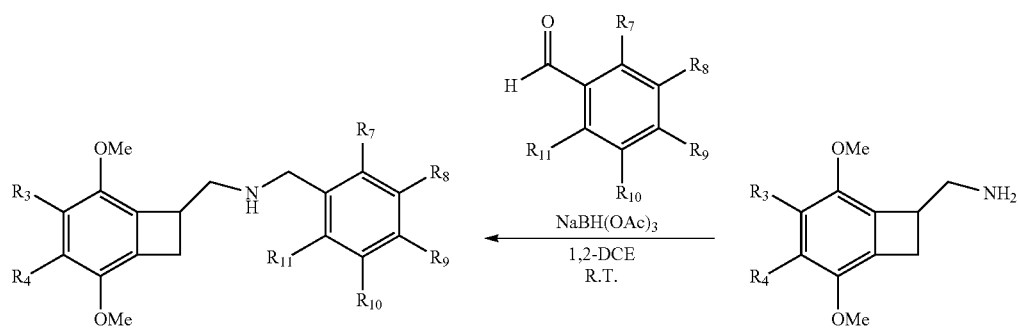

$R_3$, $R_4$, and $R_7$-$R_{11}$ are selected to give the desired compound of the present invention and based on standard principles of chemical stability and reactivity well known in the art.

Example 2. Preparation of Compound 1

Synthesis of Compound 1 was accomplished after initial unfruitful efforts. For example, a scheme using the route shown in Scheme 4 starting from Intermediate 2, where Pd-mediated cross coupling would be used to install the allyl group at the aldehyde stage and then the ethylamine side chain would be installed by the classical method of nitrostyrene formation followed by reduction was not successful. This approach immediately encountered difficulties, as cross coupling with two allyl donors failed to provide the desired product.

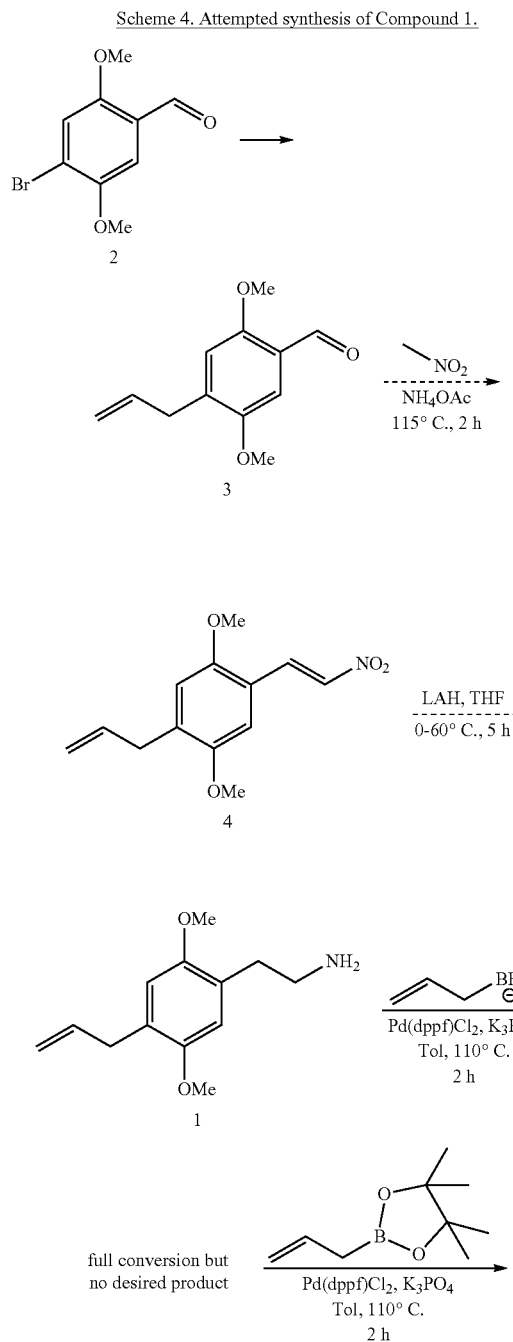

Scheme 4. Attempted synthesis of Compound 1.

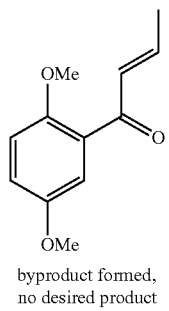

byproduct formed, no desired product

The alternative route presented in Scheme 5 was attempted. Here it was envisioned that the allyl group could be installed directly onto advanced Intermediate 5 via Pd-mediated cross coupling and the resulting Intermediate 6 could then be deprotected to provide the target compound. However, this approach was also unsuccessful. A screen of several conditions for the key coupling reaction with different allyl donors resulted in either no conversion or formation of an inseparable mixture of the desired Intermediate 6 and the isomeric byproduct 6A. Although this mixture could be successfully be converted to a mixture of the desired Compound 1 and its corresponding isomeric byproduct 1A (with 1A the dominant species), all efforts to separate these compounds, including use of preparative HPLC and supercritical fluid chromatography, met with failure. Accordingly, this route was also unable to deliver pure Compound 1.

Scheme 5. Attempted synthesis of Compound 1.

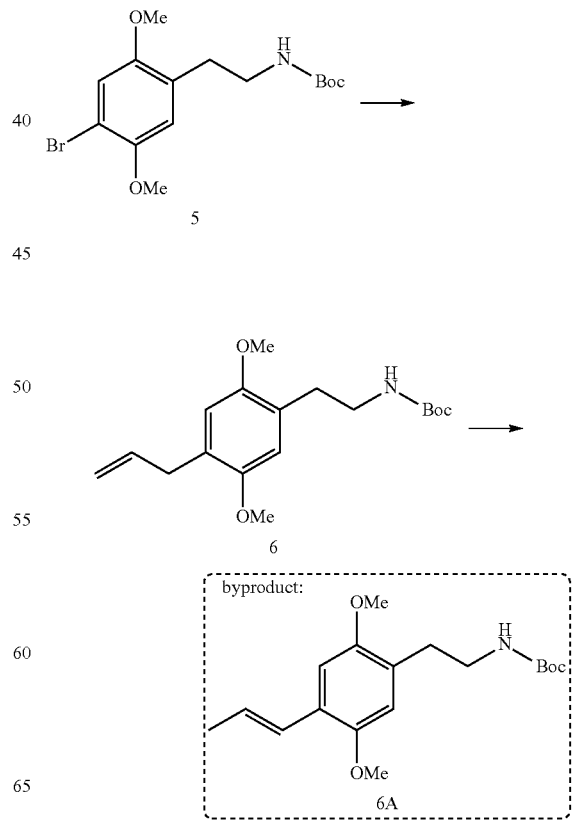

Scheme 6. Successful synthesis of Compound 1.

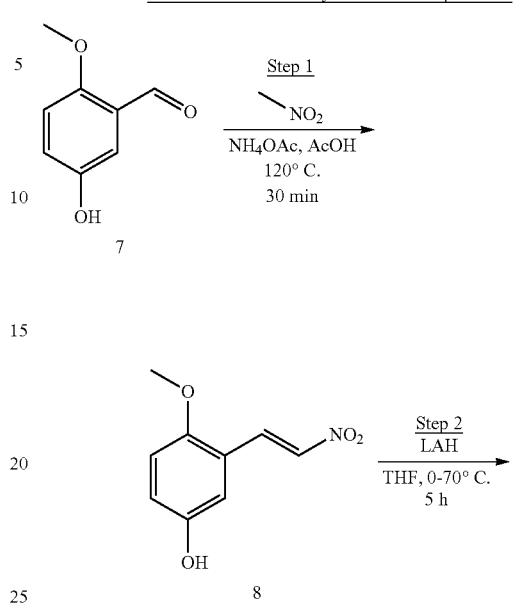

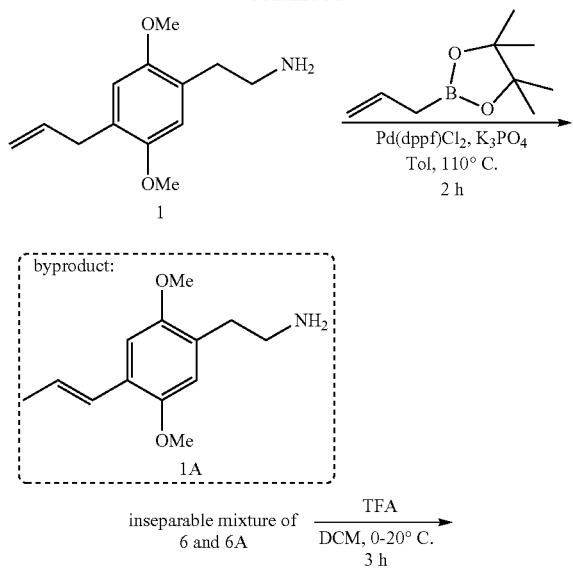

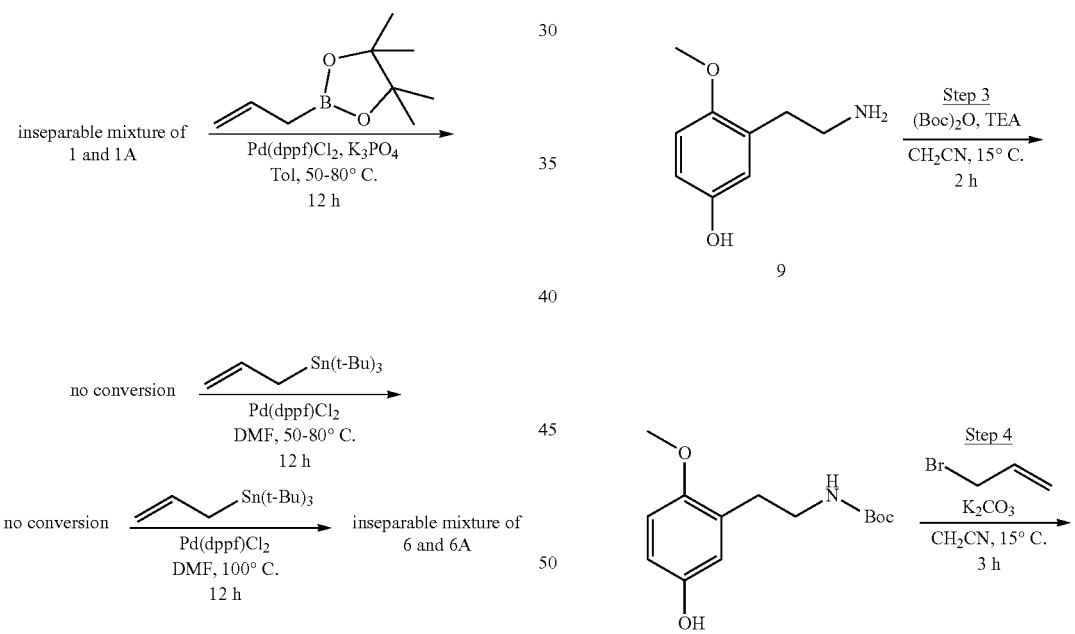

The synthetic route shown in Scheme 6 was successful after some optimization. In this approach, a Claisen rearrangement of allyl ether 11 is used to install the allyl group at the appropriate position on the phenyl ring without formation of the isomerized byproducts that hindered the cross-coupling approaches described above. However, this key step did require some optimization. Initial attempts to form Intermediate 12 using both thermal and lewis acid-mediated conditions failed to provide any of the desired product. However, after a switch of solvent and increase in temperature, the necessary allyl intermediate was obtained along with some of the isomeric byproduct 12A, which was fortunately separable by HPLC.

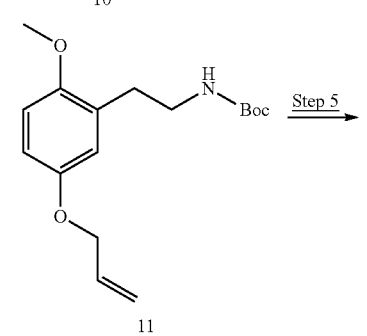

-continued

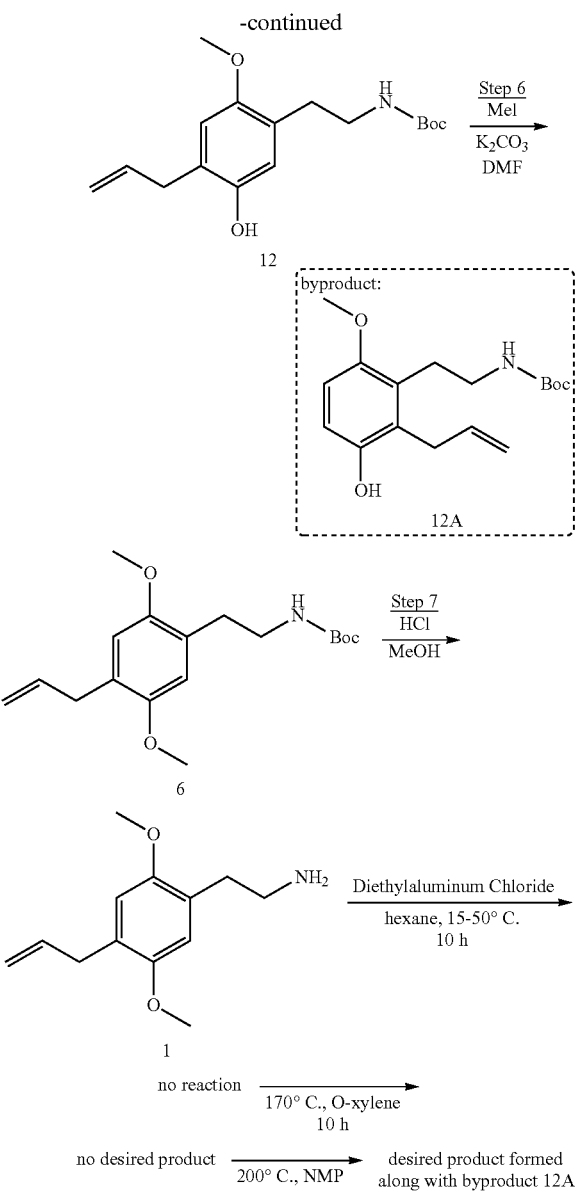

Step 1: Preparation of (E)-4-methoxy-3-(2-nitrovinyl)phenol (8)

To a solution of 5-hydroxy-2-methoxybenzaldehyde 7 (9.5 g, 62.44 mmol, 1 eq) in AcOH (100 mL) was added NH$_4$OAc (3.13 g, 40.59 mmol, 0.65 eq) and nitromethane (53.05 g, 869.16 mmol, 46.95 mL, 13.92 eq). The mixture was stirred at 120° C. for 30 min. On completion, the mixture was added to H$_2$O (100 mL) and the aqueous phase was extracted with DCM (50 mL*3). The combined organic phase was dried over anhydrous Na$_2$SO$_4$, filtered, and concentrated under vacuum. The residue was purified by column chromatography (SiO$_2$, petroleum ether/ethyl acetate=100/1 to 0/1) to give (E)-4-methoxy-3-(2-nitrovinyl)phenol 8 (9.21 g, 47.19 mmol, 76% yield) as a yellow solid. $^1$HNMR (400 MHz, CHLOROFORM-d) δ ppm 8.10 (d, J=13.6 Hz, 1H), 7.84 (d, J=13.6 Hz, 1H), 7.00-6.92 (m, 2H), 6.89-6.84 (m, 1H), 4.81 (br, s, 1H), 3.91 (s, 3H).

Step 2: Preparation of 3-(2-aminoethyl)-4-methoxyphenol (9)

To a solution of (E)-4-methoxy-3-(2-nitrovinyl)phenol 8 (7.21 g, 36.94 mmol, 1 eq) in THF (70 mL) was added LAH (8.41 g, 221.65 mmol, 6 eq) at 0° C. The mixture was then heated to 70° C. and stirred for 5 h. On completion, the mixture was cooled to 0° C. Then water (8.5 mL) was added and the mixture was stirred for 5 min. Then 8.5 mL 30% aq. NaOH was added and the mixture was further stirred until the solids were white and non-gelatinous. The mixture was filtered and the filtrate was concentrated under vacuum to give 3-(2-aminoethyl)-4-methoxyphenol 9 (9.75 g, crude) as a brown oil, which was used in the next step without further purification. 1-HNMR (400 MHz, DMSO-d$_6$) δ ppm 6.39 (d, J=8.8 Hz, 1H), 5.96-5.84 (m, 2H), 3.52 (s, 3H), 2.64-2.56 (m, 2H), 2.42-2.30 (m, 2H).

Step 3: Preparation of tert-butyl (5-hydroxy-2-methoxyphenethyl)carbamate (10)

To a solution of crude 3-(2-aminoethyl)-4-methoxyphenol 9 (9.75 g, 58.31 mmol, 1 eq) in CH$_3$CN (50 mL) and dioxane (50 mL) was added triethylamine (11.80 g, 116.62 mmol, 16.23 mL, 2 eq) and (Boc)$_2$O (12.73 g, 58.31 mmol, 13.40 mL, 1 eq). The mixture was stirred at 15° C. for 2 h. On completion, the reaction mixture was filtered and the filtrate was concentrated to give tert-butyl (5-hydroxy-2-methoxyphenethyl)carbamate 10 (20.5 g, crude) as a yellow oil, which was used in the next step without further purification.

Step 4: Preparation of tert-butyl (5-(allyloxy)-2-methoxyphenethyl)carbamate (11)

To a solution of crude tert-butyl (5-hydroxy-2-methoxyphenethyl)carbamate 10 (17 g, 63.59 mmol, 1 eq) in CH$_3$CN (100 mL) was added K$_2$CO$_3$ (13.18 g, 95.39 mmol, 1.5 eq) and 3-bromoprop-1-ene (9.23 g, 76.31 mmol, 1.2 eq). The mixture was stirred at 15° C. for 3 h. On completion, the reaction mixture was filtered and the filtrate was concentrated to give a residue. To the residue was added water (50 mL) and the aqueous phase was extracted with ethyl acetate (50 mL*4). The combined organic phase was washed with brine (50 mL), dried over anhydrous Na$_2$SO$_4$, filtered, and concentrated under vacuum. The residue was purified by column chromatography (SiO$_2$, petroleum ether/ethyl acetate=50/1 to 0/1) to give tert-butyl (5-(allyloxy)-2-methoxyphenethyl)carbamate 11 (2.10 g, 6.83 mmol, 22% yield over 3 steps from 8) as a yellow oil. $^1$HNMR (400 MHz, DMSO-d$_6$) δ ppm 6.86-6.72 (m, 3H), 6.01-5.98 (m, 1H), 5.39-5.34 (m, 1H), 5.24-5.21 (m, 1H), 4.48-4.46 (m, 2H), 3.73 (s, 3H), 3.14-3.06 (m, 2H), 2.63 (t, J=7.2 Hz, 2H), 1.36 (s, 9H).

Step 5: Preparation of tert-butyl (4-allyl-5-hydroxy-2-methoxyphenethyl)carbamate (12)

A solution of tert-butyl (5-(allyloxy)-2-methoxyphenethyl)carbamate 11 (2 g, 6.51 mmol, 1 eq) in NMP (20 mL) was stirred at 200° C. for 4 h. On completion, the mixture was poured into H$_2$O (50 mL) and extracted with ethyl acetate (30 mL*3). The combined organic layer was washed with brine, dried over anhydrous Na$_2$SO$_4$, filtered, and concentrated. The residue was purified by prep-HPLC (column: Phenomenex luna C18 (250 mm*70 mm, 15 μm); mobile phase: A: water (HCl), B: ACN; B %: 40%-70%, 20 min) to give tert-butyl (4-allyl-5-hydroxy-2-methoxyphenethyl)carbamate 12 (530 mg, 1.72 mmol, 27% yield) as a brown oil. $^1$HNMR (400 MHz, DMSO-$d_6$) δ ppm 8.74 (s, 1H), 6.81 (t, J=5.2 Hz, 1H), 6.61 (s, 1H), 6.55 (s, 1H), 6.00-5.85 (m, 1H), 5.10-4.93 (m, 2H), 3.66 (s, 3H), 3.24 (d, J=6.4 Hz, 2H), 3.08-2.96 (m, 2H), 2.59-2.53 (m, 2H), 1.37 (s, 9H).

Step 6: Preparation of tert-butyl (4-allyl-2,5-dimethoxyphenethyl)carbamate (6)

To a solution of tert-butyl (4-allyl-5-hydroxy-2-methoxyphenethyl)carbamate 12 (300 mg, 975.98 μmol, 1 eq) and $K_2CO_3$ (404.66 mg, 2.93 mmol, 3 eq) in DMF (2 mL) was added MeI (554.12 mg, 3.90 mmol, 243.03 μL, 4 eq) in several portions. The mixture was then stirred at 20° C. for 12 h. On completion, the reaction mixture was quenched with $H_2O$ (2 mL) at 20° C. and then extracted with EtOAc (2 mL*3). The combined organic layers were washed with brine (2 mL*3), dried over anhydrous $Na_2SO_4$, filtered, and concentrated under reduced pressure to give a residue. The residue was purified by prep-TLC ($SiO_2$, petroleum ether: ethyl acetate=5:1) to give tert-butyl (4-allyl-2,5-dimethoxyphenethyl)carbamate 6 (200 mg, 622.26 μmol, 63.76% yield) as a white solid. $^1$HNMR (400 MHz, DMSO-$d_6$) δ ppm 6.82 (t, J=5.6 Hz, 1H), 6.73-6.72 (m, 2H), 5.91 (m, 1H), 5.05-4.98 (m, 2H), 3.72 (s, 3H), 3.70 (s, 3H), 3.27 (d, J=6.8 Hz, 2H), 3.10-3.06 (m, 2H), 2.64 (t, J=7.6 Hz, 2H), 1.36 (s, 9H).

Step 7: Preparation of 2-(4-allyl-2,5-dimethoxyphenyl)ethan-1-amine (1)

To a mixture of tert-butyl (4-allyl-2,5-dimethoxyphenethyl)carbamate 6 (250 mg, 777.82 μmol, 1 eq) in MeOH (6 mL) was added HCl in MeOH (4 M, 2 mL, 12.86 eq) in one portion at 0° C. under $N_2$. The mixture was stirred at 20° C. for 30 min. On completion, the reaction was concentrated to provide the HCl salt of 2-(4-allyl-2,5-dimethoxyphenyl)ethan-1-amine 1 (175 mg, 678.94 μmol, 88% yield, HCl salt) as a white solid. LCMS ($R_T$=1.844 min, MS calc.: 221.1, [M+H]$^+$=222.1); $^1$HNMR (400 MHz, DMSO-$d_6$, HCl salt) δ ppm 8.17 (br s, 3H), 6.83 (s, 1H), 6.77 (s, 1H), 5.95-5.89 (m, 1H), 5.05-4.99 (m, 2H), 3.733 (s, 3H), 3.725 (s, 3H), 3.28 (d, J=6.4 Hz, 2H), 2.94 (br s, 2H), 2.88-2.80 (m, 2H); $^{13}$CNMR (400 MHz, DMSO-$d_6$, HCl salt) δ ppm 150.92, 150.60, 136.86, 126.98, 123.46, 115.55, 113.50, 112.86, 55.93, 55.84, 38.59, 33.81, 27.91.

Example 3. 5-HT2A Receptor Binding

The binding affinities of disclosed compounds at the ketanserin binding site of the 5-HT2A receptor were determined in radioligand binding experiments, with the results summarized in Table 1. Compound 1 exhibited reduced binding affinity at the 5-HT2A receptor compared to closely related compounds.

TABLE 1

5-HT2A receptor binding of disclosed compounds.

| Compound | Structure | 5-HT2A $K_i$ (nM) ([$^3$H]ketanserin) |
|---|---|---|
| DOI | | [001] 14.51 |
| 2C-TFM | | [002] 15.84 |
| 2C-B | | [003] 8.25 |
| 2C-E | | [004] 16.68 |
| 1 | | [005] 90.39 |

Methods. Affinity of the test compounds for the 5-HT2A receptor was determined in radioligand binding experiments with [$^3$H]ketanserin by WuXi AppTec (Hong Kong) Limited, using methods adapted from the literature and under conditions described in Table 2.

TABLE 2

Assay conditions for 5-HT2A receptor radioligand binding.

| | |
|---|---|
| Receptor Source | HEK293 stable cell line |
| Vehicle | 1.0% DMSO |
| Incubation Time | 1 h |
| Incubation Temperature | 25 ° C. |
| Incubation Buffer | 50 mM Tris-HCl, pH 7.4 |

TABLE 2-continued

Assay conditions for 5-HT2A receptor radioligand binding.

| Ligand | 1 nM [$^3$H]ketanserin |
|---|---|
| Non-Specific Ligand | 1 μM ketanserin |

Example 4. Functional Activity at 5-HT2A, 5-HT2B, and 5-HT1A Receptors

The functional activity of Compound 1 at several serotonin (5-HT) receptor subtypes (5-HT2A, 5-HT2B, and 5-HT1A) was determined in $Ca^{2+}$ flux assays, with the results summarized in Table 3. Compound 1 was a potent and highly efficacious agonist at the 5-HT2A receptor. It was also selective for the 5-HT2A receptor over the 5-HT2B and 5-HT1A receptors.

TABLE 3

Agonist activity of disclosed compounds at select serotonin receptors in $Ca^{2+}$ flux functional assays.

| Compound | 5-HT2A $EC_{50}$ (nM) | 5-HT2A % Act @ Max Dose | 5-HT2B $EC_{50}$ (nM) | 5-HT2B % Act @ Max Dose | 5-HT1A $EC_{50}$ (nM) | 5-HT1A % Act @ Max Dose |
|---|---|---|---|---|---|---|
| 1 | 2.153 | 110.99 | 77.71 | 74.87 | >100,000 | 13.25 |

Functional Assays at 5-HT2A, 5-HT2B, and 5-HT1A Receptors. Agonist activity at 5-HT2A, 5-HT2B, and 5-HT1A receptors was determined using a FLIPR $Ca^{2+}$ flux assay at WuXi AppTec (Hong Kong) Limited according to their standard protocols. Briefly, stably transfected cells expressing the receptor of interest (HEK293 for 5-HT2A and 5-HT2B; CHO cells for 5-HT1A) were grown and plated in a 384 well plate and incubated at 37° C. and 5% $CO_2$ overnight. A solution of 250 mM probenecid in 1 mL FLIPR assay buffer was prepared fresh. This was combined with a fluorescent dye (Fluo-4 Direct™) to make a final assay concentration of 2.5 mM. Compounds were diluted 1:3.16 for 10 points and 750 nL was added to a 384 well compound plate using ECHO along with 30 μL assay buffer. The fluorescent dye was then added to the assay plate along with assay buffer to a final volume of 40 μL. The cell plate was incubated for 50 min at 37° C. and 5% $CO_2$ and placed into the FLIPR Tetra along with the compound plate. 10 μL of references and compounds were then transferred from the compound plate into the cell plate and the fluorescent signal was read.

Example 5. Effects on the Head Twitch Response (HTR) in Mice

Disclosed compounds were tested for their ability to induce a head twitch response (HTR) in mice, with the results summarized in Table 4. 5-HT2A agonists of the amphetamine class are generally known to induce higher maximal HTR effects than their phenethylamine counterparts, consistent with more efficacious signaling at 5-HT2A receptors by the former class of compounds. Consistent with this literature, the maximal effect of a prototype 5-HT2A agonist of the amphetamine class, 4-iodo-2,5-dimethoxyamphetamine (DOI) (35.6 head twitches/20 min), was found to be significantly higher than the maximal effect of a prototype 5-HT2A agonist of the phenethylamine class, 2,5-dimethoxy-4-(trifluoromethyl)phenethylamine (2C-TFM) (19.2 head twitches/20 min). Interestingly, the maximal effect of Compound 1 (28.8 head twitches/20 min), which belongs to the phenethylamine class, was closer to that of DOI than that of 2C-TFM, indicating a uniquely high efficacy effect for Compound 1 in vivo among the phenethylamines. In terms of potency, Further, Compound 1 was similar to or slightly more potent than the comparator compounds DOI and 2C-TFM despite its lower binding affinity in vitro (see Example 3).

Animals. Adult male C57BL/6 mice, aged 8 weeks (body weight 20-25 g) were used in these experiments. Animals were housed under controlled temperatures and 12-hour light/dark cycles (lights on between 07:00-19:00 h), with ad libitum food and water. All efforts were made to minimize suffering.

Drugs and Drug Administration. Compound 1 was synthesized as described above. DOI and 2C-TFM were commercially obtained. All compounds were used as the HCl salts, dissolved in a vehicle consisting of normal saline, and administered subcutaneously (s.c.) in a volume of 10 mL/kg. Doses of Compound 1 and 2C-TFM were calculated at the basis of the free base and doses of DOI were calculated on the basis of the HCl salt. Group size was N=6 animals/group.

Procedure. Mice were administered one dose of a test drug (or vehicle) s.c. and immediately placed into a small open field for behavioral observation. Animals were observed continuously for 20 mins and the number of HTRs were counted by an observer blind to the treatment condition.

Statistical Analysis. The data points shown in Table 4 are the mean±standard error of the mean (SEM). Dose-response curves were fit and $ED_{50}$s calculated using the Gaussian 2020 function in GraphPad Prism 9.

TABLE 4

HTR of disclosed compounds in mice.

| Compound | Dose (mg/kg) | Average HTR (SEM) | $ED_{50}$ (95% CI) (mg/kg) |
|---|---|---|---|
| DOI | 0.1 | 5.5 (0.85) | 0.43 (0.29-0.60) |
|  | 0.316 | 13.0 (2.07) |  |
|  | 1 | 29.3 (2.29) |  |
|  | 3.16 | 35.6 (3.37) |  |
|  | 10 | 22.7 (1.52) |  |
| 2C-TFM | 0.316 | 6.5 (0.89) | 0.43 (0.24-0.64) |
|  | 1 | 19.2 (2.47) |  |
|  | 3.16 | 19.2 (2.37) |  |
|  | 10 | 17.2 (1.62) |  |
|  | 31.6 | 9.3 (1.12) |  |
| 1 | 0.1 | 8.8 (0.79) | 0.28 (0.20-0.37) |
|  | 0.316 | 13.3 (0.49) |  |
|  | 1 | 23.0 (1.21) |  |
|  | 3.16 | 28.8 (1.58) |  |
|  | 10 | 24.3 (2.04) |  |

Example 6. Metabolic Stability in Monkey Liver Microsomes

Disclosed compounds were tested for stability in cynomolgus monkey liver microsomes (CLM), with the results summarized in Table 5. Interestingly, Compound 1 was less stable than similar compounds 2C-B and 2C-E in this model, suggestive of a shorter duration of action.

Drugs. Compound 1 was synthesized as described above. 2C-B and 2C-E were commercially obtained.

CLM Stability. Pooled CLM from male cynomolgus monkeys (Corning 452413) were used. Microsomal incubations were carried out in multi-well plates. Liver microsomal incubation medium consisted of PBS (100 mM, pH 7.4), $MgCl_2$ (1 mM), and NADPH (1 mM), with 0.50 mg of liver microsomal protein per mL. Control incubations were performed by replacing the NADPH-cofactor system with PBS. Test compounds (1 µM, final solvent concentration 1.0%) were incubated with microsomes at 37° C. with constant shaking. Six time points over 60 minutes were analyzed, with 60 µL aliquots of the reaction mixture being drawn at each time point. The reaction aliquots were stopped by adding 180 µL of cold (4° C.) acetonitrile containing 200 ng/mL tolbutamide and 200 ng/mL labetalol as internal standards (IS), followed by shaking for 10 minutes, and then protein sedimentation by centrifugation at 4,000 rpm for 20 minutes at 4° C. Supernatant samples (80 µL) were diluted with water (240 µL) and analyzed for parent compound remaining using a fit-for-purpose liquid chromatography-tandem mass spectrometry (LC-MS/MS) method.

Data Analysis. The elimination constant ($k_{el}$), half-life ($t_{1/2}$), and intrinsic clearance ($Cl_{int}$) were determined in a plot of ln(AUC) versus time, using linear regression analysis.

TABLE 5

Intrinsic clearance ($Cl_{int}$) and half-life ($t_{1/2}$) of disclosed compounds in the presence of CLM.

| Compound | Structure | $Cl_{int}$ (µL/min/mg) | $t_{1/2}$ (min) |
|---|---|---|---|
| 1 | | 32.8 | 42.3 |
| 2C-B | | 18.4 | 75.2 |
| 2C-E | | 17.6 | 78.6 |

Example 7. Additional Disclosed Compounds are 5-HT2A Receptor Agonists

Additional disclosed compounds are tested in vitro in functional assays measuring activation of 5-HT2A receptors (e.g., as described in Example 4). The compounds exhibit agonist activity at the 5-HT2A receptor.

Example 8. Additional Disclosed Compounds Induce Head Twitch Response in Mice

Additional disclosed compounds are tested in vivo in the head twitch assay in mice (e.g., as described in Example 5). The compounds induce head twitch response in mice.

Example 9. Forced Swim Test in Rats

Disclosed compounds are tested in the forced swim test (FST) in rats with a 23.5-h pre-treatment time according to the following procedures. The compounds reduce immobility time relative to vehicle control, indicative of an antidepressant-like effect.

Animals. Male Sprague Dawley rats, aged 8-10 weeks, are used in the experiments. Animals are housed in groups of 2 under controlled temperature (22±3° C.) and relative humidity (30-70%) conditions, with 12-hour light/dark cycles, and with ad libitum food and water. All efforts are made to minimize suffering.

Drugs and Drug Administration. Test compounds, saline vehicle, and the positive control desipramine are administered subcutaneously (s.c.), with doses calculated based on the freebase. Normal saline is used as the vehicle for compounds provided as the HCl salt, while saline acidified with 1-2 molar equivalents of HCl is used as the vehicle for compounds provided as the freebase (to form the soluble HCl salt in situ). All compounds are administered at a volume of 5 mL/kg. Test compounds and vehicle are administered 0.5 h after the start of the training swim (Swim 1) and 23.5 h before the test swim (Swim 2). Desipramine is administered 3 times, at 23.5 h, 5 h, and 1 h before the test swim (Swim 2), each time at a dose of 20 mg/kg.

Forced Swim Test (FST). Animals are randomized based on body weight, and it is ensured that inter-group variations are minimal and do not exceed ±20% of the mean body weight across the groups. Group size is n=10 per treatment. Rats are handled for about 2 min daily for the 5 days prior to the beginning of the experimental procedure. On the first day of the experiment (i.e. Day 0), post randomization, training swim sessions (Swim 1) are conducted between 12:00 and 18:00 h with all animals by placing rats in individual glass cylinders (46 cm tall×20 cm in diameter) containing 23-25° C. water 30 cm deep for 15 minutes. At the conclusion of Swim 1, animals are dried with paper towels, placed in heated drying cages for 15 minutes, and then returned to their home cages. Animals are then administered the appropriate drug or vehicle treatment(s), as described above. For clarity, a compound administration time of 23.5 h before Swim 2 means 0.5 h after the start of Swim 1 and 0.25 h after the completion of Swim 1 (i.e., immediately after return to the home cage). On Day 1 (i.e., 24 h after start of Swim 1), animals perform the test swim (Swim 2) for a period of 5 min but otherwise under the same conditions as Swim 1. During all swim sessions, the water is changed between each animal.

Behavioral scoring is conducted by observers who are blind to the treatment groups. Animals are continuously observed during Swim 2 and the total time spent engaging in the following behaviors is recorded: immobile, swimming, and climbing. A rat is judged to be immobile when it remains floating in the water without struggling and is making only those movements necessary to keep its head above water. A rat is judged to be swimming when it makes active swimming motions, more than necessary to merely maintain its head above water (e.g. moving around in the cylinder). A rat is judged to be climbing when it makes active movements with its forepaws in and out of the water, usually directed against the walls.

Statistical Analysis. Data points are presented as the mean±standard error of the mean (SEM). Analysis is performed using GraphPad Prism 9. Comparisons between groups are performed using the one-way analysis of variance (ANOVA), followed by Dunnett's test for comparisons to vehicle.

Example 10. Preparation of Compound 13

Compound 13, having the structure:

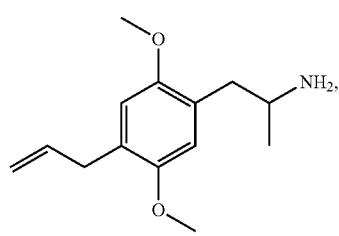

13 is prepared by the same procedures used to prepare Compound 1 (as described in Example 2) but substituting nitroethane for nitromethane in Step 1.

It should be understood that the examples and embodiments provided herein are exemplary. Those skilled in the art will envision various modifications of the examples and embodiments that are consistent with the scope of the disclosure herein. Such modifications are intended to be encompassed by the claims.

What is claimed:

1. A compound having the structure:

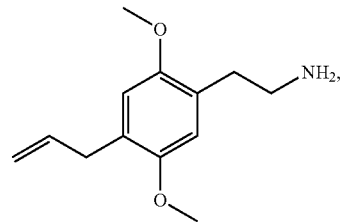

1 or a pharmaceutically acceptable salt thereof.

2. The compound of claim 1 having a purity of not less than about 90%.

3. A composition comprising a compound represented by:

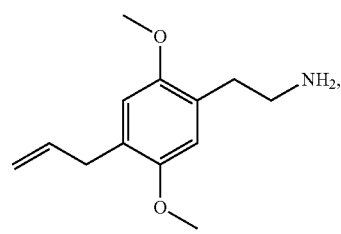

1 or a pharmaceutically acceptable salt thereof, that is substantially free of the isomeric compound having the structure:

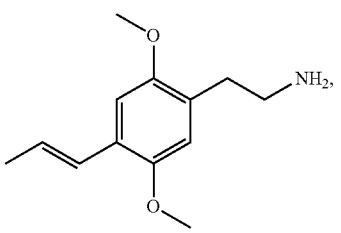

1A or a pharmaceutically acceptable salt thereof.

4. The compound of claim 1 containing not more than 1% of the isomeric compound having the structure:

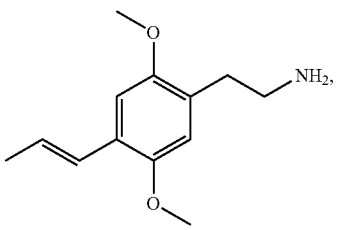

1A or a pharmaceutically acceptable salt thereof.

5. The compound of claim 1 represented by:

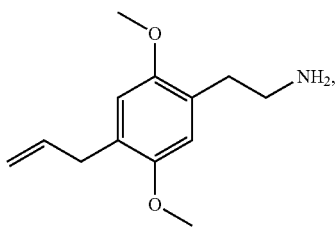

or a pharmaceutically acceptable salt thereof, or an isomeric mixture comprising compound 1 and compound 1A, wherein the mixture comprises about 90% to about 99% compound 1 by weight, and compound 1A is represented by:

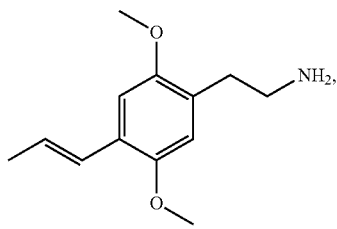

or a pharmaceutically acceptable salt thereof.

6. A pharmaceutical composition comprising the compound of claim 1 and a pharmaceutically acceptable carrier.

7. A method of treating depression, anxious depression, a mood disorder, an anxiety disorder, or a substance use disorder and any symptom or disorders associated therewith in a subject in need thereof, the method comprising administering to the subject in need thereof an effective amount of a compound having the structure:

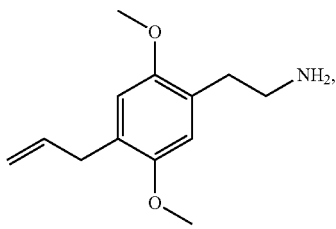

or a pharmaceutically acceptable salt thereof.

8. The method of claim 7, wherein the disorder to be treated is depression or anxious depression.

9. The method of claim 7, wherein the compound or a pharmaceutically acceptable salt thereof is administered in an amount of 0.5 mg to 50 mg.

10. The method of claim 7, wherein the compound or a pharmaceutically acceptable salt thereof is administered in an amount selected from 0.5 mg to 1 mg, 1 mg to 2 mg, 2 mg to 5 mg, 5 mg to 10 mg, 10 mg to 15 mg, 15 mg to 30 mg and 30 mg to 50 mg.

11. The method of claim 7, wherein the method provides improvement in at least one symptom selected from the group consisting of sadness or lethargy or lassitude, depressed mood, inability to feel, anxious worried feelings, fears, feeling tense, feeling restlessness, diminished interest in all or nearly all activities, difficulty initiating activities, significant increased or decreased appetite leading to weight gain or weight loss, insomnia, irritability, fatigue, feelings of worthlessness or low self-esteem, strongly held negative beliefs or pessimistic thoughts about self, others or world, feelings of helplessness, inability to concentrate or distractibility, recurrent thoughts of death or suicide, feelings of guilt, memory complaints, difficulty experiencing positive feelings, feeling cut off or distant from people, hypervigilance, risk taking behavior, avoidance of thoughts about a stressful or traumatic event, pains and aches, ruminations and obsessive thoughts, compulsive behaviors, talking to people you don't know well or strangers, being center of attention, disturbing intrusive thoughts, can't get through week without drug use, guilty about drug use, problems with friends or family due to drug use, and withdrawal symptoms due to drug use.

12. The method of claim 7, wherein the compound or a pharmaceutically acceptable salt thereof is administered via a route selected from the group consisting of oral, buccal, sublingual, inhaled mist, topical, intranasal, subcutaneous, intramuscular, and intravenous.

13. The method of claim 7, wherein the compound or a pharmaceutically acceptable salt thereof is administered daily.

14. The method of claim 7, wherein the compound or a pharmaceutically acceptable salt thereof is administered from 1 to 10 times per month.

15. The method of claim 7, wherein the compound or a pharmaceutically acceptable salt thereof is administered from 1 to 10 times per year.

16. The method of claim 7, wherein the compound or a pharmaceutically acceptable salt thereof is administered every 1 to 7 days in an amount of 0.5 to 2.5 mg per administration.

17. The method of claim 7, wherein the compound or a pharmaceutically acceptable salt thereof is administered every 1 to 8 weeks in an amount of 5 to 50 mg per administration.

18. The method of claim 7, wherein the compound or a pharmaceutically acceptable salt thereof is administered every 1 to 6 months in an amount of 5 to 50 mg per administration.

19. A method of preparing the compound of claim 1 having the structure:

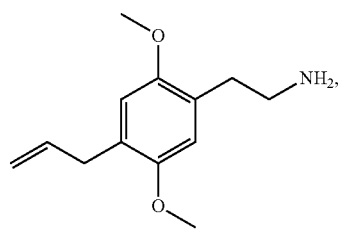

or a pharmaceutically acceptable salt thereof, comprising deprotecting a compound having the structure:

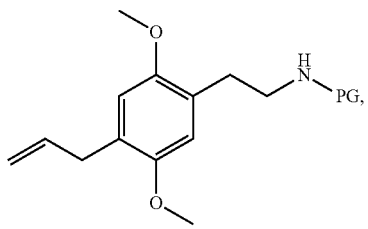

6-PG wherein PG is a protecting group, thereby making compound 1.

20. The method of claim 19, further comprising contacting a compound having the structure:

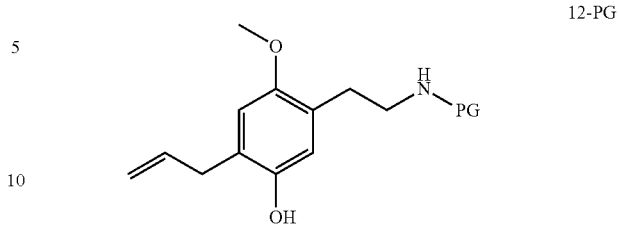

12-PG with a methylating agent to form compound 6-PG, wherein compound 12-PG is formed by heating a compound of the structure

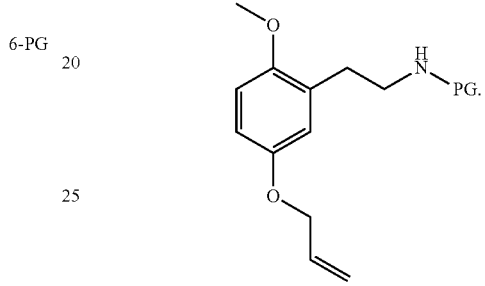

11-PG

* * * * *